United States Patent
Jung et al.

(10) Patent No.: US 10,452,171 B2
(45) Date of Patent: Oct. 22, 2019

(54) FLEXIBLE DISPLAY APPARATUS AND METHOD FOR CONTROLLING THEREOF

(71) Applicant: SAMSUNG ELECTRONICS CO., LTD., Suwon-si (KR)

(72) Inventors: Ji-hyun Jung, Seongnam-si (KR); Kyung-a Kang, Seoul (KR); Han-sung Lee, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/858,397

(22) Filed: Apr. 8, 2013

(65) Prior Publication Data

US 2013/0265262 A1    Oct. 10, 2013

(30) Foreign Application Priority Data

Apr. 8, 2012 (KR) .................. 10-2012-0036471

(51) Int. Cl.
| | | |
|---|---|---|
| G06F 3/0488 | (2013.01) | |
| G06F 1/16 | (2006.01) | |
| G06F 3/01 | (2006.01) | |
| G06F 3/041 | (2006.01) | |

(52) U.S. Cl.
CPC ............ G06F 3/041 (2013.01); G06F 1/1652 (2013.01); G06F 3/017 (2013.01); G06F 3/0416 (2013.01); G06F 3/0488 (2013.01); G06F 2203/04102 (2013.01)

(58) Field of Classification Search
CPC ........ G06F 3/041; G06F 1/1652; G06F 3/017; G06F 3/0488; G06F 3/0416
See application file for complete search history.

(56) References Cited

U.S. PATENT DOCUMENTS

| | | | |
|---|---|---|---|
| 8,581,859 B2 | 11/2013 | Okumura et al. | |
| 9,052,769 B2 | 6/2015 | Choi et al. | |
| 2005/0110702 A1 | 5/2005 | Aoki et al. | |
| 2005/0140646 A1* | 6/2005 | Nozawa | G06F 1/1626 345/156 |
| 2006/0238494 A1* | 10/2006 | Narayanaswami | G06F 3/002 345/156 |
| 2008/0129686 A1* | 6/2008 | Han | G06F 3/0482 345/156 |
| 2008/0291225 A1* | 11/2008 | Arneson | 345/698 |

(Continued)

FOREIGN PATENT DOCUMENTS

| | | |
|---|---|---|
| CN | 101782804 A | 7/2010 |
| CN | 102089737 A | 6/2011 |

(Continued)

OTHER PUBLICATIONS

Communication, dated Jul. 21, 2014, issued by the Australian Government in counterpart Patent Application No. 2013203012.

(Continued)

*Primary Examiner* — Mihir K Rayan
(74) *Attorney, Agent, or Firm* — Sughrue Mion, PLLC

(57) ABSTRACT

A flexible display apparatus may display a graphical user interface (GUI) indicating a deformation gesture associated with a function executed when the deformation gesture is performed. Accordingly, a user may easily control the flexible display apparatus to perform functions using the deformation gesture.

25 Claims, 68 Drawing Sheets

(56) References Cited

U.S. PATENT DOCUMENTS

| | | | |
|---|---|---|---|
| 2009/0005011 A1* | 1/2009 | Christie | G06Q 10/107 |
| | | | 455/412.2 |
| 2010/0011291 A1* | 1/2010 | Nurmi | G06F 3/0414 |
| | | | 715/702 |
| 2010/0058252 A1 | 3/2010 | Ko | |
| 2010/0060548 A1 | 3/2010 | Choi et al. | |
| 2010/0117975 A1 | 5/2010 | Cho | |
| 2010/0141605 A1 | 6/2010 | Kang et al. | |
| 2010/0164888 A1 | 7/2010 | Okumura et al. | |
| 2010/0225578 A1* | 9/2010 | Ko | G06F 3/041 |
| | | | 345/156 |
| 2011/0057873 A1 | 3/2011 | Geissler et al. | |
| 2011/0083078 A1* | 4/2011 | Ju | G06F 3/0481 |
| | | | 715/738 |
| 2011/0086680 A1 | 4/2011 | Kim et al. | |
| 2011/0161849 A1 | 6/2011 | Stallings et al. | |
| 2011/0227822 A1* | 9/2011 | Shai | G06F 1/1615 |
| | | | 345/156 |
| 2011/0298691 A1* | 12/2011 | DeLuca | G06F 21/36 |
| | | | 345/1.3 |
| 2012/0014054 A1 | 1/2012 | Ashcraft et al. | |
| 2012/0319960 A1* | 12/2012 | Kildal | G06F 3/0487 |
| | | | 345/173 |
| 2013/0093660 A1* | 4/2013 | Hirsch | G06F 1/1652 |
| | | | 345/156 |
| 2013/0169520 A1* | 7/2013 | Cho | G06F 3/0488 |
| | | | 345/156 |
| 2014/0215411 A1* | 7/2014 | Kong | G06F 3/017 |
| | | | 715/863 |
| 2015/0033193 A1* | 1/2015 | Beaurepaire | G06F 3/04845 |
| | | | 715/863 |

FOREIGN PATENT DOCUMENTS

| | | |
|---|---|---|
| EP | 2150031 A1 | 2/2010 |
| EP | 2 166 443 A2 | 3/2010 |
| EP | 2192750 A2 | 6/2010 |
| KR | 10-2007-0094335 A | 9/2007 |
| KR | 10-2010-0030114 A | 3/2010 |
| KR | 10-2010-0052227 A | 5/2010 |
| KR | 10-2011-0028650 A | 3/2011 |
| KR | 10-1036618 B1 | 5/2011 |
| WO | 2010/004080 A1 | 1/2010 |
| WO | 2010/019466 A1 | 2/2010 |
| WO | 2010/028405 A1 | 3/2010 |

OTHER PUBLICATIONS

Communication dated Dec. 9, 2014 issued by the Australian Patent Office in counterpart Australian Patent Application No. 2013203012.
Communication dated Mar. 11, 2016 issued by the Australian Patent Office in counterpart Australian Patent Application No. 2015202062.
Communication dated Mar. 22, 2016 issued by the Korean Intellectual Property Office in counterpart Korean Patent Application No. 10-2012-0036471.
Communication dated Mar. 21, 2016 issued by the European Patent Office in counterpart European Patent Application No. 13162693.9.
Communication dated Jun. 23, 2016, issued by the Australian Patent Office in counterpart Australian Patent Application No. 2015202062.
Communication issued Nov. 22, 2017by the Australian Intellectual Property Office in counterpart Australian Patent Application No. 2016238947.
Communication issued Oct. 19, 2017 by the Korean Intellectual Property Office in counterpart Korean Patent Application No. 10-2017-0094951.
Communication issued Sep. 5, 2017 by the State Intellectual Property Office of People's Republic of China in counterpart Chinese Application No. 201310119792.X.
Communication dated Mar. 20, 2017, issued by the State Intellectual Property Office of P.R. China in counterpart Chinese Application No. 201310119792.X.
Written Opinion dated Jul. 26, 2013, issued by the International Searching Authority in counterpart International Application No. PCT/KR2013/002927.
Search Report dated Jul. 26, 2013, issued by the International Searching Authority in counterpart International Application No. PCT/KR2013/002927.
Communication dated Apr. 30, 2018, issued by the Korean Intellectual Property Office in counterpart Korean Application No. 10-2017-0094951.
Communication dated Feb. 24, 2018, issued by the State Intellectual Property Office of P.R. China in counterpart Chinese Application No. 201310119792.X.
Communication dated Apr. 4, 2018, issued by the Australian Patent Office in counterpart Australian Application No. 2016238947.
Communication dated Feb. 26, 2018, issued by the European Patent Office in counterpart European Application No. 13162693.9.
Communication issued Jul. 17, 2018 by the Intellectual Property Office of Australia in counterpart Australian Patent Application No. 2016238947.
Communication dated Nov. 21, 2018, issued by the European Patent Office in counterpart European Patent Application No. 13162693.9.
Communication dated Nov. 28, 2018, issued by the Korean Intellectual Property Office in counterpart Korean Patent Application No. 10-2017-0094951.
Notice of Allowance dated Jan. 15, 2019, issued by the Korean Intellectual Property Office in counterpart Korean Patent Application No. 10-2017-0094951.
Communication dated Jul. 15, 2019 issued by the Korean Intellectual Property Office in counterpart Korean Application No. 10-2019-0044409.

* cited by examiner

FIG. 27
(a)
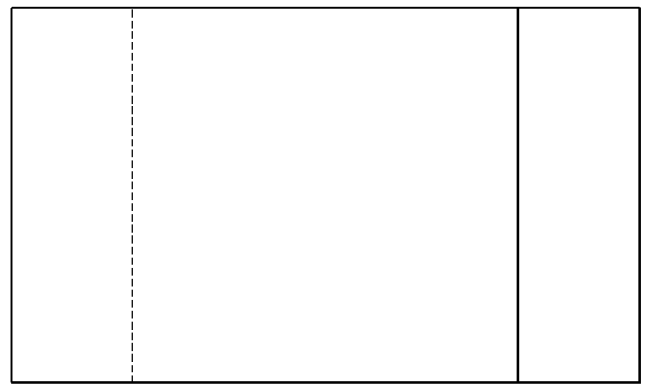
(b)
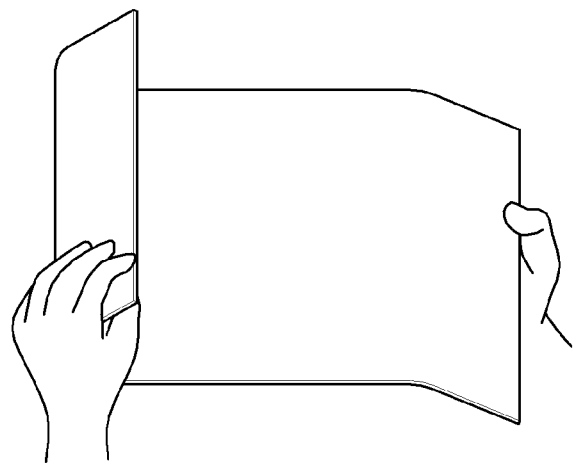
(c)
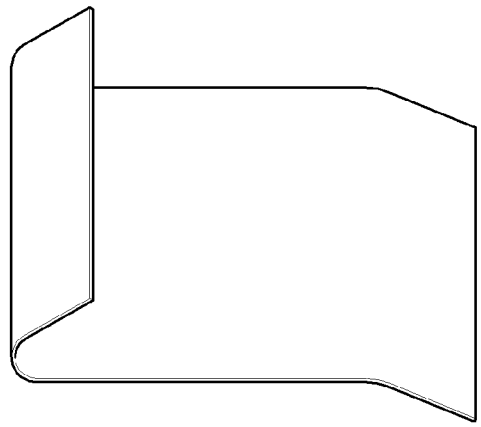

FIG. 28
(a)
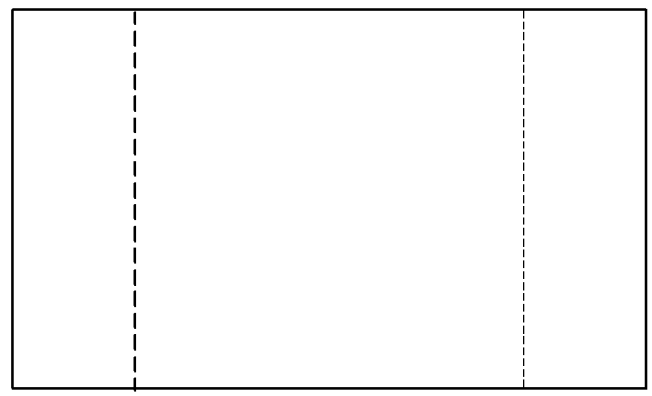
(b)
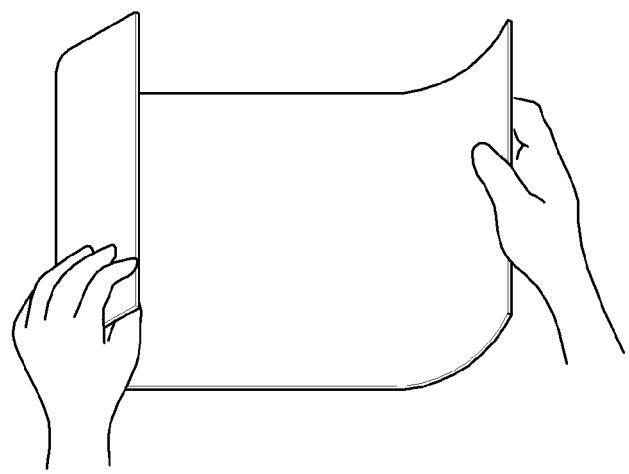
(c)
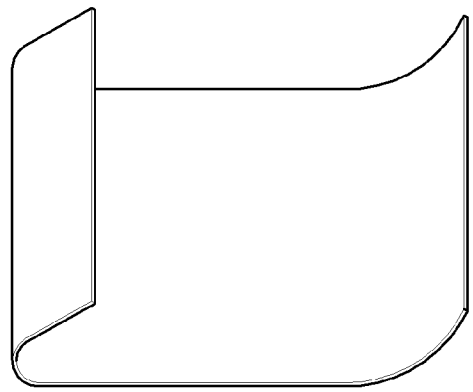

FIG. 29
(a) 
(b) 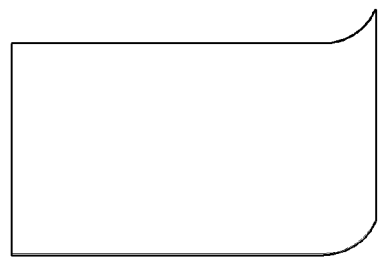
(c) 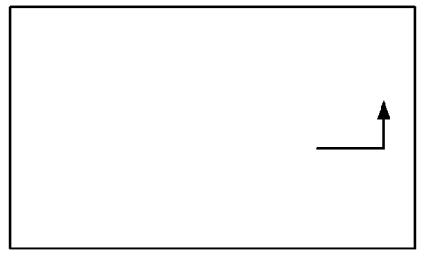
(d) 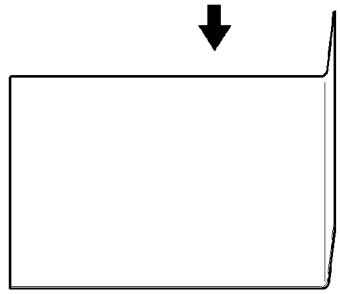
(e) 
(f) 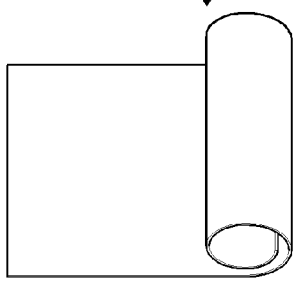

FIG. 30
(a)
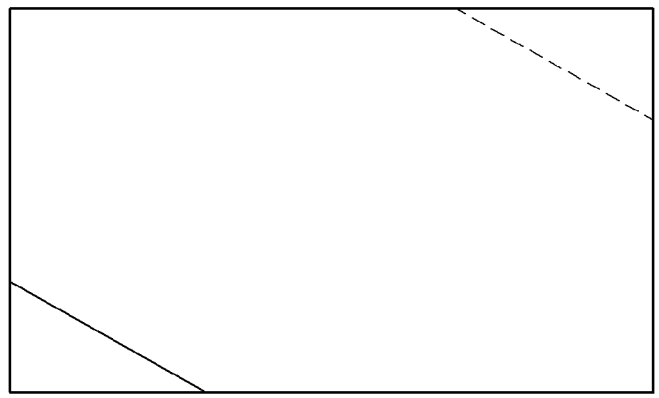
(b)
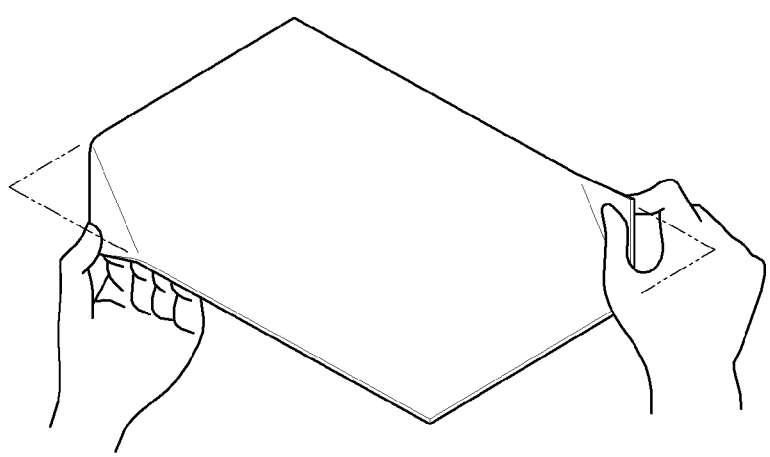
(c)
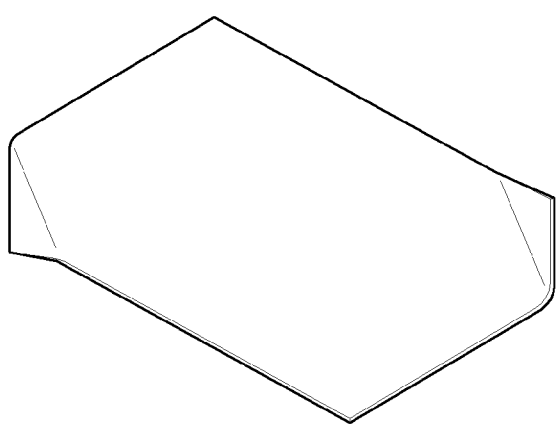

FIG. 31
(a)
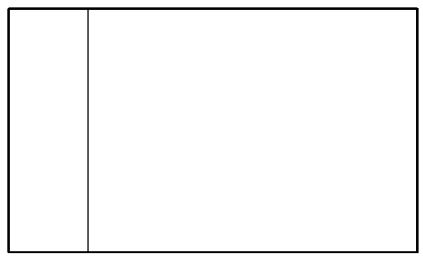
(b)
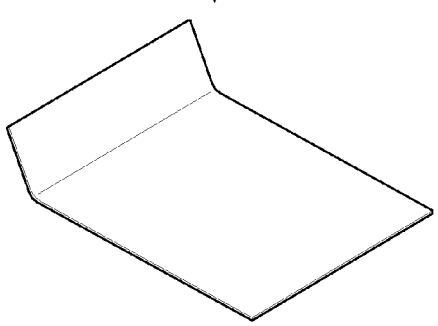
(c)
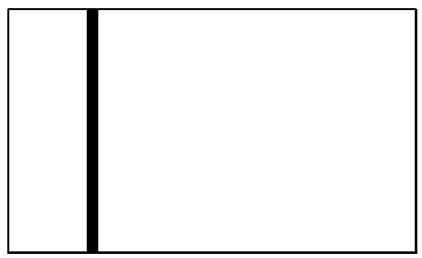
(d)
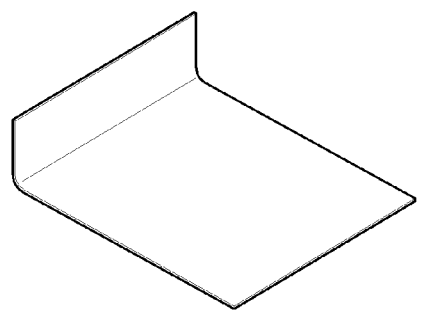
(e)
(f)
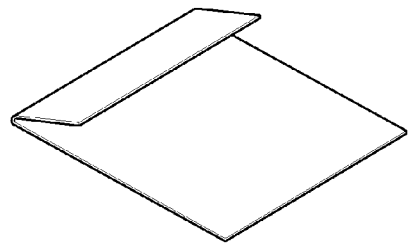

FIG. 32
(a)
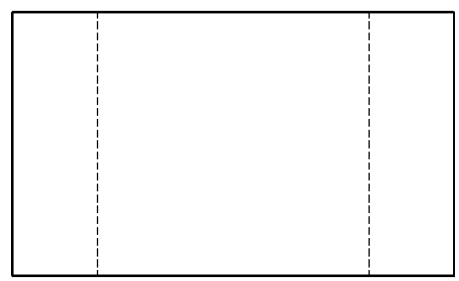
(b)
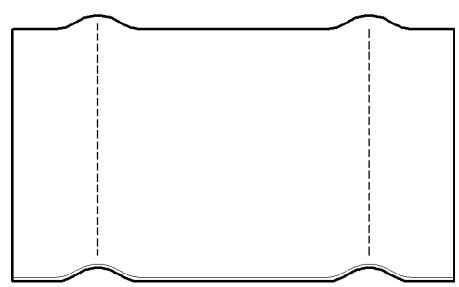
(c)
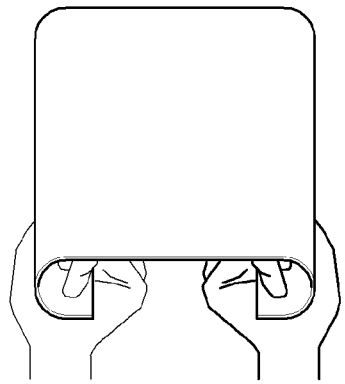
(d)
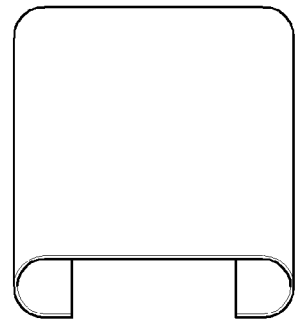

FIG. 34
(a)
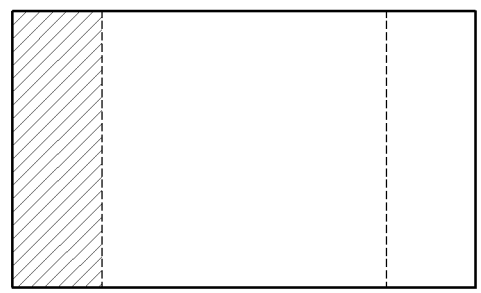
(b)
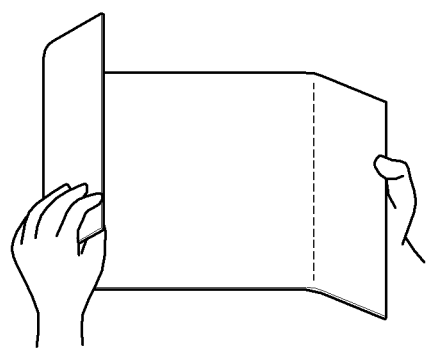
(c)
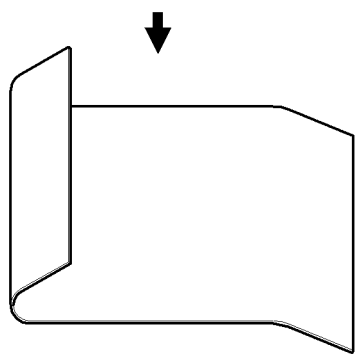

FIG. 35
(a)
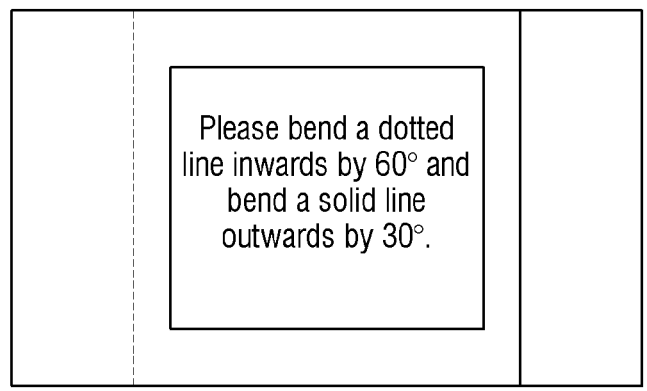
(b)
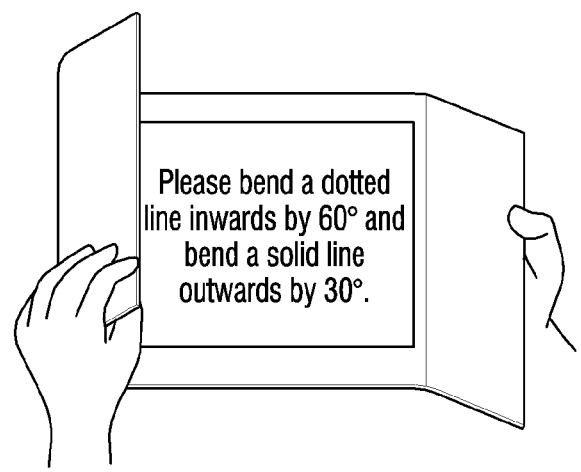
(c)
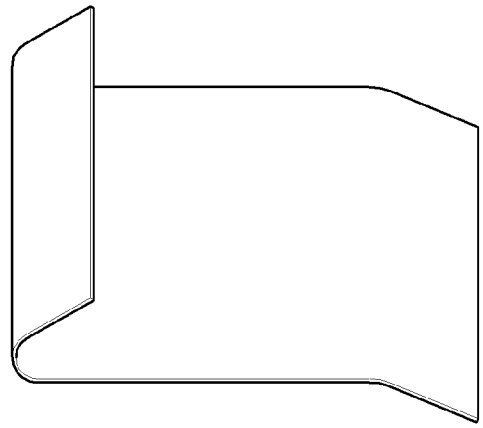

FIG. 41
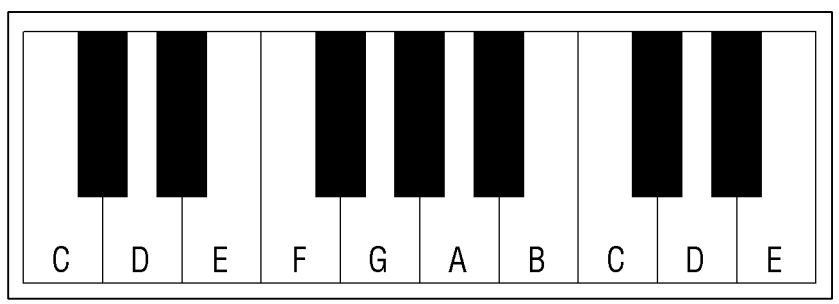
(a)
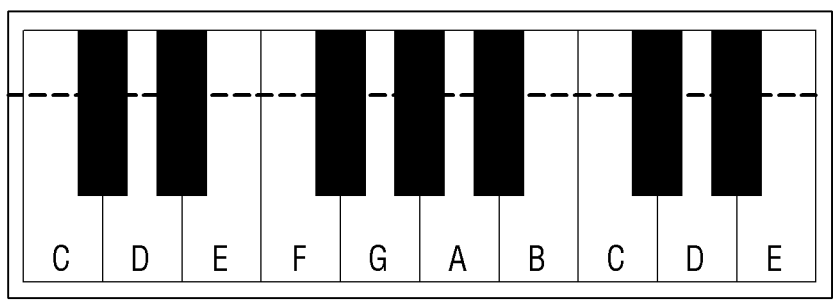
(b)
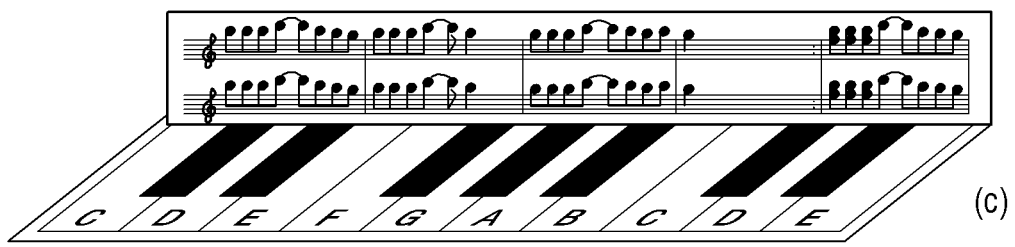
(c)

FIG. 42
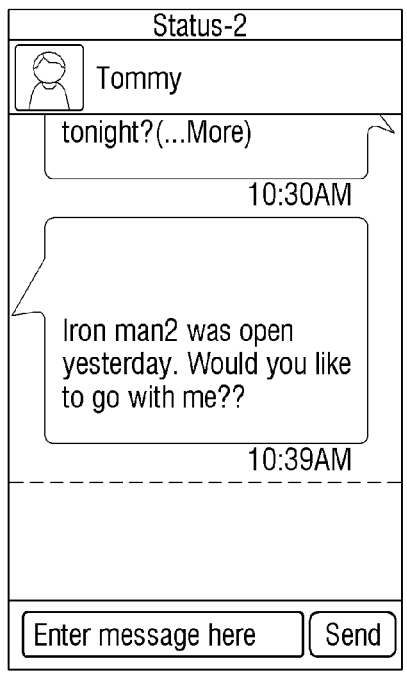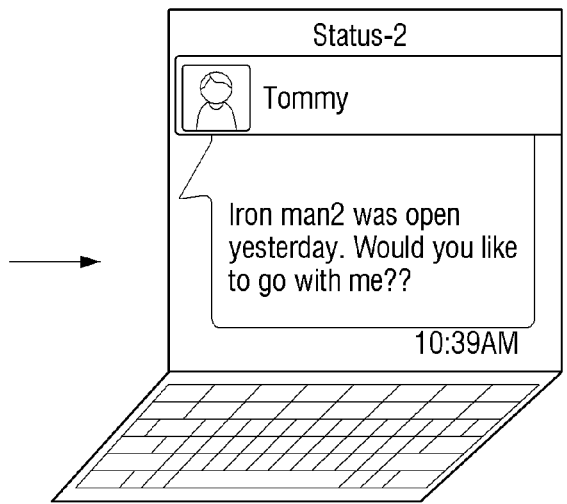
(a) (b)

FIG. 43
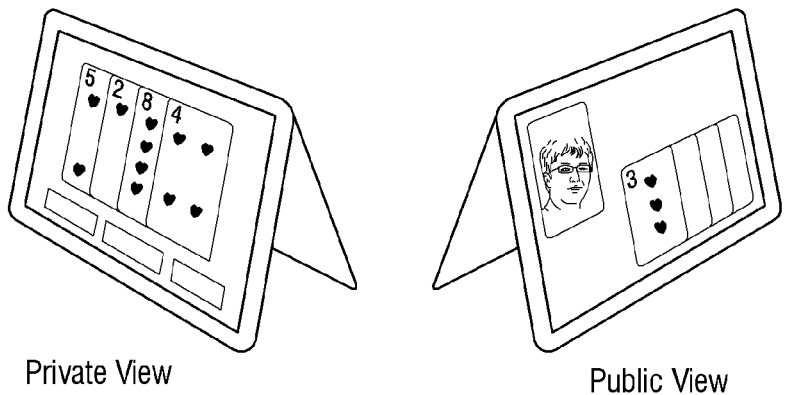
Private View    Public View
(a)
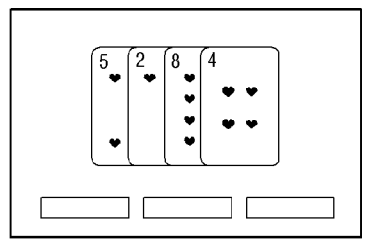
(b)
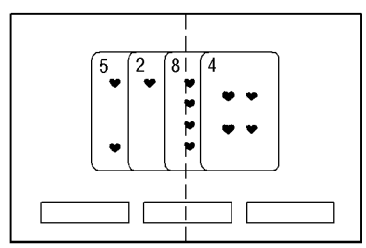
(c)
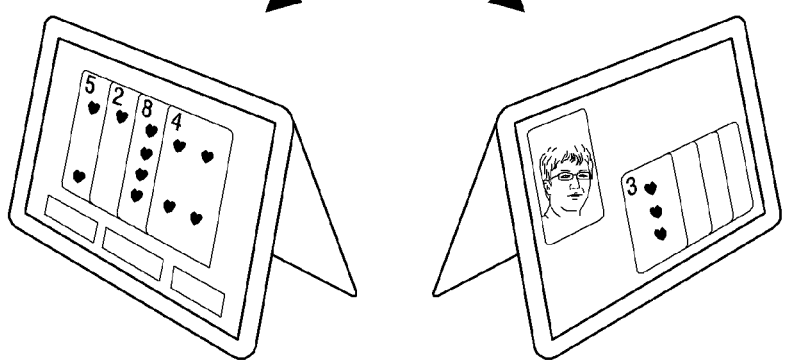

FIG. 45
(a) 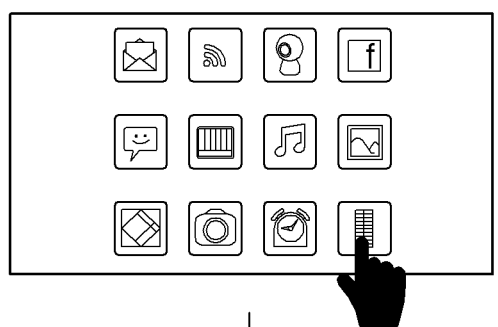
(b) 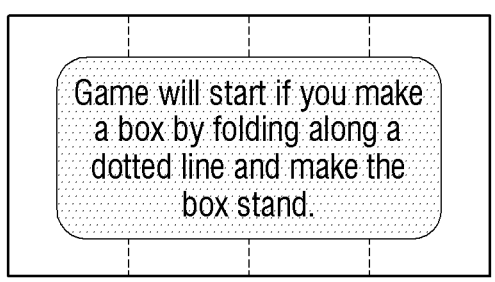
(c) 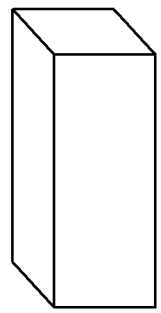
(d) 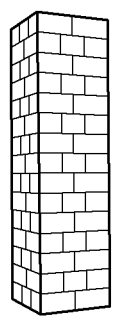

FIG. 46
(a) 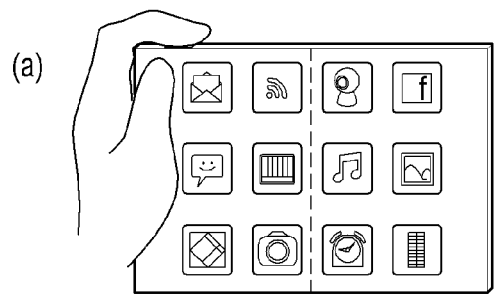
(b) 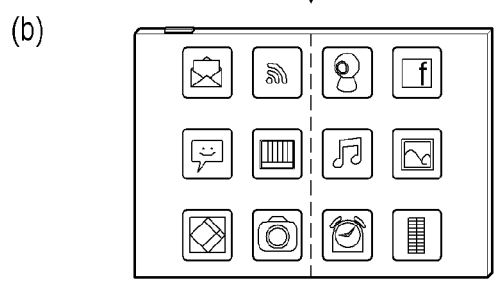
(c) 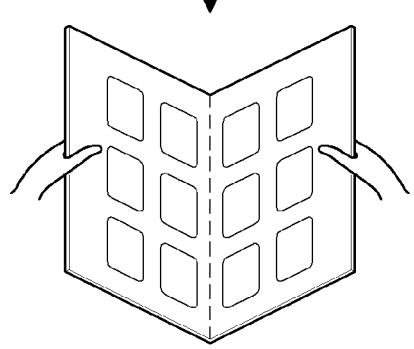
(d) 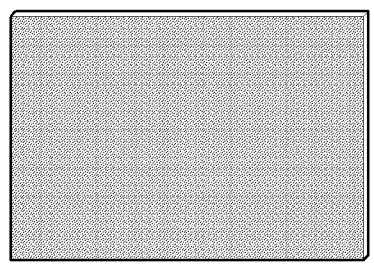

FIG. 51
(a)
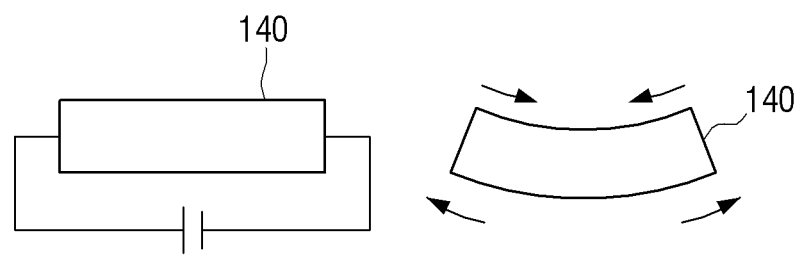
VERTICAL CONTRACTION AND EXPANSION OF
ACTUATOR ARE ADJUSTED ACCORDING TO VOLTAGE
(b)
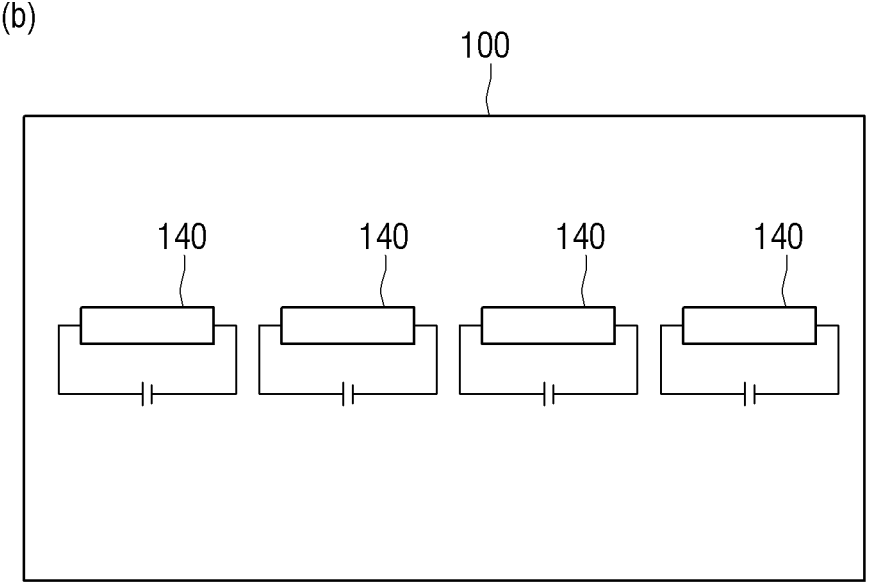

FIG. 52
(a)
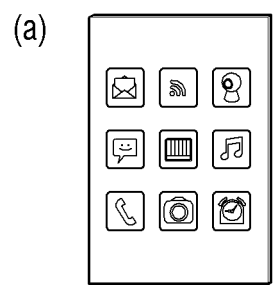
(b)
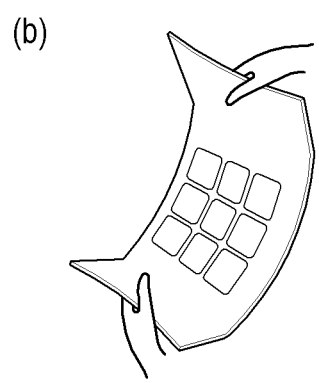
(c)
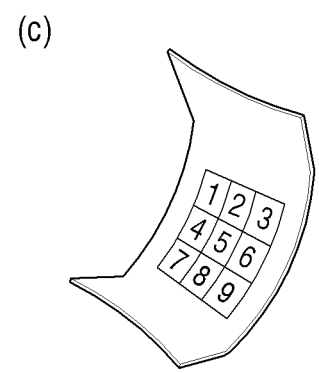

FIG. 53
(a)
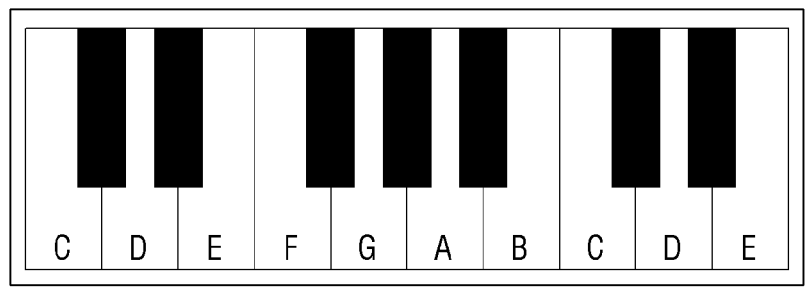
(b)
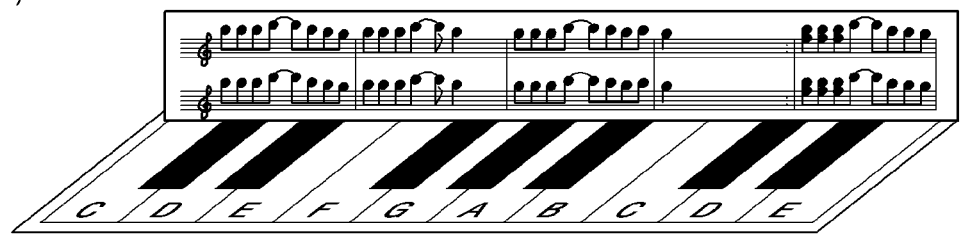

FIG. 54
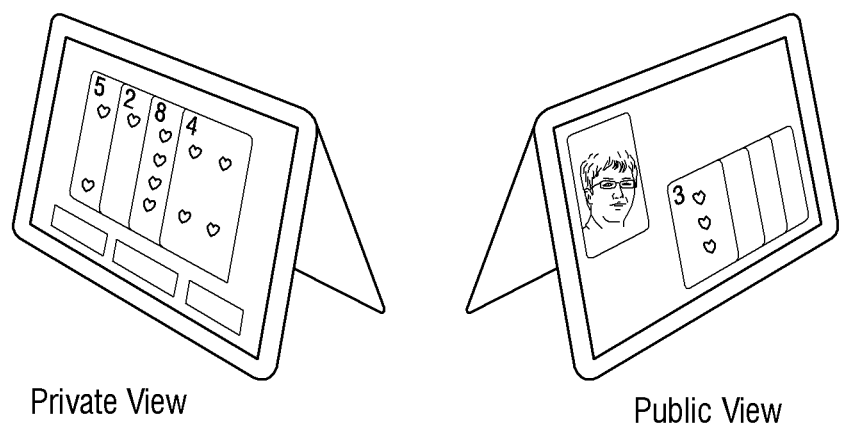
Private View   Public View
(a)
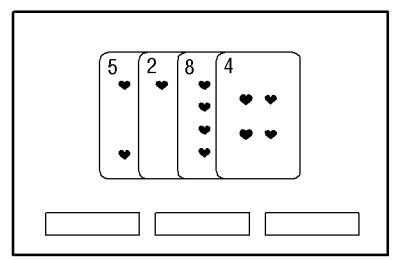
(b)
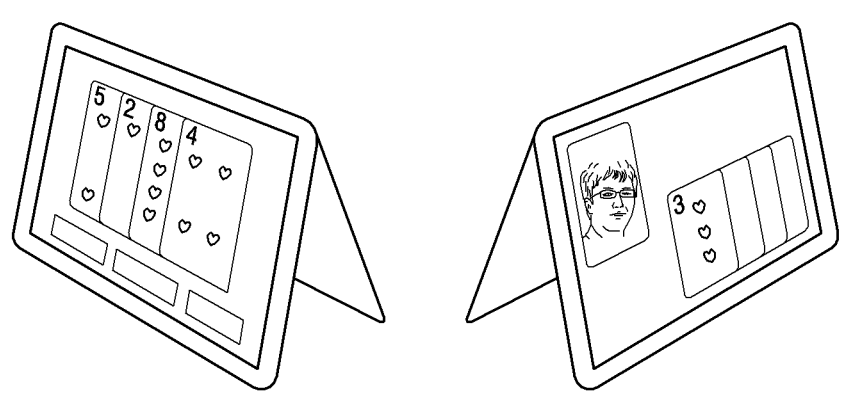

(a)          (b)

FIG. 60
(a) 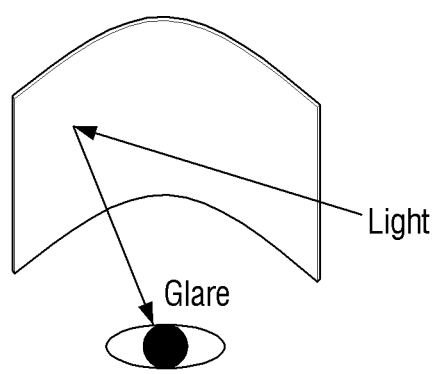
(b) 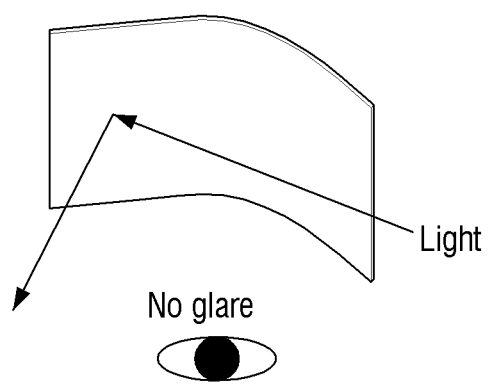

FIG. 62
(a) 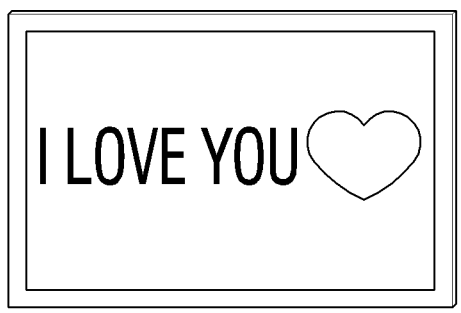
SENDER MOBILE PHONE
(b) 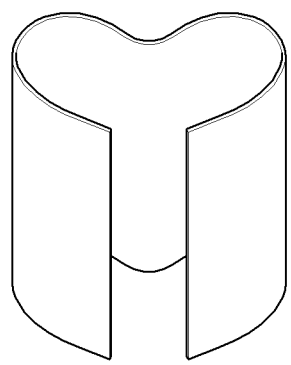
RECEIVER MOBILE PHONE

FIG. 63
(a)
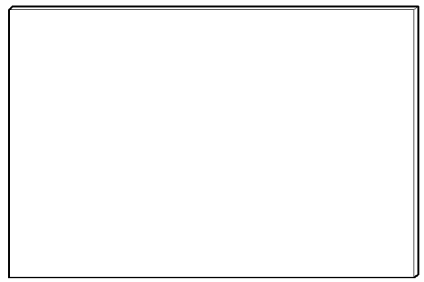
(b)
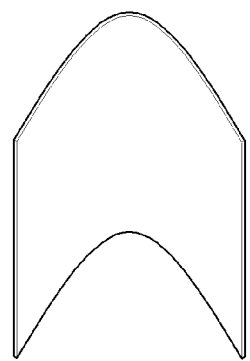
SHAPE FOR RECEIVING INCOMING
CALL OR MESSAGE FROM BROTHER
(d)
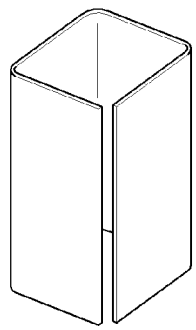
SHAPE FOR RECEIVING INCOMING
CALL OR MESSAGE FROM HUSBAND
(c)
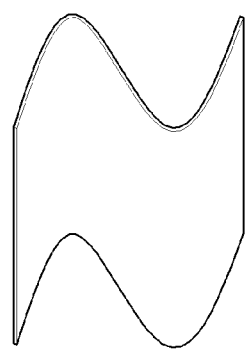
SHAPE FOR RECEIVING INCOMING
CALL OR MESSAGE FROM SON
(e)
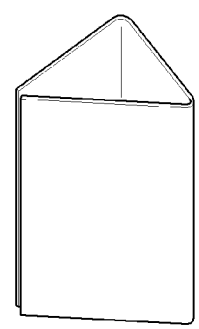
SHAPE FOR RECEIVING INCOMING
CALL OR MESSAGE FROM FRIEND 1

FLEXIBLE DISPLAY APPARATUS AND METHOD FOR CONTROLLING THEREOF

CROSS-REFERENCE TO RELATED APPLICATION

This application claims priority from Korean Patent Application No. 10-2012-0036471, filed on Apr. 8, 2012 in the Korean Intellectual Property Office, the disclosure of which is incorporated herein by reference in its entirety.

BACKGROUND

1. Field

Methods and apparatuses consistent with exemplary embodiments relate to a flexible display apparatus and a method for controlling thereof, and more particularly, to a flexible display apparatus that can provide a guide for deformation, and a method for controlling thereof.

2. Description of the Related Art

In recent years, display apparatuses having a flexible display, which can be deformed or have its shape changed, have been developed. Unlike a general flat panel display, the flexible display refers to a display that can be folded, bent, or otherwise deformed, like paper for example.

The flexible display apparatus can be deformed in various areas and in various directions.

Therefore, there is a need for a method for easily using a flexible display apparatus as an inputting means using characteristics of a flexible display.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

Aspects of the exemplary embodiments provide a flexible display apparatus and a method for controlling thereof.

According to an aspect of an exemplary embodiment, there is provided a method of controlling a flexible display apparatus, the method including: displaying a graphical user interface (GUI) guide on a display of the flexible display apparatus, the GUI guide indicating a deformation gesture associated with a function executed when the deformation gesture is performed.

The GUI guide may indicate a type of the deformation gesture.

The method may further include: detecting the deformation gesture, the deformation gesture deforming the flexible display apparatus; determining whether the detected deformation gesture corresponds to a predetermined deformation gesture and providing an output that indicates a result of the determining.

The output may include a feedback signal that indicates a similarity of the detected deformation gesture to the predetermined deformation gesture.

The method may further include, detecting the deformation gesture, the deformation gesture being a user manipulation that deforms the flexible display apparatus; determining whether the detected deformation gesture corresponds to a predetermined deformation gesture; and executing the function associated with the deformation gesture in response to determining that deformation gesture corresponds to the predetermined deformation gesture.

The deformation gesture may include at least one of a bending the flexible display apparatus, a rolling the flexible display apparatus, and a folding the flexible display apparatus.

The method may further include detecting the deformation gesture; determining a degree of deformation of the flexible display apparatus based on the deformation gesture; and determining the at least one of the bending the flexible display apparatus, the rolling the flexible display apparatus, and the folding the flexible display apparatus based on the degree of the deformation. The method may further include: determining whether a first portion of a surface of the flexible display apparatus and a second portion of the surface of the flexible display apparatus contact each other, and wherein the determining the at least one of the bending of the flexible display apparatus, the rolling of the flexible display apparatus, and the folding of the flexible display apparatus comprises determining the at least one of the bending of the flexible display apparatus, the rolling of the flexible display apparatus, and the folding of the flexible display apparatus based on (i) the degree of deformation of the flexible display apparatus and (ii) whether it is determined that the first portion and the second portion contact each other.

The deformation gesture may be a plurality of deformations of the flexible display apparatus.

The method may further include: displaying an application on the display, wherein the function is a function of the application; detecting the deformation gesture is performed; and executing the function of the application in response to detecting the deformation gesture is performed.

The method may further include: displaying an icon on the display, wherein the function is a function of an application associated with the icon; detecting the deformation gesture is performed; and executing the function of the application in response to detecting the deformation gesture is performed The method may further include: displaying an operating system of the flexible display apparatus on the display, wherein the function is a function of the operating system of the flexible display apparatus; detecting the deformation gesture is performed; and executing the function of the operating system in response to detecting the deformation gesture is performed.

According to an aspect of an exemplary embodiment, there is provided a flexible display apparatus including: a flexible display and a controller that displays a graphical user interface (GUI) guide on the flexible display, the GUI guide indicating a deformation gesture associated with a function executed when the deformation gesture is performed.

According to an aspect of an exemplary embodiment, there is provided a non-transitory computer-readable medium having embodied thereon a program for executing a method of controlling a flexible display apparatus, the method including: displaying a graphical user interface (GUI) guide on a display of the flexible display apparatus, the GUI guide indicating a deformation gesture associated with a function executed when the deformation gesture is performed.

According to aspects of the exemplary embodiments, at least one guide is provided so that user's convenience can be improved.

BRIEF DESCRIPTION OF THE DRAWINGS

The above and/or other aspects will be more apparent by describing in detail exemplary embodiments, with reference to the accompanying drawings, in which:

FIG. 27 is a view explaining a guide associated with at least one bending gesture and an application in the flexible display apparatus according to the first exemplary embodiment;

FIGS. 28 to 36 are views illustrating guides according to the first exemplary embodiment;

FIGS. 40 to 45 are views to explain a method for controlling of the flexible display apparatus according to the first exemplary embodiment;

FIGS. 46 and 47 are views to explain the method for controlling of the flexible display apparatus according to the first exemplary embodiment.

FIG. 51 is a view to explain an actuator;

FIGS. 52 to 54 are views to explain a method for controlling of the flexible display apparatus according to the second exemplary embodiment;

FIG. 60 is a view to explain a method for controlling of the flexible display apparatus according to the fifth exemplary embodiment;

FIGS. 62 and 63 are views to explain a method for controlling of the flexible display apparatus according to the sixth exemplary embodiment;

DETAILED DESCRIPTION OF EXEMPLARY EMBODIMENTS

Figure 1:
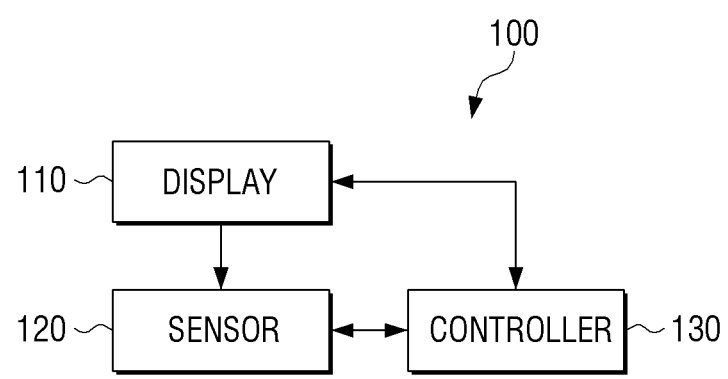
FIG. 1 is a block diagram illustrating a flexible display apparatus according to an exemplary embodiment.

Hereinafter, exemplary embodiments will be described with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a flexible display apparatus according to an exemplary embodiment. The display apparatus 100 of FIG. 1 may be embodied by various types of apparatuses, which are portable and have a display function, such as a mobile phone, a smart phone, a portable multimedia player (PMP), a personal digital assistant (PDA), a tablet PC, a navigation system, and the like. Also, the display apparatus 100 may be embodied by a stationary type apparatus, such as a monitor, a TV, a kiosk, and the like. Referring to FIG. 1, the flexible display apparatus 100 includes a display 110, a sensor 120, and a controller 130. Prior to explaining FIG. 1, a detailed configuration of the display 110 and a method for sensing deformation thereof will be explained in detail.

Figure 2:
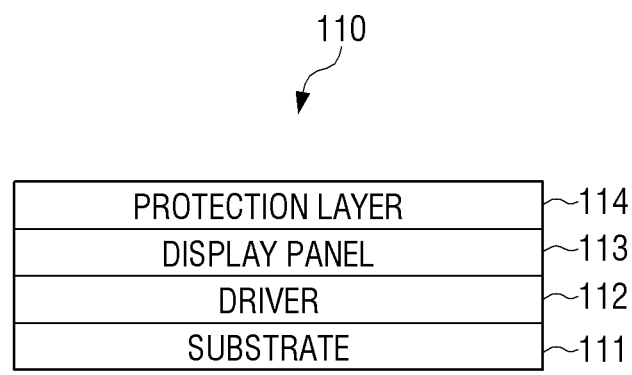
FIG. 2 is a view illustrating an example of a display having flexibility.

FIG. 2 is a view to explain a basic structure of the display of the flexible display apparatus according to an exemplary embodiment. Referring to FIG. 2, the display 110 includes a substrate 111, a driver 112, a display panel 113, and a protection layer 114.

The flexible display apparatus refers to an apparatus that can be deformed to be bent, crooked, folded or rolled like paper, while maintaining display characteristics of a flat panel display apparatus. Accordingly, the flexible display apparatus should be manufactured on a flexible substrate.

Specifically, the substrate 111 may be implemented using a plastic substrate (for example, a high molecular film), which is deformable under an external pressure.

The plastic substrate has a structure that is formed by performing barrier coating on opposite surfaces of a base film. The base film may be implemented by using various resins, such as polyimide (PI), polycarbonate (PC), polyethylenetherephtalate (PET), polyethersulfone (PES), polythylenenaphthalate (PEN), and fiber reinforced plastic (PRP). The barrier coating is performed on the opposite surfaces of the base film, and an organic membrane or an inorganic membrane may be used for the purpose of maintaining flexibility.

The substrate 111 may be formed of a flexible material, such as thin glass or metal foil besides the plastic substrate.

The driver 112 drives the display panel 113. Specifically, the driver 112 applies a driving voltage to a plurality of pixels of the display panel 113, which may be implemented by using a-si TFT, a low temperature poly silicon (LTPS) TFT, or an organic TFT (OTFT). The driver 112 may also be implemented in various forms according to the form of the display panel 113. For instance, the display panel 113 may consist of an organic light emitting substance that includes a plurality of pixel cells, and an electrode layer that covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented by using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). However, if the display panel 113 is embodied by the LCD, the display panel 113 cannot emit light by itself and thus requires a separate backlight unit. If the LCD does not use backlight, it uses ambient light. In order to use the LCD display panel 113 without the backlight unit, the LCD display panel 113 may be operated in an environment having a large amount of ambient light.

The protection layer 114 protects the display panel 113. For example, the protection layer 114 may be made of ZrO, CeO$_2$, or ThO$_2$. The protection layer 114 may be manufactured as a transparent film and may cover the entire surface of the display panel 113.

Unlike in FIG. 2, the display 110 may be implemented by using electronic paper (e-paper). The e-paper is a display that applies general ink characteristics to paper, and is different from a general flat panel display in that the e-paper uses reflected light. The electronic paper may change a picture or text using electrophoresis, which uses a twist ball or a capsule.

If the display 110 is comprised of elements made of a transparent material, the display 110 may be implemented as a display apparatus that is bendable and transparent. For example, if the substrate 111 is made of a polymer material, such as transparent plastic, if the driver 112 is implemented by using a transparent transistor, and if the display panel 113 is implemented by using a transparent organic light emitting layer and a transparent electrode, the display 110 may be transparent.

The transparent transistor refers to a transistor that is manufactured by substituting opaque silicon of an existing thin film transistor with a transparent material, such as zinc oxide or titanium oxide. The transparent electrode may be made of advanced materials, such as indium tin oxide (ITO) or graphene. Graphene refers to a material that has a planar structure of a honeycomb shape, in which carbon atoms are connected to one another, and has transparency. The transparent organic light emitting layer may be implemented by using various materials.

Figure 3:
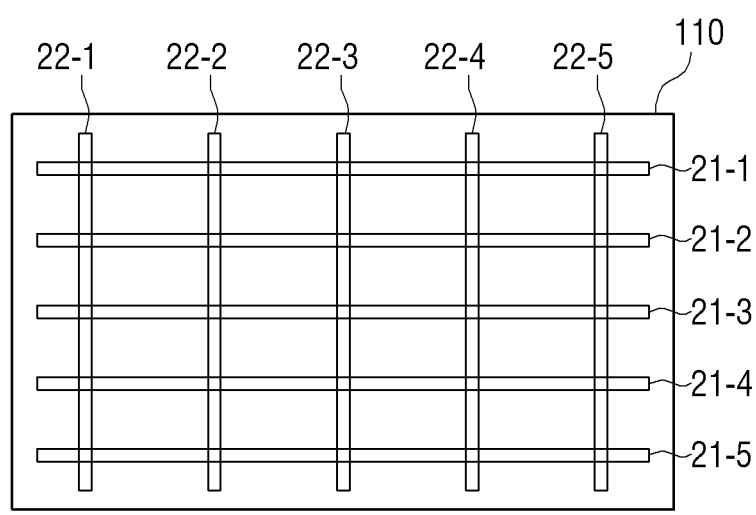
FIGS. 3 to 5 are views to explain an example of a method for sensing deformation of a flexible display apparatus according to an exemplary embodiment.
Figure 4:
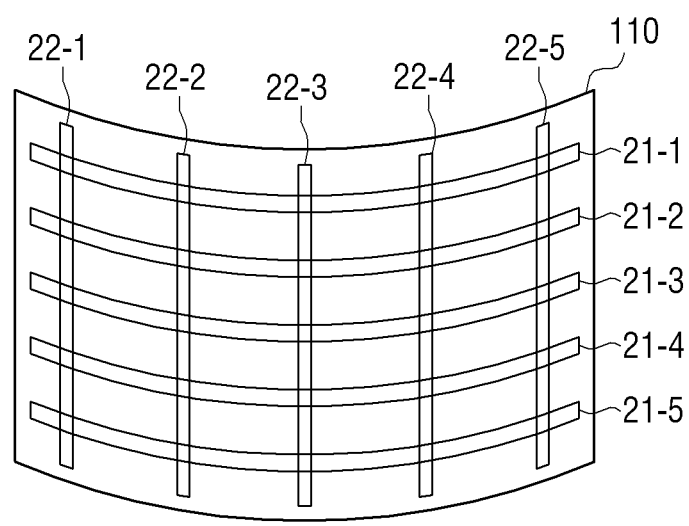
Figure 5:
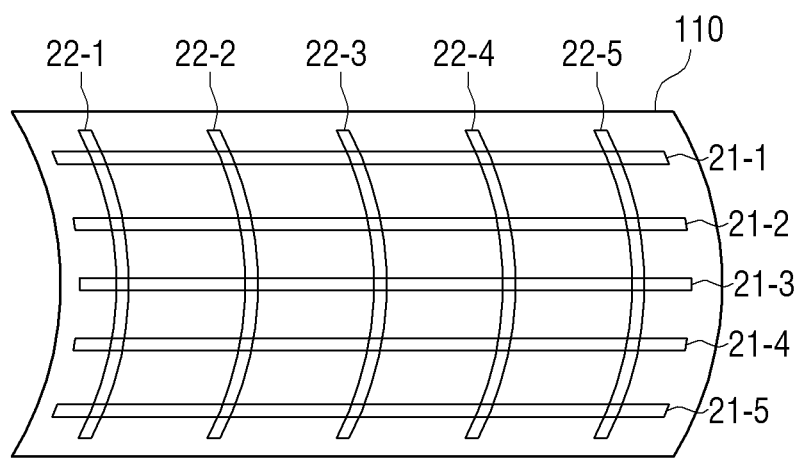

FIGS. 3 to 5 are views to explain a method for sensing shape deformation in the flexible display apparatus, according to an exemplary embodiment.

The flexible display apparatus 100 can be deformed by an external pressure and have its shape changed. The deformation may include any deformation that would be understood by the artisan of ordinary skill, such as "folding" and "rolling" of the display apparatus 100. Other types of deformation not otherwise described in detail herein are fully contemplated, such as twisting. Additionally, deformation may include "normal bending," which refers to a state in which the flexible display apparatus 100 is bent, but differs from folding and rolling states in that surfaces of the display apparatus 100 do not contact each other.

The folding state refers to a state in which the flexible display apparatus 100 is folded. The folding state and the normal bending state may be distinguished from each other by a degree of deformation. For example, if the deformation is more than a predetermined radius of curvature, the amount or degree of deformation is folding, and, if the deformation is less than the predetermined radius of curvature, the deformation is normal bending.

The rolling refers to a state in which the flexible display apparatus is rolled. The rolling is also determined based on a radius of curvature. For example, if the deformation is more than a predetermined radius of curvature continuously sensed over an area larger than a predetermined area, the deformation is rolling. On the other hand, if the deformation is more than a predetermined radius of curvature sensed in a relatively small area, the deformation is folding if surfaces contact each other or normal bending if the surfaces do not contact each other, as discussed above.

However, the definitions of the various shape deformation examples described above (folding, rolling, normal bending) are merely an example and shape deformation may be defined differently according to the type, size, weight, and characteristic of the flexible display apparatus. For example, if the flexible display apparatus 100 can be bent to such an extent that the surfaces are in contact with each other, the state in which the surfaces of the flexible display apparatus 100 are in contact with each other by bending may be defined as folding. On the other hand, a state in which a front surface and a rear surface of the flexible display apparatus are in contact with each other by bending may be defined as rolling.

For the convenience of explanation, various deformations are described above and will be generally referred to as deformation, unless otherwise specified.

The flexible display apparatus 100 may sense deformation in various ways.

For example, the sensor 120 may include a deformation sensor disposed on one surface, such as a front surface or a rear surface of the display 110, or a deformation sensor disposed on opposite surfaces of the display 110. The controller 130 may sense deformation using a value sensed by the deformation sensor of the sensor 120.

The deformation sensor refers to a sensor that can be deformed and has a resistance value that varies according to a degree of the deformation. The deformation sensor may be implemented using a strain gauge. The strain gage uses a metal or a semiconductor, in which resistance is greatly changed according to an applied force, and senses deformation of a surface of an object to be measured according to a change in the resistance value. It is common that a resistance of metal increases if the length of the metal is stretched by an external force, and the resistance of the metal decreases if the length is contracted. Accordingly, it is determined whether deformation is performed by sensing a change in the resistance value.

The sensor 120 may sense a resistance value of the deformation sensor using a level of a voltage applied to the deformation sensor or an intensity of a current flowing in the deformation sensor, and may sense deformation in a location of the deformation sensor according to the sensed resistance value.

In FIG. 3, the deformation sensor is embedded in the front surface of the display 110. However, this is merely an example and the deformation sensor may be embedded in the rear surface of the display 110, embedded in opposite surfaces, or any combination surfaces. Also, the shape, number, and location of the deformation sensors may be changed.

FIG. 3 illustrates an example of a plurality of bar-shaped deformation sensors arranged in a vertical direction and a horizontal direction in a grid pattern.

Referring to FIG. 3, the display 110 includes deformation sensors 21-1 to 21-5 arranged in a first direction, and deformation sensors 22-1 to 22-5 arranged in a second direction perpendicular to the first direction. The deformation sensors are disposed away from one another by a predetermined distance.

In FIG. 3, five deformation sensors (21-1 to 21-5, 22-1 or 22-5) are arranged in each of the horizontal direction and the vertical direction in a grid formation. However, this is merely an example and the number and arrangement of the deformation sensors may be changed according to a size of the flexible display apparatus 100. The deformation sensors are arranged in the horizontal direction and the vertical direction for sensing deformation over the entire area of the flexible display apparatus. If only a part of the flexible display apparatus is flexible or if the flexible display apparatus needs to sense deformation from only a part of the apparatus, the deformation sensor may be arranged in only a corresponding portion of the apparatus that requires deformation sensing.

Each of the deformation sensors 21-1 to 21-5, 22-1 to 22-5 may be implemented by using an electric resistance sensor, which uses an electric resistance, or a micro optical fiber sensor, which uses a strain of an optical fiber. Hereinafter, the deformation sensor will be explained on the assumption that the deformation sensor is the electric resistance sensor for the convenience of explanation.

Specifically, the flexible display apparatus 100 is deformed so that its center area, with reference to left and right edges, is oriented downwardly, as shown in FIG. 4. Tension caused by the deformation is exerted on the deformation sensors 21-1 to 21-5 arranged in the horizontal direction. Therefore, the resistance value of each of the deformation sensors 21-1 to 21-5 arranged in the horizontal direction is changed. The sensor 120 senses the change in the output value output from each of the deformation sensors 21-1 to 21-5 and determines that deformation is performed in the horizontal direction with reference to the center of a display surface. In FIG. 4, the center area is curved in a downward direction (hereinafter, referred to as a Z− direction) perpendicular to the display surface. However, even if the center area is curved in an upward direction (hereinafter, referred to as a Z+ direction) with reference to the display surface, the deformation may be sensed based on the change in the output values of the deformation sensors 21-1 to 21-5 arranged in the horizontal direction.

Also, the flexible display apparatus 100 is deformed so that the center area with reference to upper and lower edges is oriented upwardly, as shown in FIG. 5. Tension is exerted on the deformation sensors 22-1 to 22-5 arranged in the vertical direction. The sensor 120 may sense shape deformation in the vertical direction based on the output values of the deformation sensors 22-1 to 22-5 arranged in the vertical direction. Although the deformation in the Z+ direction is illustrated in FIG. 5, deformation in the Z− direction may also be sensed using the deformation sensors 22-1 to 22-5 arranged in the vertical direction.

If shape deformation occurs in a diagonal direction, tension is exerted on all of the deformation sensors. Therefore, the shape deformation of the diagonal direction may be sensed based on the output values of the deformation sensors arranged in both the horizontal and vertical directions.

Hereinafter, a method for sensing each shape deformation, such as normal bending, folding, and rolling, using a deformation sensor will be explained in detail.

Figure 6:
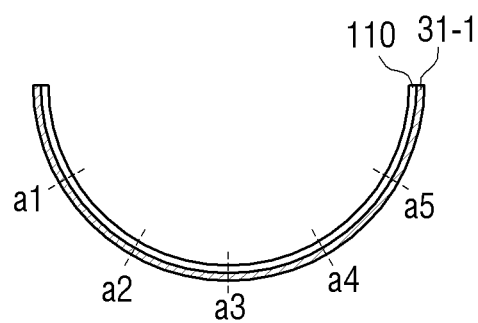
FIGS. 6 to 8 are views to explain an example of a method for sensing deformation using a deformation sensor in a flexible display apparatus.
Figure 7:
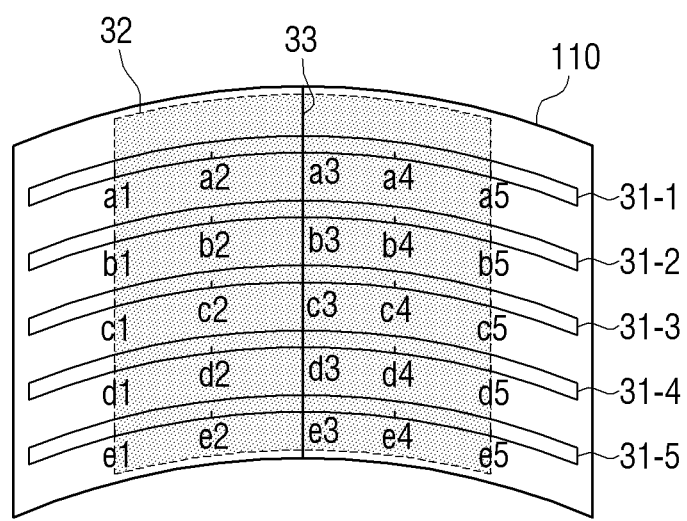
Figure 8:
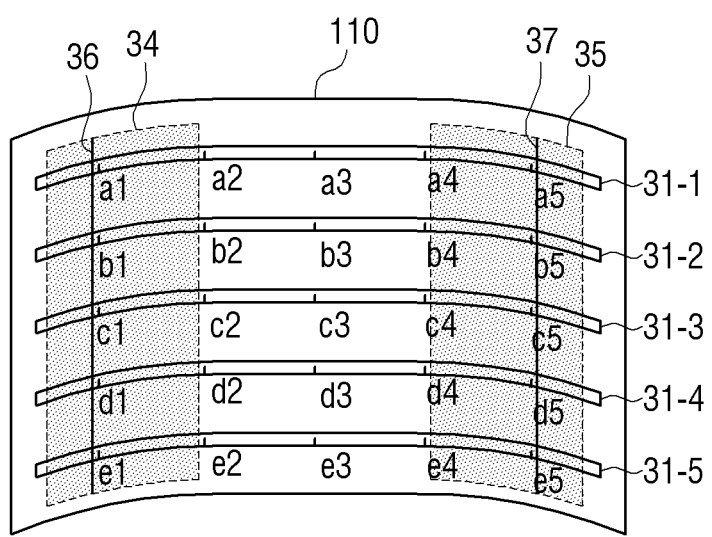

FIGS. 6 to 8 are views to explain a method for sensing bending deformation in the display apparatus using the deformation sensors according to an exemplary embodiment.

FIG. 6 is a cross section view of the flexible display apparatus 100 when the flexible display apparatus is deformed. As illustrated in FIG. 6, the display apparatus 100 may be deformed so as to be bent to the shape of a curve or arc.

If the flexible display apparatus 100 is deformed, the deformation sensors, which are arranged on one surface or opposite surfaces of the flexible display apparatus 100, are also deformed and have resistance values corresponding to a magnitude of exerted tension, and output values corresponding to the resistance values.

For instance, if the flexible display apparatus 100 is bent as shown in FIG. 6, a deformation sensor 31-1 disposed on a rear surface of the flexible display apparatus 100 is also bent and outputs a resistance value according to a magnitude of exerted tension.

In this case, the magnitude of the tension increases in proportion to a degree of deformation. If the deformation occurs as shown in FIG. 6, the greatest deformation occurs in the center area. Accordingly, the greatest tension is exerted to the deformation sensor 31-1 disposed at a point a3, which is the center area, and accordingly, the deformation sensor 31-1 has the greatest resistance value. On the other hand, the degree of bending gradually decreases toward outside edges of the display apparatus 100. Accordingly, the deformation sensor 31-1 has smaller resistance values as the distance from the point a3 towards points a2 and a1 or points a4 and a5 increases.

If the resistance value output from the deformation sensor has the greatest value at a specific point and gradually decreases in opposite directions, the sensor 120 may determine that the area having the greatest resistance value is the area in which the greatest amount of deformation occurs. Also, if an area has no change in the resistance value, the sensor 120 determines that the area is a flat area and, if an area has the resistance value changed greater than a predetermined value, determines that the area is a deformed area in which a degree of deformation occurs. As discussed above, the type of deformation may be determined, for example, from the degree of deformation and/or whether surfaces of the display apparatus 100 contact each other.

FIGS. 7 and 8 are views to explain a method for defining a bending area according to an exemplary embodiment. In FIGS. 7 and 8, the flexible display apparatus 100 is deformed in the horizontal direction with reference to the front surface, and thus FIGS. 7 and 8 do not illustrate the deformation sensors arranged in the vertical direction for the convenience of explanation. Although different reference numerals are used for the deformation sensors in each drawing, the deformation sensors illustrated in FIG. 3 may be used.

A bending area is an area in which the flexible display apparatus is bent. Since the deformation sensor is also bent by bending the flexible display apparatus 100, all points at which the deformation sensors output different resistance values from those in the original state may be defined as a bending area.

The sensor 120 may sense a size of a bending line, a direction of the bending line, a location of the bending line, and a number of bending lines based on a relationship between the points at which a change in the resistance value is sensed.

Specifically, if a distance between the points at which the change in the resistance value is sensed lies within a predetermined distance, the points are sensed as one bending area. On the other hand, if the distance between the points at which the change in the resistance value is sensed lies beyond the predetermined distance, different bending areas are defined with reference to these points. This will be explained in detail below with reference to FIGS. 7 and 8.

FIG. 7 is a view to explain a method for sensing one bending area. If the flexible display apparatus 100 is bent, as shown in FIG. 7, the resistance values from points a1 to a5 of a deformation sensor 31-1, from points b1 to b5 of a deformation sensor 31-2, from c1 to c5 of a deformation sensor 31-3, from points d1 to d5 of a deformation sensor 31-4, and from points e1 to e5 of a deformation sensor 51-5 are different from those in the original state.

In this case, the points at which the change in the resistance value is sensed in each deformation sensor 31-1 to 31-5 are located within a predetermined distance and are continuously arranged.

Accordingly, the sensor 120 senses an area 32, which includes all of the points, from points a1 to a5 of the deformation sensor 31-1, from points b1 to b5 of the deformation sensor 31-2, from points c1 to c5 of the deformation sensor 31-3, from points d1 to d5 of the deformation sensor 31-4, and from points e1 to e5 of the deformation sensor 31-5, as one bending area.

FIG. 8 is a view to explain a method for sensing a plurality of bending areas.

In FIG. 8, according to bending of the flexible display apparatus, the resistance values, from points a1 to a2 and from points a4 to a5 of the deformation sensor 31-1, from points b1 to b2 and from points b4 to b5 of the deformation sensor 31-2, from the points c1 to c2 and from points c4 to c5 of the deformation sensor 31-3, from the points d1 to d2 and from the points d4 to d5 of the deformation sensor 31-4, and from the points e1 to e2 and from the points e4 to e5 of the deformation sensor 31-5, are different from resistance values of the deformation sensors in an original state (i.e., a state in which the deformation sensors are not deformed).

The points a1 to a2 and the points a4 to a5 in the deformation sensor 31-1 are continuous with reference to each point. That is to say, a distance between the points a1 and a2 is less than a predetermined distance, such that the points a1 and a2 can be said to be continuous. Similarly, points a4 and a5 can be said to be continuous. However, since a point a3 exists between the points a2 and a4, such that the distance between the points a2 and a4 is larger than the predetermined distance, the points from a2 to a4 are not continuous to each other. Accordingly, if the points a2 and a4 are regarded as being disposed away from each other, by at least the predetermined distance, the bending area is determined to be multiple, separate bending areas: a first bending area of the deformation sensor 31-1 from the points a1 to a2 and a second bending area of the deformation sensor 31-1 from the points a4 to a5. Also, the bending areas of the other deformation sensors 31-2 to 31-5 may be determined in this way.

Accordingly, the flexible display apparatus 100 defines a first area 34 of the display 110 including all of the points, from a1 to a2 of the deformation sensor 31-1, from b1 to b2 of the deformation sensor 31-2, from c1 to c2 of the deformation sensor 31-3, from d1 to d2 of the deformation sensor 31-4, and from e1 to e2 of the deformation sensor 31-5, as one bending area of the display 110, and defines an area 35 including all of the points, from a4 to a5 of the deformation sensor 31-1, from b4 to b5 of the deformation sensor 31-2, from c4 to c5 of the deformation sensor 31-3, from d4 to d5 of the deformation sensor 31-4, and from e4 to e5 of the deformation sensor 31-5, as another bending area of the display 110.

The bending area may include a bending line. The bending line refers to a line that connects the points, at which the greatest resistance value is sensed, in each bending area.

For instance, in the case of FIG. 7, a line 33 in the bending area 32, which connects the point a3 at which the greatest resistance value is output in the deformation sensor 31-1, the point b3 at which the greatest resistance value is output in the deformation sensor 31-2, the point c3 at which the greatest resistance value is output in the deformation sensor 31-3, the point d3 at which the greatest resistance value is output in the deformation sensor 31-4, and the point e3 at which the greatest resistance value is output in the deformation sensor 31-5, is defined as a bending line. FIG. 7 illustrates the bending line which is formed in the center area of the display surface in the vertical direction.

In the case of FIG. 8, a line 36 in the bending area 34, which connects the point a1 at which the greatest resistance value is output in the deformation sensor 31-1, the point b1 at which the greatest resistance value is output in the deformation sensor 31-2, the point c1 at which the greatest resistance value is output in the deformation sensor 31-3, the point d1 at which the greatest resistance value is output in the deformation sensor 31-4, and the point e1 at which the greatest resistance value is output in the deformation sensor 31-5, is defined as one bending line. Also, a line 37 in the bending area 35, which connects the point a5 at which the greatest resistance value is output in the deformation sensor 31-1, the point b5 at which the greatest resistance value is output in the deformation sensor 31-2, the point c5 at which the greatest resistance value is output in the deformation sensor 31-3, the point d5 at which the greatest resistance value is output in the deformation sensor 31-4, and the point e5 at which the greatest resistance value is output in the deformation sensor 31-5, is defined as another bending line. That is, in FIG. 8, the two vertical bending lines are formed approximately at the left and right sides of the display surface.

Figure 9:
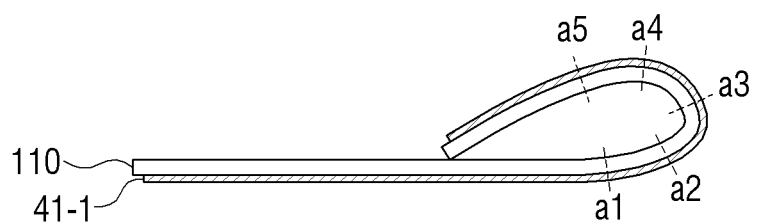
FIGS. 9 and 10 are views to explain an example of a method for sensing folding of a flexible display apparatus.
Figure 10:
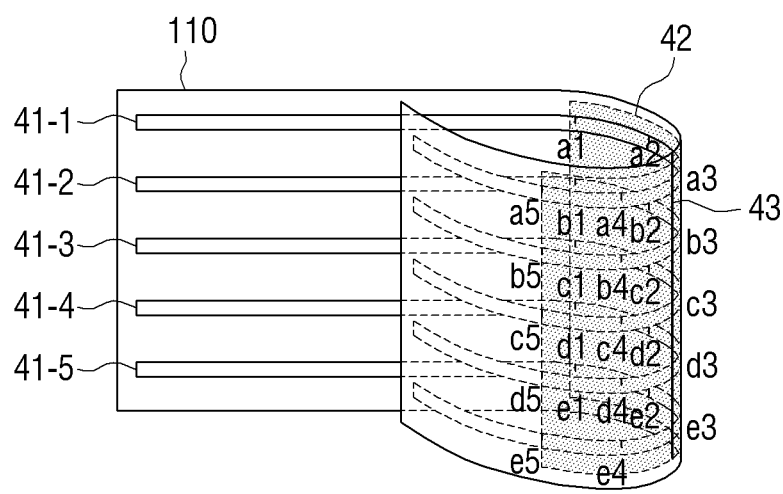

FIGS. 9 and 10 are views to explain an example of a method for sensing folding of the flexible display apparatus.

First, FIG. 9 is a cross section view of the flexible display apparatus 100 when the flexible display apparatus 100 is folded.

If the flexible display apparatus 100 is folded, a deformation sensor disposed on one surface or opposite surfaces of the flexible display apparatus 100 is also folded and has a resistance value corresponding to a magnitude of exerted tension.

For example, if the right edge of the flexible display apparatus 100 is folded in a direction toward the center, as shown in FIG. 9, a deformation sensor 41-1, which is disposed on the rear surface of the flexible display apparatus 100, is also folded and outputs a resistance value according to a magnitude of exerted tension.

That is, like in the case of bending, the deformation sensor 41-1 has the greatest resistance value at a point a3, at which the magnitude of the exerted tension is greatest, and has smaller resistance values as a distance from the point a3 increases. That is, the deformation sensor 41-1 has smaller resistance values at points a2 and a1 or points a4 and a5 than the resistance value at the point a3.

If the flexible display apparatus 100 is folded, such that the display apparatus 100 is deformed to a degree that is greater than a predetermined radius of curvature, a resistance value greater than a predetermined value is sensed at a point corresponding to a bending line. Accordingly, the controller 130 may determine whether the deformation is folding or normal bending according to a magnitude of the resistance value.

If the flexible display apparatus 100 is bendable to such an extent that their surfaces contact each other, the controller 130 may determine whether the deformation is folding, considering the contact of the surfaces as well. That is, if the right edge of the flexible display apparatus 100 is bent in the Z+ direction and is folded toward the front surface, as shown in FIG. 9, areas distanced away from each other are brought into contact with each other on the front surface of the flexible display apparatus. In this case, the contact is sensed in one area of the display surface and a change in the resistance value is greater than normal bending when the surfaces do not contact each other. Accordingly, the controller 130 calculates a distance from the edge where bending occurs to the bending line and, if contact is sensed at a point away from the bending line in the opposite direction by the calculated distance, determines that folding is performed.

FIG. 10 is a view to explain a method for determining a folding area according to an exemplary embodiment. Since FIG. 10 is to explain a case in which the flexible display apparatus is folded in the horizontal direction with reference to the front surface, deformation sensors arranged in the vertical direction are not illustrated for the convenience of explanation.

A folding area is an area that is formed when the flexible display apparatus is folded, and may be defined as one, or two or more, areas including all points of the deformation sensors that output resistance values different from resistance values of the original state. The method for defining the folding area, and similarly detecting that the folding area is plural areas, is the same as for the bending area, and thus a redundant explanation is omitted.

Referring to FIG. 10, an area 42, which includes all points at which output resistance values are different from those of the original state, that is, from points a1 to a5 of a deformation sensor 41-1, from points b1 to b5 of a deformation sensor 41-2, from points c1 to c5 of a deformation sensor 41-3, from points d1 to d5 of a deformation sensor 41-4, and from points e1 to e5 of a deformation sensor 41-5, is defined as one folding area.

The folding area is divided into two areas with reference to a folding line. The folding line refers to a line which connects points at which the greatest resistance value is output in each folding area. The meaning of the folding line is thus similar to the bending line.

In FIG. 10, a line 43 in the folding area 42, which connects the point a3 at which the deformation sensor 41-2 outputs the greatest resistance value, the point b3 at which the deformation sensor 41-2 outputs the greatest resistance value, the point c3 at which the deformation sensor 41-3 outputs the greatest resistance value, the point d3 at which the deformation sensor 41-4 outputs the greatest resistance value, and the point e3 at which the deformation sensor 41-5 outputs the greatest resistance value, is defined as the folding line.

If folding is sensed, the controller 130 may perform an operation different from an operation when the controller 130 determines that normal bending occurs. For example, the controller 130 may display a different content screen on each folding area.

As described above, the flexible display apparatus 100 may be rolled, for example like conventional paper. The controller 130 may determine whether rolling is performed using a result of sensing performed by the sensor 120.

Figure 11:
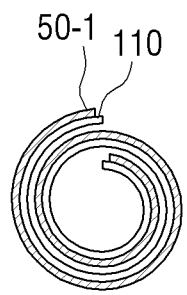
FIGS. 11 to 13 are views to explain a method for sensing rolling of a flexible display apparatus.
Figure 12:
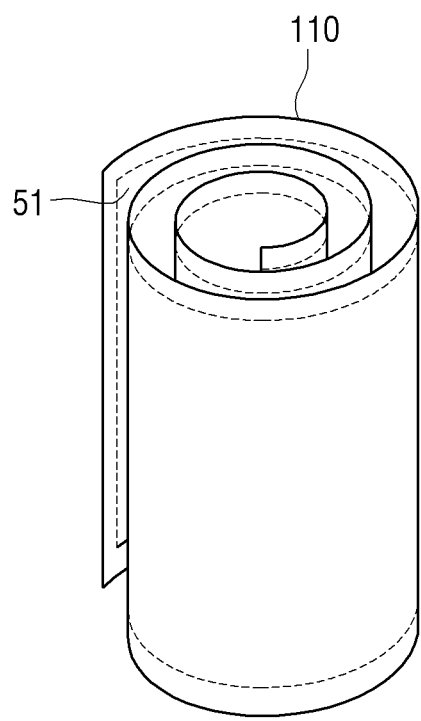
Figure 13:
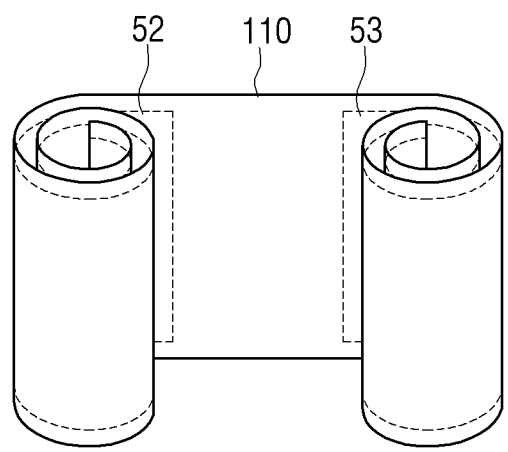

FIGS. 11 to 13 are views to explain a method for sensing rolling of the flexible display apparatus.

First, FIG. 11 illustrates a cross section view when the flexible display apparatus 100 is rolled.

As described above, if the flexible display apparatus 100 is rolled, tension is exerted on deformation sensors arranged on one surface or opposite surfaces of the flexible display apparatus.

In this case, since magnitudes of tension exerted to the deformation sensors are deemed to be similar within a predetermined range, resistance values output from the deformation sensors are also similar within a predetermined range.

In rolling, deformation should be performed to have a curvature greater than a predetermined curvature. If the rolling is performed, a bending area greater than that of normal bending or folding is formed. Accordingly, if deformation by more than a predetermined radius of curvature is performed continuously on an area greater than a predetermined size, the controller 130 determines that rolling is performed. Also, in the rolling state, the front surface and the rear surface of the flexible display apparatus may be brought into contact with each other. For example, as shown in FIG. 11, if one edge of the flexible display apparatus 100 is bent in the Z+ direction and is rolled inward the display surface, the display surfaces, that is, the front surface, and the rear surface on which a deformation sensor 50-1 is disposed are brought into contact with each other.

Accordingly, in another example, the controller 130 may determine whether the flexible display apparatus 100 is rolled according to whether the front surface and the rear surface of the flexible display apparatus 100 are brought into contact with each other. In this case, the sensor 120 may include a touch sensor. If the resistance values output from the deformation sensors are substantially similar, that is the resistance values are within a predetermined range, and touch is sensed by the touch sensors disposed on the front surface and the rear surface of the flexible display apparatus, the controller 140 determines that the flexible display apparatus is rolled.

FIGS. 12 and 13 are views to explain a method for defining a rolling area according to an exemplary embodiment.

The rolling area refers to an entire area of the flexible display apparatus that is rolled. Like normal bending or folding, the rolling area refers to one or two or more areas that include all points of deformation sensors having resistance values different from those of the original state. The method for defining and dividing the rolling area is similar to the bending or folding area, and thus a redundant explanation is omitted.

If the flexible display apparatus 100 is wholly rolled, as shown in FIG. 12, an entire area 51 of the flexible display apparatus 100 is defined as the rolling area. If the flexible display apparatus 100 is rolled in part and points at which different resistance values from those of the original state are output are distanced away from each other by a predetermined distance, as shown in FIG. 13, multiple rolling areas 52 and 53 of the flexible display apparatus 100 may be determined.

As described above, the flexible display apparatus 100 is deformed into various shapes and the controller 130 determines each deformation type based on a result of sensing by the sensor 120. Also, the controller 130 may determine a degree of bending, that is, a bending angle, based on a result of sensing by the sensor 120.

Figure 14:
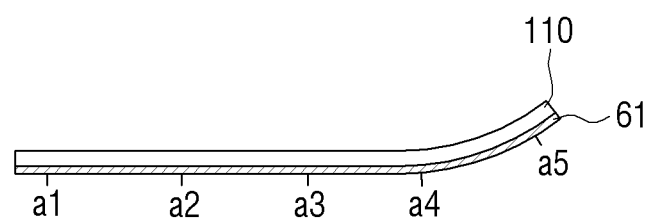
FIGS. 14 and 15 are views to explain a method for determining a degree of shape deformation in a flexible display apparatus.
Figure 15:
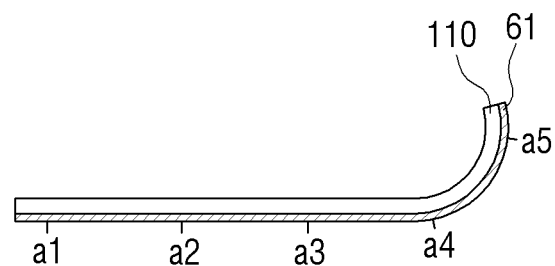

FIGS. 14 and 15 are views to explain a method for determining a degree of shape deformation in a flexible display apparatus.

Referring to FIGS. 14 and 15, the flexible display apparatus 100 determines a degree of deformation of the flexible display apparatus 100 using a change in the resistance value output from the deformation sensor at a predetermined interval.

Specifically, the controller 130 calculates a difference between a resistance value of a point where the greatest resistance value of a deformation sensor is output and a resistance value output at a point disposed away from the point of the greatest resistance value by a predetermined distance.

The controller 130 determines a degree of deformation using the calculated difference in the resistance values. Specifically, the flexible display apparatus 100 divides the degree of deformation into a plurality of levels, matches each level with a resistance value of a predetermined range, and stores the matched values.

Accordingly, the flexible display apparatus 100 determines the degree of bending according to which level of the plurality of levels corresponds to the calculated resistance value difference.

For instance, as shown in FIGS. 14 and 15, the degree of deformation is determined based on a difference between a resistance value output at a point a5, where a deformation sensor 61 disposed on the rear surface of the flexible display apparatus 100 outputs the greatest resistance value, and a resistance value output at a point a4, which is disposed away from the point a5 by a predetermined distance.

Specifically, a level corresponding to the resistance value difference, which is calculated in the exemplary embodiment of FIGS. 14 and 15, is identified from among the plurality of pre-stored levels, and a degree of deformation is determined based on the identified level. The degree of deformation may be represented by a bending angle or a bending intensity.

Since the degree of deformation illustrated in FIG. 15 is greater than that of FIG. 14, the difference between the resistance value output at the point a5 and the resistance value output at the point a4 in the exemplary embodiment of FIG. 15 is greater than the difference between the resistance value output at the point a5 and the resistance value output at the point a4 in the exemplary embodiment of FIG. 14. Accordingly, if the flexible display apparatus 100 is deformation as shown in FIG. 15, the controller 130 may determine that the degree of deformation is great.

The controller 130 may perform an appropriate operation according to a degree of deformation. For example, if the degree of deformation is great while a channel zapping operation is performed, the controller 130 may increase a channel zapping speed or may extend a channel zapping range. On the other hand, if the degree of deformation is low, the channel zapping is performed more slowly or within a smaller number of channels. Volume control or content conversion may be performed differently according to the degree of bending.

As described above, the flexible display apparatus 100 may be bent in different directions, a Z+ direction or a Z− direction.

The bending direction may be sensed in various ways. For instance, two deformation sensors may be disposed, one layered on the other and the bending direction is determined based on a difference in change in the resistance value of each bend sensor. A method for sensing a bending direction using overlapping deformation sensors will be explained with reference to FIGS. 16 to 18.

Figure 16:
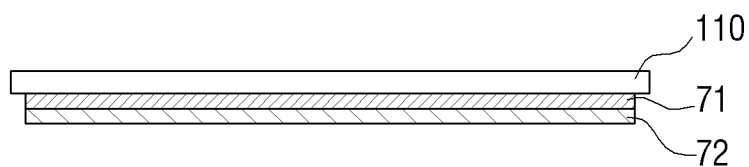
FIGS. 16 to 18 are views illustrating an example of a method for sensing a deformation direction in a flexible display apparatus.
Figure 17:
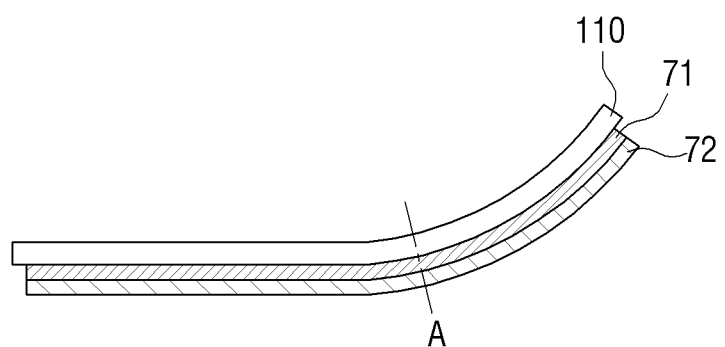
Figure 18:
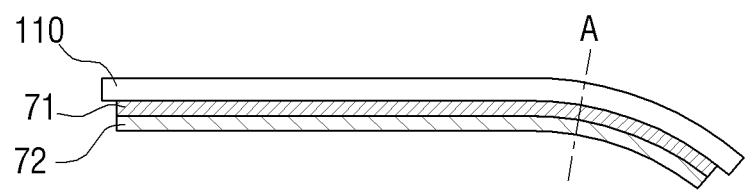

For the convenience of explanation, in FIGS. 16 to 18, it is presumed that normal bending of the display apparatus 100 is performed. However, the same method may be applied to states in which the display apparatus 100 is folded or rolled.

Referring to FIG. 16, two deformation sensors 71 and 72 may be disposed overlapping each other on one side of the display 110. In this case, if normal bending is performed in one direction, different resistance values are output from the upper deformation sensor 71 and the lower deformation sensor 72 at a point where the normal bending is performed. Accordingly, a bending direction may be determined by comparing the resistance values of the two deformation sensors 71 and 72 at the same point on both deformation sensors 71 and 72.

Specifically, if the flexible display apparatus 100 is bent in the Z+ direction, as shown in FIG. 17, tension exerted to the lower deformation sensor 72 is greater than that of the upper deformation sensor 71 at a point 'A' on the deformation sensors 71 and 72 corresponding to a bending line.

On the other hand, if the flexible display apparatus 100 is bent toward the rear surface, as shown in FIG. 18, tension exerted to the upper deformation sensor 71 is greater than that of the lower deformation sensor 72.

Accordingly, the controller 130 senses the bending direction by comparing the resistance values of the two deformation sensors 71 and 72 at the point A on the deformation sensors 71 and 72.

Although the two deformation sensors are disposed overlapping each other on one side of the display 110 in FIGS. 16 to 18, the deformation sensors may be disposed on opposite surfaces of the display 110.

Figure 19:
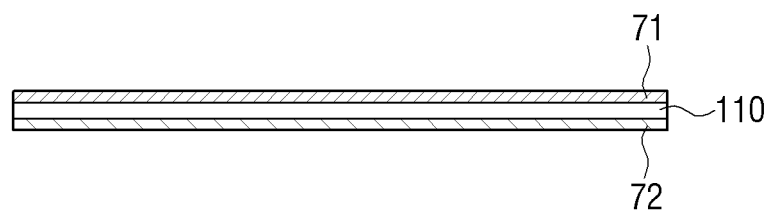
FIGS. 19 to 21 are views illustrating various examples of a structure to sense deformation of a flexible display apparatus.

FIG. 19 illustrates the two deformation sensors 71 and 72 disposed on the opposite surfaces of the display 110.

Accordingly, if the flexible display apparatus 100 is deformed in a first direction perpendicular to the screen, that is, the Z+ direction, the deformation sensor disposed on a first surface of the display 110 is subject to a compressive force, whereas the deformation sensor disposed on a second surface is subject to tension. On the other hand, if the flexible display apparatus 100 is bent in a second direction opposite to the first direction, that is, the Z− direction, the deformation sensor disposed on the second surface is subject to a compressive force, whereas the deformation sensor disposed on the first surface is subject to tension. As described above, the different values are detected from the two deformation sensors according to the bending direction and the controller 130 determines the bending direction according to a detection characteristic of the value.

Although the bending direction is sensed using the two deformation sensors in FIGS. 16 to 19, the bending direction may be sensed by means of only a strain gage disposed on one surface of the display 110. That is, a compressive force or tension is exerted to the strain gage disposed on one surface according to a bending direction, and a bending direction can be determined by identifying a characteristic of the output value.

Figure 20:
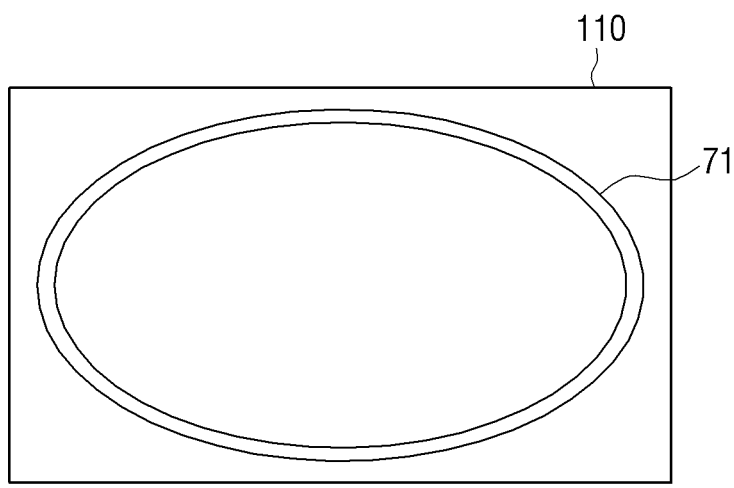

FIG. 20 is a view illustrating an example of a single deformation sensor disposed on one surface of the display 110 to sense deformation. Referring to FIG. 20, a deformation sensor 71 may be implemented in a form of a looped curve forming a circle, a quadrangle, or other polygons, and may be disposed throughout or along an edge of the display 110. The controller 130 may determine a point, at which a change in an output value of the looped curve is sensed, to be a bending area. The deformation sensor may be connected to the display 110 in a form of an open curve, such as an S shape, a Z shape, or a zigzag shape.

Figure 21:
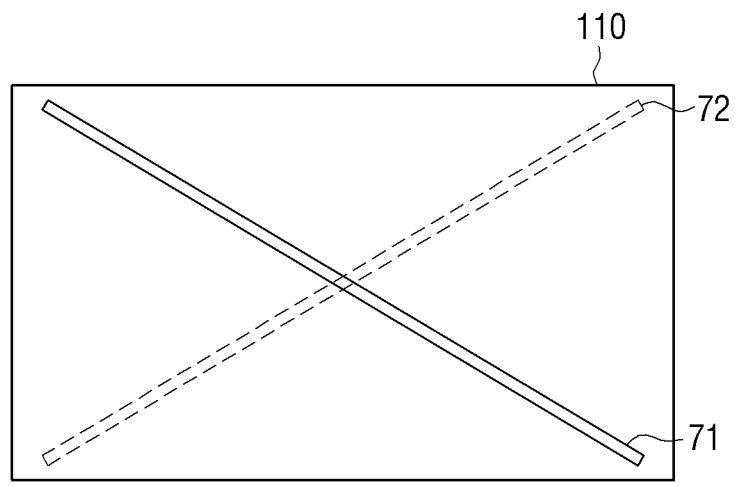

FIG. 21 is a view illustrating two intersecting deformation sensors. Referring to FIG. 21, a first deformation sensor 71 is disposed on a first surface of the display 110 and a second deformation sensor 72 is disposed on a second surface of the display 110. The first deformation sensor 71 is disposed on the first surface of the display 110 in a first diagonal direction, and the second deformation sensor 72 is disposed on the second surface in a second diagonal direction. Accordingly, output values and output points of the first and second deformation sensors 71 and 72 are changed according to various deformation conditions, such as a case in which each corner is bent, a case in which each edge is bent, a case in which a center is bent, and a case in which folding or rolling is performed. Accordingly, the controller 130 may determine which type of bending is performed according to a characteristic of the output value.

Although line type deformation sensors are used in the above-described various exemplary embodiments, deformation may be sensed using a plurality of separate strain gages.

Figure 22:
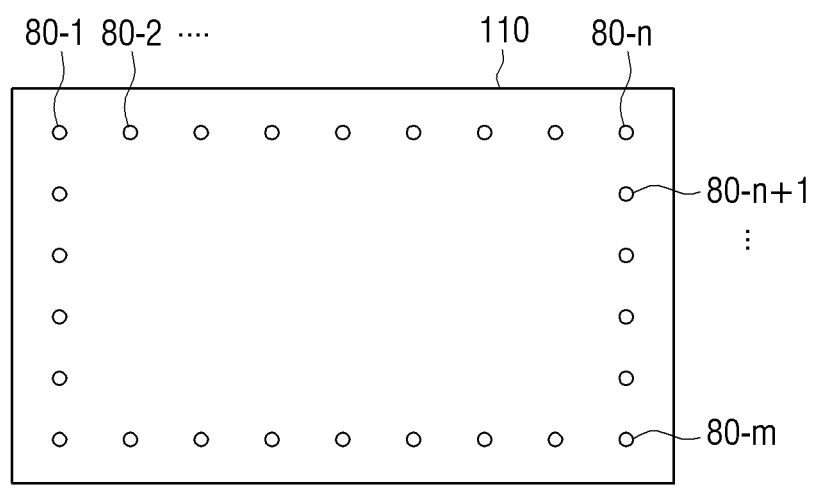
FIG. 22 is a view illustrating another example of a structure to sense deformation of a flexible display apparatus.
Figure 23:
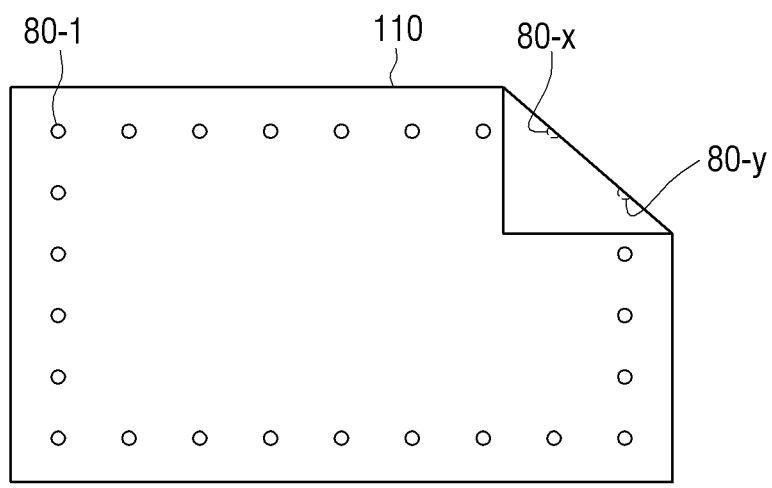
FIG. 23 is a view to explain a method for sensing deformation using the structure of FIG. 22.

FIGS. 22 and 23 are views to explain a method for sensing deformation using a plurality of strain gages.

Referring to FIG. 22, a plurality of strain gages (80-1, 80-2, . . . ) are arranged along an edge of the display 110. The number of strain gages may be changed according to a size and a shape of the display 110, or a predetermined deformation sensing resolution.

In the state in which the strain gages are arranged as shown in FIG. 22, a user may bend a certain portion of the display 110 in a certain direction. For example, if the display 110 is deformed at a corner, as shown in FIG. 23, a force is exerted on a strain gage 80-x on a bending line of the deformation. Accordingly, an output value of the corresponding strain gage 80-x increases in comparison with output values of the other strain gages (80-1, 80-2, . . . ) arranged in a horizontal direction. Also, a force is exerted to a strain gage 80-y on the bending line of the deformation. The output value of the strain gage 80-y increases in comparison with values output from other strain gages 80-n, 80-n+1 to 80-m arranged in a vertical direction. The controller 130 determines a line connecting the two strain gages 80-x and 80-y having the increased output values as the bending line.

Also, in addition to the exemplary embodiments of FIGS. 17 to 23, the flexible display apparatus 100 may sense a deformation direction using various sensors, such as a gyro sensor, a geomagnetic sensor, and an acceleration sensor.

Figure 24:
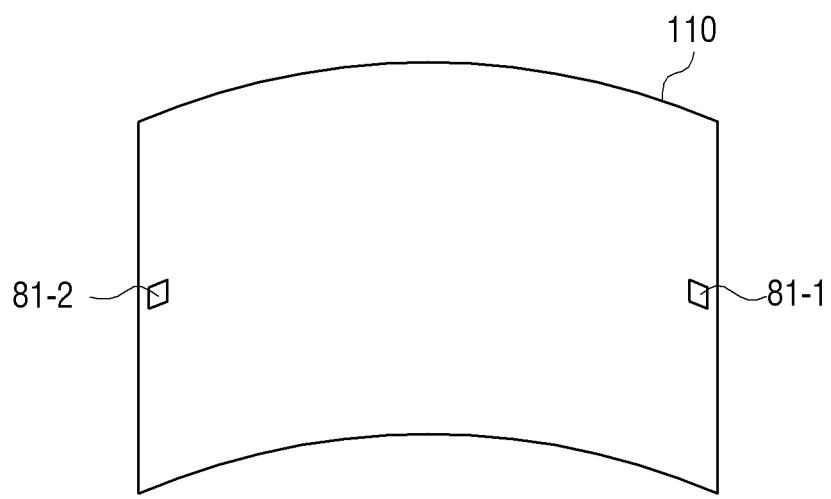
FIGS. 24 and 25 are views illustrating another example of a method for sensing a deformation direction in a flexible display apparatus.
Figure 25:
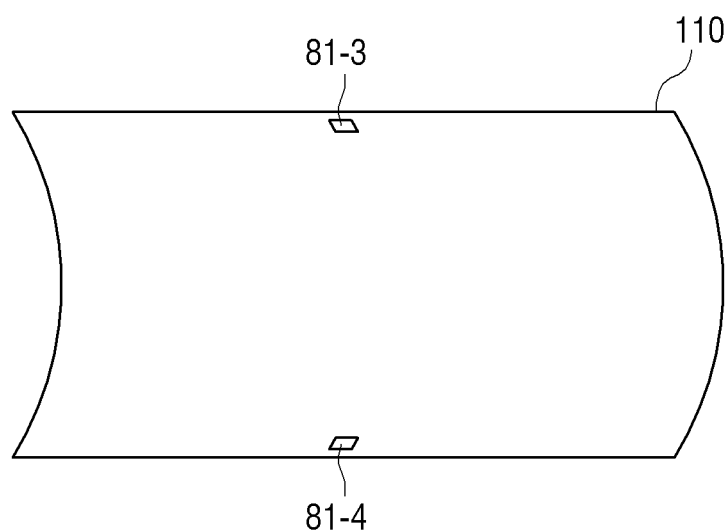

FIGS. 24 and 25 are views to explain a method for sensing a deformation direction using an acceleration sensor, for example. Referring to FIGS. 24 and 25, the flexible display apparatus 100 includes a plurality of acceleration sensors 81-1 and 81-2.

The acceleration sensors 81-1 and 81-2 can measure acceleration of a motion and a direction of the acceleration. Specifically, the acceleration sensors 81-1 and 81-2 output a sensing value indicating an increase of force that changes according to a slope of an apparatus to which the acceleration sensors 81-1 and 81-2 are attached. Accordingly, if the acceleration sensors 81-1 and 81-2 are disposed on opposite edges of the flexible display apparatus, output values sensed by the acceleration sensors 81-1 and 81-2 are changed when the flexible display apparatus 100 is deformed. The controller 130 calculates a pitch angle and a roll angle of the flexible display apparatus 100 using the output values sensed by the acceleration sensors 81-1 and 81-2. Accordingly, the controller 130 may determine a deformation direction based on changes in the pitch angle and the roll angle of the flexible display apparatus 100 sensed by the acceleration sensors 81-1 and 81-2.

In FIG. 24, the acceleration sensors 81-1 and 81-2 are disposed on opposite edges in the horizontal direction with reference to the front surface of the flexible display apparatus 100. However, the acceleration sensors 81-3 and 81-4 may be disposed in the vertical direction, as shown in FIG. 25. In this case, if the flexible display apparatus 100 is deformed in the vertical direction, a deformation direction is sensed according to measurement values sensed by the acceleration sensors 81-3 and 81-4 in the vertical direction.

In FIGS. 24 and 25, the acceleration sensors are disposed on the left and right edges or the upper and lower edges of the flexible display apparatus 100. However, the acceleration sensors 81-1 to 81-4 may be disposed all of the left, right, upper and right edges or may be disposed on corners.

As described above, a deformation direction may be sensed using a gyro sensor, a geomagnetic sensor, or the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed, and thus a deformation direction can also be sensed. The geomagnetic sensor refers to a sensor which senses azimuth using a 2-axis or 3-axis fluxgate. If such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various deformation characteristics such as a bending area and a bending direction can be determined.

As described above, the flexible display apparatus 100 may sense deformation using various kinds of sensors. The above-described methods for arranging the sensors and methods for sensing may be individually applied to the flexible display apparatus 100 or may be applied in combination with each other to the flexible display apparatus 100.

The sensor 120 may sense user's touch manipulation on a screen of the display 110, in addition to detecting the deformation.

For instance, the sensor 120 may include a transparent conductive oxide film, such as an indium-tin oxide (ITO) deposited on the substrate 11 of the display 110, and a film formed on an upper portion of the transparent conductive oxide film. Accordingly, if the user touches the screen, upper and lower plates at the touched point are brought into contact with each other and an electric signal is transmitted to the controller 130. The controller 130 recognizes the touched point using coordinates of an electrode to which the electric signal is transmitted. The touch sensing method is omitted for brevity.

If touch or deformation is sensed, the controller 130 determines whether user manipulation, such as the touch or deformation, is intended. Hereinafter, a detailed configuration of the display 110 and a method for sensing deformation of the display 110 according to various exemplary embodiments will be explained.

First Exemplary Embodiment

The display 110 displays an image. Specifically, the display 110 may display at least one application icon on the display 110 as part of a graphical user interface (GUI), an application driving screen, and a guide as to at least one deformation gesture for executing an application corresponding to a selected application icon. The display 110 may provide a guide as to at least one deformation gesture for performing a predetermined function of a driven application. In other words, if an icon is displayed, the deformation gesture may be a detected as a command to execute the application corresponding to the deformation gesture, and hence the application may be executed according to a user's deformation of the display 110. Since folding and rolling are performed only if bending is performed, the bending deformation recited herein is defined as including a folding gesture and a rolling gesture.

The sensor 120 may sense a deformation gesture, such as a bending gesture in the case the user bends the flexible display apparatus 100. The sensor 120 may be implemented by using various types of bend sensors, and arrangement of the bend sensors and a sensing method thereof have been described above and thus a redundant explanation is omitted.

The controller 130 controls an overall operation of the flexible display apparatus 100. Specifically, the controller 130 may control the display 110 and the sensor 120 in whole or in part.

In particular, the controller 130 may provide a guide as to at least one deformation gesture for driving a selected application. The guide may be a GUI displayed on the display 110.

Specifically, the controller 130 may determine whether to drive execution of an application corresponding to a selected application icon in response to detecting the deformation gesture.

If it is determined that it is necessary to deform the flexible display apparatus 100, the controller 130 may provide a guide as to at least one deformation gesture for executing the selected application. For example, in order to launch execution of a Jenga game application, the flexible display apparatus 100 should have its shape changed to a square pillar shape. Accordingly, the controller 130 may determine that a user should change the shape of the flexible display apparatus 100 to the square pillar shape to execute the Jenga game application, the controller 130 may provide a guide instructing the user to change the configuration of the flexible display apparatus 100 to the square pillar shape. If the square pillar shape is detected, the controller 130 executes the Jenga application corresponding to the square pillar shape.

Also, if a user's deformation gesture for bending the flexible display apparatus 100 is sensed by the sensor 120 and the sensed bending gesture is determined to be a predetermined bending gesture for driving an application corresponding to a selected application icon, the controller 130 may drive the application corresponding to the selected application icon. Using the above Jenga game for example, if the shape of the flexible display apparatus 100 deformed by the user's deformation gesture is a predetermined shape for executing the Jenga game application, the controller 130 may execute the Jenga game application.

Also, if a plurality of user deformation gestures for bending the flexible display apparatus are sensed by the sensor 120 and it is determined that the flexible display apparatus 100 has its shape changed to a predetermined shape using the plurality of deformation gestures, the controller 130 may drive an application corresponding to a selected application icon. Using the above Jenga game for example, the user may repeat the deformation gesture of bending and unbending according to the guide. In this case, if the shape of the flexible display apparatus deformed by the user's deformation gesture is a predetermined shape for executing the Jenga game application, the controller 130 may execute the Jenga game application.

Also, it may be unnecessary to deform the flexible display apparatus 100 to execute an application, and thus the controller 130 may not provide a guide and may conventionally execute an application corresponding to a selected application icon. For example, to execute a social network service (SNS) application, shape deformation of the flexible display apparatus 100 may not be set. In this case, the controller 130 may drive a selected SNS application without providing a separate guide, such as when a user selects the SNS application icon using a touch input.

The controller 130 may provide a guide as to at least one deformation gesture in order for an active application to perform a predetermined function of the application.

Specifically, the controller 130 may associate a deformation of the flexible display apparatus 100 with an application to perform a predetermined function within the application.

If it is determined that an active application may be controlled by deformation of the flexible display apparatus 100, the controller 130 may provide a guide as to at least one deformation gesture for performing a predetermined function of the active application. For example, if a piano application is active, the display 110 may display piano keys. To change between the piano keys to a music screen within the piano application, the controller 130 may provide a guide as to at least one deformation gesture for deforming the flexible display apparatus 100 to display the music screen. In response to detecting the deformation gesture associated with the music screen, the controller displays the music screen.

If a user's deformation gesture for deforming the flexible display apparatus is sensed by the sensor 120 and the sensed deformation gesture is determined to be a predetermined gesture for an application, the controller 130 may control the application to perform a predetermined function associated with the detected deformation gesture. Using the above piano application for example, if the shape of the flexible display apparatus 100 deformed by the user's gesture is a predetermined shape for providing a music function of the piano application, the controller 130 may provide the music function in response to detecting the deformation gesture associated with the music function.

Also, if a plurality of user deformation gestures for bending the flexible display apparatus 100 are sensed by the sensor 120 and it is determined that the flexible display apparatus 100 has its shape changed to a predetermined shape using the plurality of deformation gestures, the controller 130 may control a driven application to perform a predetermined function associated with at least one of the plurality of deformation gestures. Using the above piano application for example, the user may repeat the deformation gesture of bending and unbending according to the guide. However, if the shape of the flexible display apparatus 100 deformed by the user's bending gestures is a predetermined shape for providing the music function in the piano application, the controller 130 may provide the music function on one area in response to detecting the bending gesture of the music function. Also, the controller 130 may perform a different operation or the same operation according to a number of repetitions of the bending gesture. For example, if bending is performed once, a page may be changed, if bending is performed two times, a content may be changed, and, if bending is performed three times, an application may be changed. If the shape of the flexible display apparatus 100 deformed by the deformation gesture performed once, two times, or three times is the same, a function may be performed according to the shape.

The controller 130 may perform a different operation or the same operation according to whether a deformation gesture sensed by the sensor 120 is a sequential deformation gesture or a simultaneous deformation gesture. The sequential deformation gesture refers to a gesture of bending according to a first guide and then sequentially bending according to a second guide. In other words, an operation may be associated with a sequence of deformation gestures. The simultaneous bending gesture refers to a deformation gesture according to the first guide and deformation according to the second guide. In other words, an operation may be associated with a combination of simultaneous deformation gestures. In this case, even if the shape of the flexible display apparatus 100 after deformation by the sequential deformation gesture and the simultaneous deformation gesture is the same, if the deformation gesture is the sequential deformation gesture, a first function is performed based on the sequential nature of the bending gesture, and, if the deformation gesture is the simultaneous deformation gesture, a second function is performed based on the simultaneous nature of the bending gesture. Also, if the shape of the flexible display apparatus 100 after deformation by the sequential deformation gesture and the simultaneous deformation gesture is the same, the controller 130 may perform a same function regardless of whether the deformation gesture is the sequential deformation gesture or the simultaneous deformation gesture based on the shape of the flexible display apparatus 100 after either of the deformations.

The controller 130 may provide a guide corresponding to a type of content. For example, if the content is gallery of pictures or a movie, the controller 130 may provide a guide so that the user can see screen optimized for viewing the gallery or movie. In this case, the controller 130 may provide a guide according to resolution information of the gallery or movie for providing the optimized viewing screen. Also, if a type of active application is a game, the controller 130 may provide a guide for optimizing the user's interaction with the game. In this case, the controller 130 may provide a guide according a type of the game. For example, if the game is an airplane game, the controller 130 may provide a guide instructing the user to deform the flexible display apparatus 100 into a roll shape optimized for playing the airplane game.

The controller 130 may provide a guide for instructing the user to grip the flexible display apparatus 100 according to a type of a content.

If a notification or a really simple syndication (RSS) is received, the controller 130 may provide a guide for displaying the notification. For example, if a text message is received from another user, the controller 130 may provide a guide instructing the user to deform the flexible display apparatus 100 to check the text message.

The controller 130 may provide guides associated with some or all of the functions available in an active application. Further, the controller 130 display functions mapped onto the guides.

Also, if a user's deformation gesture for deforming the flexible display apparatus is sensed by the sensor 120, the controller 130 may compare the sensed deformation gesture and a predetermined gesture for an active application, and may provide a result of the comparing.

The result of the comparing may be providing feedback on the accuracy of the sensed deformation gesture, such as the similarity or dissimilarity of the deformation gesture input by the user to one or more deformation gestures recognized by the processor 130. The feedback on the accuracy of the sensed bending gesture may be feedback on success of the deformation gesture, failure of the deformation gesture, and completeness of the deformation gesture. The feedback may be output using any method, such as haptic feedback (such as vibration), sound feedback (audio output), and graphic user interface (GUI) feedback (such as a pop-up window, for example indicating the successful or unsuccessful input of the deformation gesture). If it is determined that the sensed deformation gesture is not a recognized deformation gesture, the controller 130 may provide the user with vibration feedback (the vibration feedback includes partial vibration feedback given to only an area to be bent and whole vibration feedback given to the whole area), a sound indicating that a 'Bending area is wrong', or a pop-up window in a text form. Also, if it is determined that the sensed deformation gesture is the predetermined gesture, the controller 130 may provide vibration feedback, a sound indicating 'Bending area is correct', or a pop-up window of a text form. In this case, the controller 130 may provide a guide for instructing the user to enter a correct deformation gesture.

If it is determined that the sensed deformation gesture is the predetermined gesture and an operation corresponding to the deformation gesture is performed, the controller 130 may not display the guide, and thus the user may be informed that an operation corresponding to the bending gesture is being performed.

Accordingly, the user can easily know whether the deformation gesture is correctly performed.

The guide may be provided in at least one form of a guide displayed as a bending/folding line, a guide that displays a bending/folding direction, a guide that displays rolling, a guide provided through haptic feedback, and an explanation guide regarding shape deformation. If the flexible display apparatus 100 is equipped with an actuator, the guide may be a guide for guiding a deformation operation by displaying motion at a location where deformation will be performed.

Specifically, a guide that displays a bending/folding line may be represented by various lines. For example, a dotted line or a solid line may be used. Also, different lines may be associated with a bending area and a folding area. For example, the dotted line may be associated with the bending area and the solid line may be associated with the folding area. The bending/folding line may be different in color or thickness, so that the bending/folding line is associated with the bending area or the folding area, or mapped onto a bend/folding angle, or a bending/folding direction.

For example, a bending line may be displayed as a black line and a folding line may be displayed as a red line. Also, a black line may be associated with a bending/folding line corresponding to a bending/folding gesture for deforming the flexible display apparatus 100 in a direction towards the user, and a red line may be associated with a bending/folding line corresponding to a bending/folding gesture for deforming the flexible display apparatus 100 in a direction away from the user. Also, a bending area corresponding to a 60° bending gesture may be displayed as a black line, and a bending area corresponding to a 30° bending gesture may be displayed as a red line. However, the above examples should not be considered as limiting and the bending/folding line may be associated with various combinations of lines, colors, line types such that deformation guides for a deformation gestures may be displayed distinguishably from each other. Also, the bending/folding line may be represented by light. For example, continuously shining light (light without flickering) may associated with a bending area, and flickering light may be associated with a folding line.

A guide that displays a bending/folding direction may be represented by various signs such as an arrow. For example, a bending/folding direction may be displayed using a directional arrow.

A guide for the rolling deformation may be represented by various signs. For example, the rolling deformation guide may be represented by an arrow, text, or line indicating a rolling operation.

A guide that is provided through haptic feedback may be provided in a form of vibration on an area including a bending/folding line.

An explanation guide describing shape deformation may be provided in a form of text, sound, or moving image. For example, a text explanation saying "Please bend inwards along the dotted line by 60° and bend outwards along the solid line by 30° !" may be provided. Also, a sound explanation or a moving image explanation explaining bending/folding/rolling operations may be provided.

The guide may display an additional operation that should be performed along with the bending gesture or after the bending gesture. For example, the guide may be displayed along with the number of times that bending is performed. That is, the guide may be display the number of times deformation should be repeatedly performed, such as 1, 2, and 3 or more repetitions.

Also, the guide may display information indicating that a flap gesture (a gesture of bending/folding/rolling and then returning to the original position), a hold gesture (a gesture of bending/folding/rolling and then maintaining the gesture), and a move gesture (a gesture of bending/folding/rolling and then moving a bending line in a predetermined direction in that state) should be performed. For example, if an e-book application is active, a flap gesture should be performed on a right corner to turn to a next page. Therefore, the guide may be provided with information indicating that the flap gesture should be performed. Also, if a Jenga game application is driven, a hold gesture for deforming the flexible display apparatus into a square pillar shape should be performed. Therefore, the guide may be provided with information indicating that the hold gesture should be performed. However, the above examples should not be considered as limiting. The user's deformation gesture may be mapped differently according to an application. Also, a repetition of a gesture may be mapped differently according to an application.

If the shape of the flexible display apparatus 100 is deformed according to the guide, information indicating in which direction the shape is rotated, or whether the shape is made stand or lie may be displayed along with the guide or after the flexible display apparatus 100 is deformed.

The guide may be displayed based on a bending area belonging to a predetermined bending range, and the predetermined bending range may be set to include a predetermined error range corresponding to at least one deformation gesture. That is, even though the user bends/folds/rolls the flexible display apparatus 100 according to the guide, it may be difficult for the user to bend/fold/roll in the exact location. Therefore, the guide may be set to include a predetermined error range and the bending area may be displayed within the predetermined error range. Also, if a bending/folding/rolling gesture is input within the predetermined error range, the controller 130 may determine that the gesture is a predetermined gesture for an application.

If the flexible display apparatus 100 enters an idle state and the display screen 110 displays an idle screen, the controller 130 may provide a guide as to at least one bending gesture associated with a function that is executable in the idle state. Accordingly, if a bending gesture corresponding to the provided guide is performed, the controller 130 may perform an operation in the idle state corresponding to the bending gesture. For example, the controller 130 may provide a guide as to at least one deformation gesture associated with an unlocking function of the flexible display apparatus executable in an idle state in which the flexible display apparatus 100 is in a locked state. Accordingly, if the user performs a bending gesture mapped onto a function in the idle state, the controller 130 may execute a corresponding function.

If the flexible display apparatus 100 enters a lock state, the controller 130 may provide an unlocking deformation guide for unlocking the flexible display apparatus 100, and, if a bending gesture corresponding to the unlocking deformation guide is performed, the controller 130 may unlock the flexible display apparatus 100. For example, the controller 130 may provide a guide as to at least one deformation gesture associated with an unlocking function of the flexible display apparatus 100 executable when the flexible display apparatus 100 is in a locked state. In the idle state a lock function, an unlock function, another idle screen display function, and a volume control function may be available. Accordingly, if the user performs a deformation gesture mapped onto any function, the controller, may control to perform a corresponding function.

Figure 26:
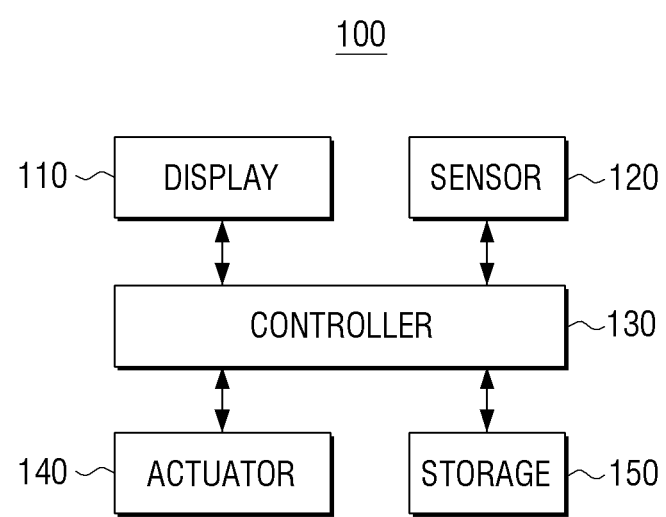
FIG. 26 is a block diagram illustrating a flexible display apparatus according to a first exemplary embodiment.

FIG. 26 is a block diagram illustrating a flexible display apparatus according to a first exemplary embodiment. Referring to FIG. 26, a flexible display apparatus 100 includes a display 110, a sensor 120, a controller 130, an actuator 140, and a storage 150. A redundant explanation of the elements of FIG. 26 is omitted.

The actuator 140 manipulates deformation of the flexible display apparatus 100. Specifically, the actuator 140 may automatically bend the flexible display apparatus 100 to a shape or maintain a shape of the flexible display apparatus 100. In order to execute an application or perform a specific function of an active application, the actuator 140 may automatically bend the flexible display apparatus. If the flexible display apparatus 100 is bent in a shape corresponding to a deformation gesture, the actuator 140 may maintain the bent shape.

The actuator 140 may be implemented by using a plurality of polymer-based materials or strings arranged in a predetermined area of the flexible display apparatus 100.

If the actuator 140 is implemented by using the plurality of polymer-based materials, to manipulate shape deformation of the flexible display apparatus 100, the controller 130 may control the actuator 140 to deform the flexible display apparatus 100 to a predetermined shape by adjusting at least one of a voltage applied to the plurality of polymer-based materials and a magnitude of the applied voltage, as shown in view (a) of FIG. 51. That is, the polymer-based material is contracted at an upper portion and is stretched at a lower portion according to at least one of the applied voltage and the magnitude of the applied voltage, as shown in view (a) of FIG. 51. Accordingly, the flexible display apparatus 100 can be automatically deformed and can be controlled to maintain the deformed shape. The actuator 140 may be embedded in a front surface or a rear surface of the flexible display apparatus, as shown in view (b) of FIG. 51. However, this is merely an example and the actuator 140 may be embedded any or all surfaces of the flexible display apparatus 100.

If the actuator 140 is implemented using strings, to manipulate deformation of the flexible display apparatus 100, the controller 130 may control the actuator 140 to deform the flexible display apparatus 100 to a predetermined shape by changing tensile tension of the strings. Accordingly, the flexible display apparatus 100 can be automatically deformed and can be controlled to maintain the deformed shape.

That is, if the flexible display apparatus 100 is deformed by applying physical force, the flexible display apparatus 100 is subject to reverse force that tends to cause the flexible display apparatus 100 return to an original flat state. In this case, under the control of the controller 130, the actuator 140 applies an opposing physical force to maintain the deformed shape of the flexible display apparatus 100.

The storage 150 stores various programs and data necessary for driving the flexible display apparatus 100.

In particular, the storage 150 may associate a deformation gesture for executing an application corresponding to an icon for each application, and may store the association in a table, index, or database. Also, the storage 150 may associate a deformation gesture for an active application to perform a predetermined functions of the application, and may store the associated deformation gesture and application function.

FIG. 27 is a view explaining a guide associated with at least one bending gesture and an application in the flexible display apparatus according to the first exemplary embodiment.

Referring to view (a) of FIG. 27, a first guide may be provided as a dotted line and a second guide may be provided as a solid line. The dotted line may be a guide that corresponds to a deformation gesture of bending the flexible display apparatus inwards, and the solid line may be a guide that corresponds to a deformation gesture of bending the flexible display apparatus outwards. Accordingly, as shown in view (b) of FIG. 27, the user may deform the shape of the flexible display apparatus along the dotted line and the solid line. After deformation, the flexible display apparatus 100 may have a shape as shown in view (c) of FIG. 27.

As shown in view (a) of FIG. 28, the deformation guides may be provided as lines of different thicknesses. The dotted lines may be a first and second guides that correspond to deformation gestures of bending the flexible display apparatus 100 inwards, and the thickness of the lines may indicate a bending angles. For example, a thicker line may indicate to deform the flexible display apparatus 100 to a large angle, while a thinner line may indicate to deform the flexible display apparatus 100 to a small angle. Accordingly, the user may deform the shape of the flexible display apparatus 100 as shown in view (b) of FIG. 28. In this case, the flexible display apparatus 100 may have a shape as shown in view (c) of FIG. 28, in which the user greatly deforms the flexible display apparatus according to the thick line and minimally deforms the flexible display apparatus according to the thin line. In this case, the user can know a bending angle according to a thickness of the guide as well as a bending or folding direction according to a type or color of the guide, and hence the user can easily understand how to deform the flexible display apparatus 100.

As shown in FIG. 29, the deformation guide may be provided as an arrow. In this case, a direction of the arrow indicates a deformation direction of the flexible display apparatus 100, and an angle or arc of the arrow indicates a deformation angle. That is, as shown in view (a) of FIG. 29, the guide may be provided as the arrow. In this case, the user may deform the flexible display apparatus 100 according to a direction of the arrow and an angle corresponding to a magnitude of the angle or arc of the arrow, as shown in view (b) of FIG. 29. Also, if the guide is provided as a right angle arrow, as shown in view (c) of FIG. 29, the user may deform the shape of the flexible display apparatus into a right angle shape, as shown in view (d) of FIG. 29. Also, if the guide is provided as a spiral arrow, as shown in view (e) of FIG. 29, the user may deform the flexible display apparatus into a rolling shape, as shown in view (f) of FIG. 29.

As shown in view (a) of FIG. 30, the guides may be provided as a dotted line and a solid line. The dotted line may be a first guide that corresponds to a deformation gesture of bending the flexible display apparatus 100 inwards towards the user (upward from a top surface), and the solid line may be a second guide that corresponds to a deformation gesture of bending the flexible display apparatus 100 outwards away from the user (downward from a bottom surface). Accordingly, the user may deform the flexible display apparatus 100 upward along the dotted line and downward along the solid line as shown in view (b) of FIG. 30. In this case, the flexible display apparatus 100 may have a shape as shown in view (c) of FIG. 30 after deformation along the lines.

As shown in FIG. 31, the guides may be provided as lines of different thicknesses. The thicknesses of the lines may indicate an amount of deformation, for example a bending angle. Accordingly, the user may deform the shape of the flexible display apparatus by different bending angles as shown in views (b), (d), and (f) of FIG. 31 according to the lines of the different thicknesses shown in views (a), (c), and (e) of FIG. 31.

As shown in view (a) of FIG. 32, the guide may indicate to form a wave at a location of the guide. In this case, the user may deform the flexible display apparatus 100 by bending along the guides. The guides may indicate to deform the flexible display apparatus 100 to have a shape of a rising waveform by bending the flexible display apparatus 100 in an outward direction illustrated in FIG. 32(*b*), or to have the shape of the falling waveform by bending the flexible display apparatus 100 in an inward direction. However, the above are merely examples, as the guides may indicate to bend the flexible display apparatus as illustrated in FIGS. 32(c) and 32(d), or in other fashions.

Figure 33:
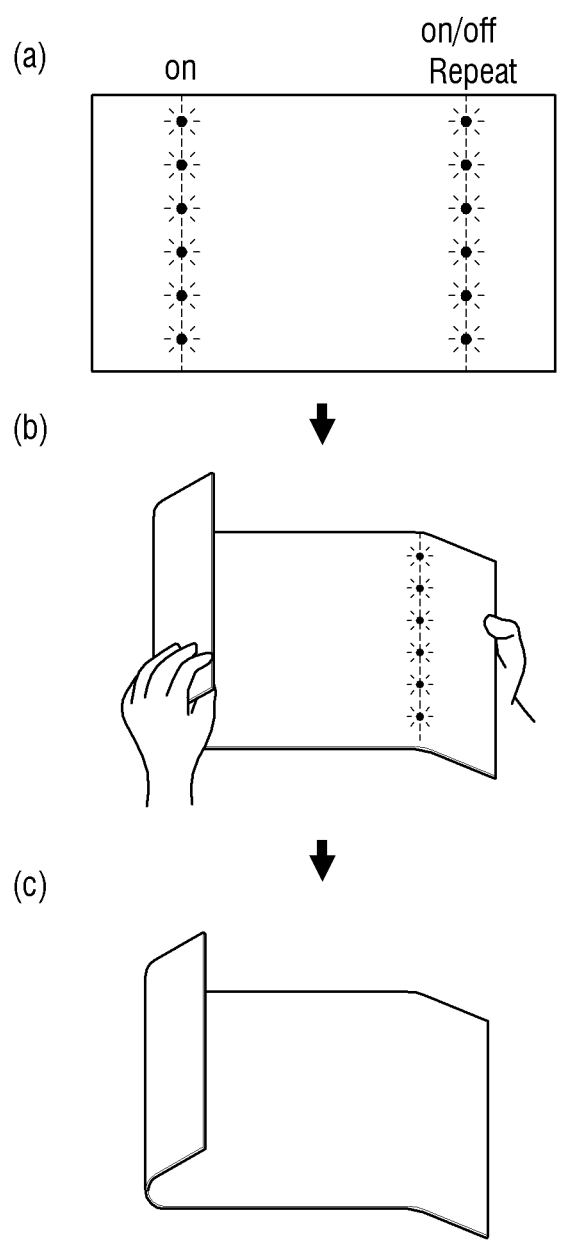

As shown in view (a) of FIG. 33, the guide may be provided as light. Herein, a continuously shining light line may refer to a deformation in an inward direction and a flickering light line may refer to deformation in an outward direction. In this case, the user may bend the flexible display apparatus 100 inward according to the continuous light ("on") and outward according to the flickering light ("on/off"), as shown in view (b) of FIG. 33. In this case, the shape of the flexible display apparatus may be deformed as shown in view (c) of FIG. 33.

As shown in view (a) of FIG. 34, the guide may be provided using light and shade. The shaded portion may refer to bending in an inward direction according to the guide. In this case, the user may bend the shaded portion inwards according to the guide and may bend the non-shaded portion outwards according to the guide, as shown in view (b) of FIG. 34. In this case, the flexible display apparatus may be deformed, as shown in view (c) of FIG. 34.

Also, as shown in view (a) of FIG. 35, the guide may be a line provided along with a textual explanation. Accordingly, the user may bend the flexible display apparatus 100 along the lines according to the explanation, as shown in view (b) of FIG. 35. In this case, the flexible display apparatus 100 may be deformed, as shown in view (c) of FIG. 35. Alternatively, the line may be omitted and only a textual explanation may be provided as the guide.

Figure 36:
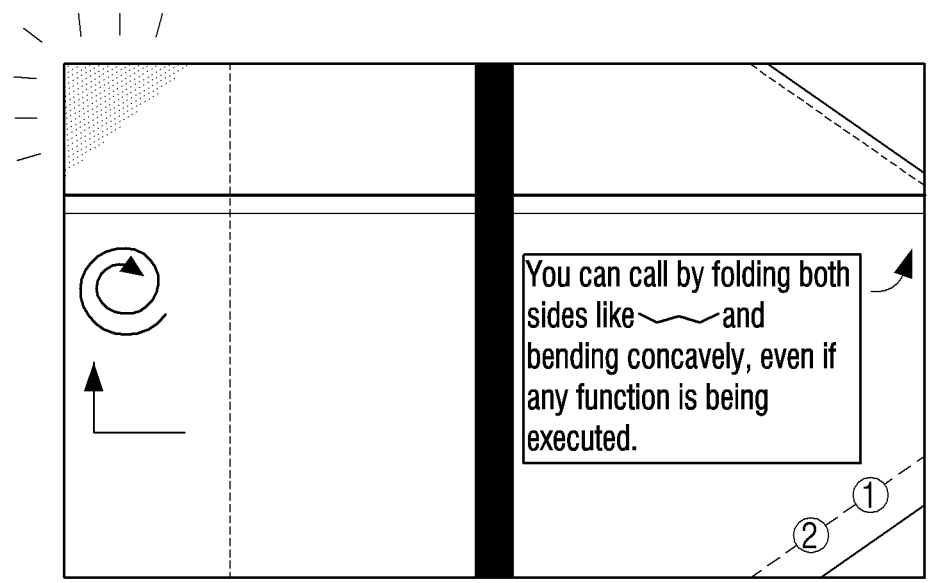

As shown in FIG. 36, guides for an application functions may be provided. That is, guides such as light, light and shade, sign, explanation, and number of deformation repetitions may be provided. If the user touches a guide, the controller 130 may provide a function which is associated with the touched guide. For example, if the user touches a sign for rolling, a function "The Jenga application will start if you roll the apparatus" associated with the guide may be displayed. All of the guides may be provided if the user presses a pre-set button, may be provided on an initial screen when the flexible display apparatus is turned on, or may be temporarily provided on a home screen or an application screen if there is no input for a predetermined time.

Figure 37:
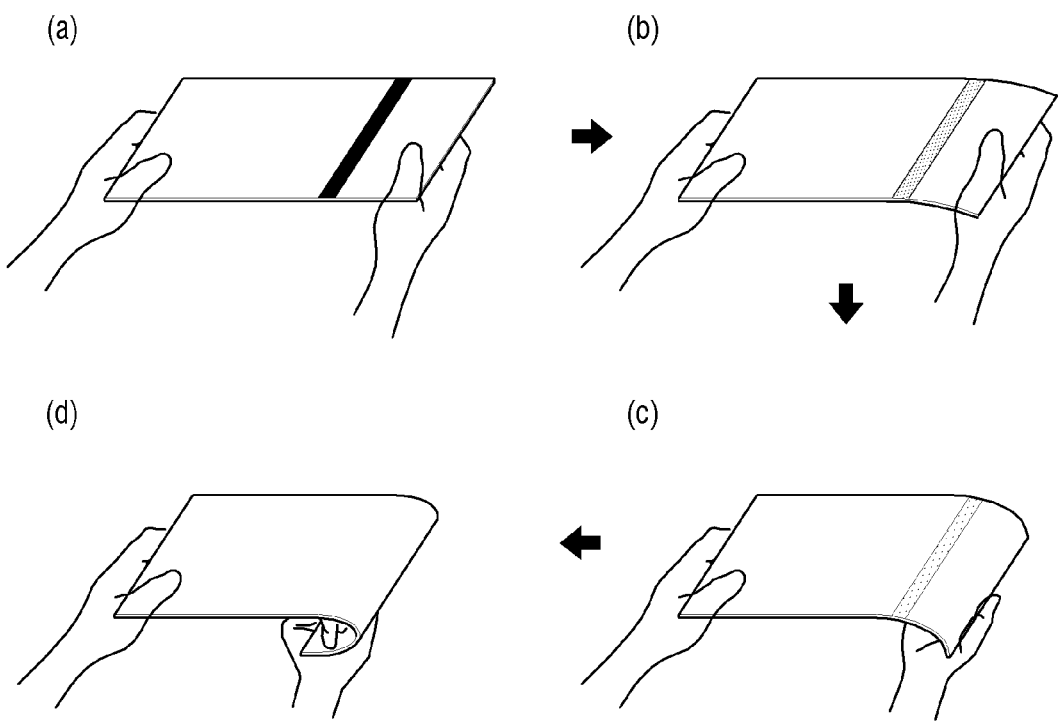
FIGS. 37 to 39 are views illustrating feedback effects according to the first exemplary embodiment.
Figure 38:
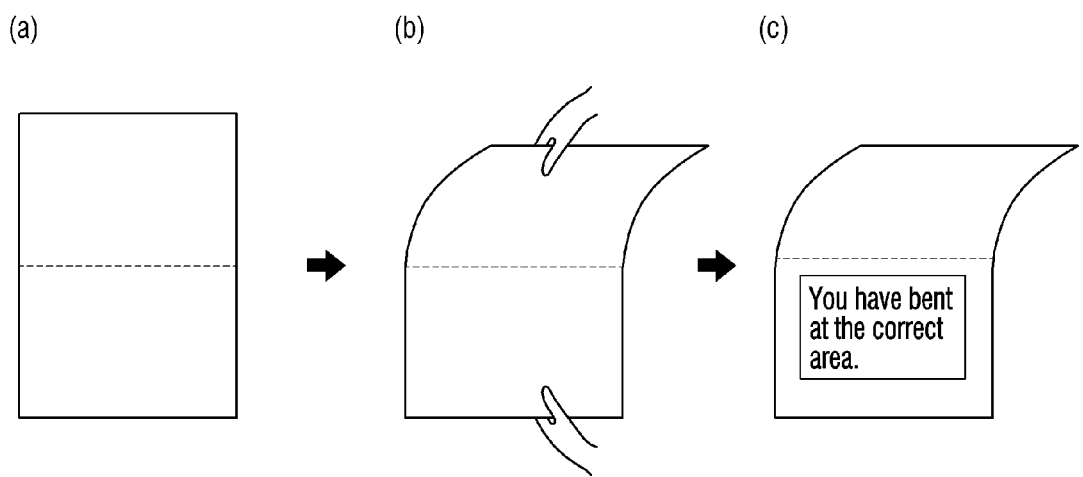
Figure 39:
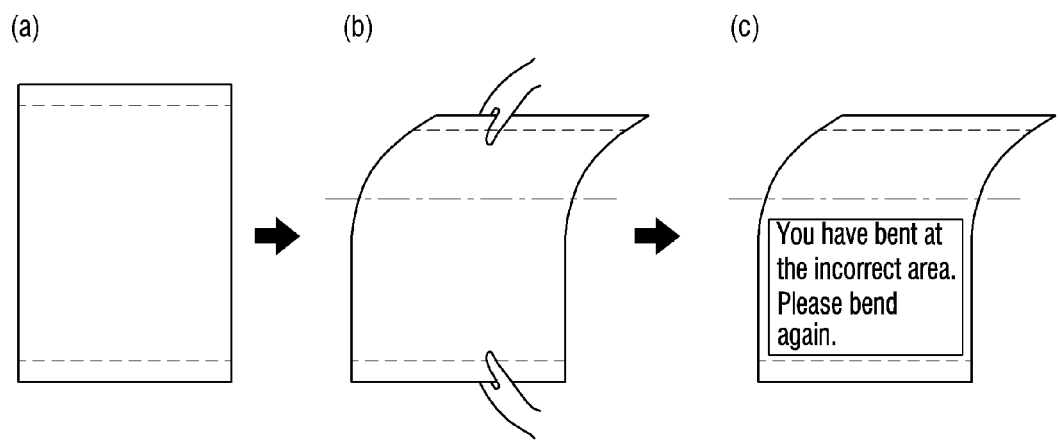

FIGS. 37 to 39 are views illustrating feedback effects according to the first exemplary embodiment. As shown in view (a) of FIG. 37, a guide may be provided on a location to be deformed. The guide may be represented by a black line, as shown in view (a) of FIG. 37. Accordingly, the user can deform the flexible display apparatus 100 at the location of the guide by an angle. In this case, the guide may be a dark black line. If the user deforms the flexible display apparatus 100, the guide may become lighter, as shown in view (b) of FIG. 37. As the flexible display apparatus 100 is further deformed, the guide may continue to become lighter, as shown in view (c) of FIG. 37. If deformation is completed, the guide may disappear as shown in view (d) of FIG. 37. That is, by adjusting the lightness or darkness of the guide, the user can easily know a progress of the deformation gesture. Also, if the guide disappears, the user can easily know that the deformation is completed.

As shown in view (a) of FIG. 38, a guide may be provided on a location to be deformed. The guide may be represented by a dotted line, as shown in view (a) of FIG. 38. Accordingly, the user may deform the flexible display apparatus at the location to be deformed by an angle, as shown in view (b) of FIG. 38. If the deformation is completed at the correct location, a message indicating successful completion of the deformation may be displayed, such as "You have bent at the correct area," as shown in view (c) of FIG. 38. Accordingly, the user can easily know that the deformation is completed. If the deformation is not completed or not completed at the correct location, a message indicating the incompleteness of the deformation may be displayed, such as "You have bent at the incorrect area. Please bend again." Accordingly, the user may deform the flexible display apparatus again. The feedback effect may be provided to the user in a form of text, as shown in FIGS. 38 and 39. However, the feedback effect is not limited to the above textual form and may be provided in various forms that can inform the user, such as vibration, sound, and notice display. Accordingly, the user can easily know that the deformation of the flexible display apparatus is correct or incorrect. In this case, the controller 130 may provide the deformation guide for guiding the user to correctly perform the deformation gesture again. In FIGS. 38 and 39, the feedback effect is provided if the deformation is not consistent with the guide. However, if a bending angle is not consistent with a guide or if a bending direction is not consistent with a guide, the feedback effect may also be provided.

FIGS. 40 to 45 are views to explain a method for controlling of the flexible display apparatus according to the first exemplary embodiment.

Figure 40:
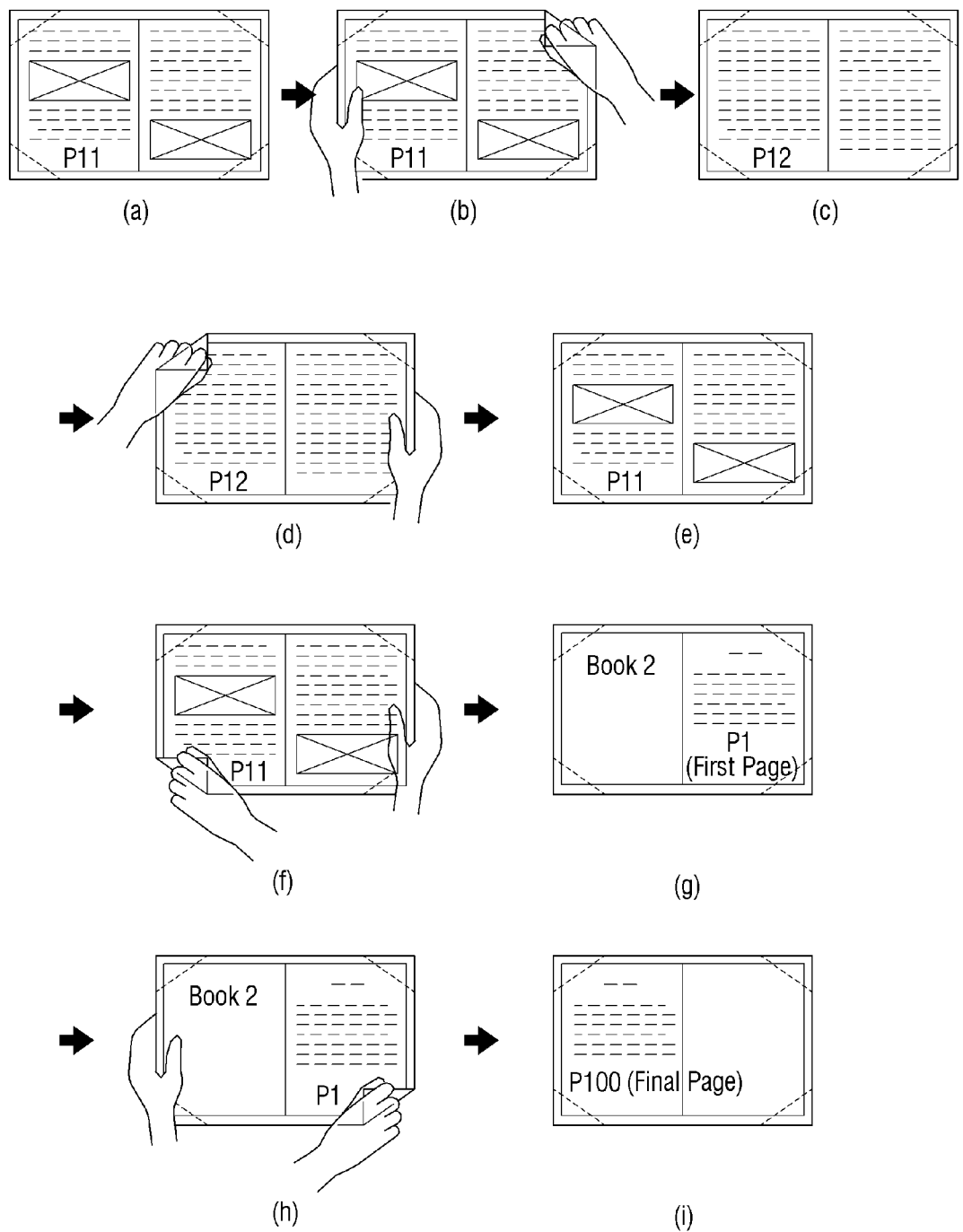

FIG. 40 is a view illustrating the flexible display apparatus 100 which provides a deformation guide as to at least one gesture associated with a driven e-book application according to the first exemplary embodiment. Referring to view (a) of FIG. 40, the display 110 may display an e-book application screen and a deformation guide for a gesture to perform a predetermined function of the e-book application. The guide may be a dotted line at one or more corners of the display 110.

As shown in view (b) of FIG. 40, the user may bend a right upper corner of the flexible display apparatus 100 according to the provided deformation guide. In this case, the controller 130 may perform an e-book next page changing function associated with the bending of the right upper corner. Accordingly, the display 110 may display the next page of the e-book, as shown in view (c) of FIG. 40.

Also, the user may bend a left upper corner of the flexible display apparatus 100 according to the provided guide as shown in view (d) of FIG. 40. In this case, the controller 130 may perform an e-book previous page changing function associated with the bending of the left upper corner. Accordingly, the display 110 may display the previous page, as shown in view (e) of FIG. 40.

Also, the user may bend a left lower corner of the flexible display apparatus 100 according to the provided guide as shown in view (f) of FIG. 40. In this case, the controller 130 may perform an e-book first page changing function mapped onto the bending of the left lower corner. Accordingly, the display 110 may display the first page as shown in view (g) of FIG. 40.

Also, the user may bend a right lower corner of the flexible display apparatus 100 according to the provided guide as shown in view (h) of FIG. 40. In this case, the controller 130 may perform an e-book final page changing function associated with the bending of the right lower corner. Accordingly, the display 110 may display the final page as shown in view (i) of FIG. 40.

FIG. 41 is a view illustrating the flexible display apparatus that provides a guide for at least one gesture associated with an active piano application according to the first exemplary embodiment. Referring to view (a) of FIG. 41, the display 110 may display a piano application driving screen. The piano application driving screen may display piano keys.

Also, as shown in view (b) of FIG. 41, a deformation guide, associated with a gesture for performing a predetermined function of the piano application, may be displayed. The guide may be a horizontal dotted line.

As shown in view (c) of FIG. 41, the user may bend an upper area of the flexible display apparatus 100 forwardly in a horizontal direction according to the provided deformation guide. In this case, the controller 130 may perform a music showing function of the piano application associated with the bending on the upper area of the flexible display apparatus 100 along the deformation guide.

FIG. 42 is a view illustrating the flexible display apparatus that provides a guide as to at least one gesture associated with an active SNS application according to the first exemplary embodiment. Referring to view (a) of FIG. 42, the display 110 may display an SNS application screen and a deformation guide for at least one bending gesture to perform a predetermined function of the SNS application. The SNS application driving screen may display a dialogue box. The deformation guide may be a horizontal dotted line.

As shown in view (b) of FIG. 42, the user may bend a lower area of the flexible display apparatus 100 forwardly in a horizontal direction according to the provided deformation guide. In this case, the controller 130 may perform a keyboard display function of the SNS application associated with the bending on the lower area of the flexible display apparatus 100 along the deformation guide.

FIG. 43 is a view illustrating the flexible display apparatus that provides a guide for at least one gesture associated with an active card game application according to the first exemplary embodiment. Referring to FIG. 43, the deformed display 110 may divide the active card game application onto each side of the display 110 and display the card game application on each of the sides of the deformed display. That is, if the user bends a center area of the flexible display apparatus 100 according to the provided deformation guide, the controller 130 may control the display 110 execute a function of the card game to display a private view on one area and display a public view on the other area.

Figure 44:
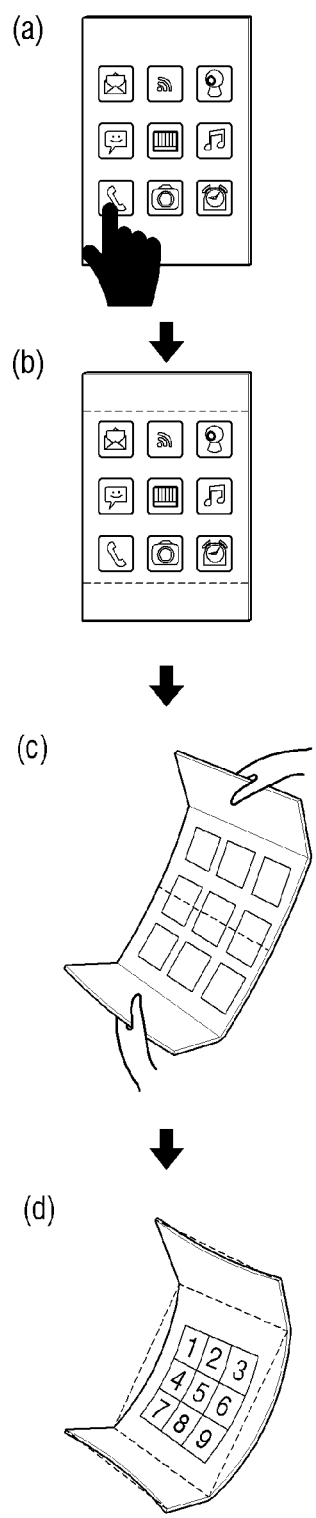

FIG. 44 is a view illustrating the flexible display apparatus 100 that provides a guide for at least one gesture to execute a selected telephone application according to the first exemplary embodiment. Referring to view (a) of FIG. 44, the display 110 may display a plurality of application icons.

If a telephone application is selected from among the plurality of applications displayed on the display 110, a deformation guide for at least one deformation gesture to execute the telephone application may be provided, as shown in view (b) of FIG. 44. The deformation guide may be two horizontal dotted lines.

As shown in view (c) of FIG. 44, the user may bend a right area, a left area, and a center area of the flexible display apparatus 100 according to the provided deformation guide. In this case, the controller 130 may determine whether the bending gesture is a predetermined gesture associated with executing the selected telephone application.

If it is determined that the bending gesture is the deformation gesture associated with executing the selected telephone application, the telephone application may be executed, as shown in view (d) of FIG. 44. If the telephone application is active, a keypad for inputting a telephone number may be displayed on the display 110 as shown in view (d) of FIG. 44. However, this should not be considered as limiting. If the telephone application is executed, the display 110 may display at least one of a keypad, a recent calls list, favorites, and contact information.

As shown in view (a) of FIG. 44, the user selects the icon corresponding to the application, and the guides according to the selected application are displayed in view (b) of FIG. 44. However, the guides may be displayed for one or more icons displayed on the display without the user's selection. Accordingly, the user may execute an application by performing the deformation gesture corresponding to an application without selection of the icon.

Further, the guides may not be displayed for one or more icons displayed on the display. However, the user may still execute an application by performing the deformation gesture corresponding to the application.

Still further, the icons for the applications may not be displayed. The user may execute an application by performing the deformation gesture corresponding to the application. Here, the guides may or may not be displayed without the display of the icons, but the user may still execute an application by performing the deformation gesture corresponding to the application.

Various applications are described above, but the embodiments are not limited thereto. For example, the application may be an operating system of the flexible display apparatus, thereby functions of the flexible display apparatus itself may be executed when deformation gestures associated with the flexible display apparatus itself are performed.

FIG. 45 is a view illustrating the flexible display apparatus 100 that provides a guide for at least one gesture to execute a selected Jenga game application according to the first exemplary embodiment. Referring to view (a) of FIG. 45, the display 110 may display a plurality application icons.

If a Jenga game application is selected from among the plurality of icons displayed on the display 110, a guide as to at least one gesture for launching the Jenga game application may be provided, as shown in view (b) of FIG. 45

Also, as shown in view (c) of FIG. 45, the user may bend a right area, a left area and a center area of the flexible display apparatus according to the provided deformation guide. In this case, the controller 130 may determine that the deformation gesture is a predetermined gesture for executing the selected Jenga game application.

If it is determined that the bending gesture is the predetermined gesture for executing the selected Jenga game application, the Jenga application may be executed, as shown in view (d) of FIG. 45. If the Jenga application is executed, a GUI for the Jenga game may be displayed on the display 110, as shown in view (d) of FIG. 45.

FIG. 46 is a view illustrating the flexible display apparatus 100 that provides a guide for at least one gesture associated with a function executable on an idle screen according to the first exemplary embodiment.

Referring to view (a) of FIG. 46, the user may press a specific key of the flexible display apparatus 100, an icon on the display of the idle screen, a predetermined area of the idle screen, or any area of the idle screen. In this case, as shown in view (b) of FIG. 46, a guide for at least one deformation gesture associated with a function executable when the flexible display apparatus 100 is in an idle mode and the idle screen is displayed. The idle screen may be include application icons for applications available to be executed by the flexible display apparatus 100.

Accordingly, the user may bend a center area of the flexible display apparatus 100, as shown in view (c) of FIG. 46.

In this case, the controller 130 may turn off the screen and/or perform a locking function mapped onto the deformation gesture when the flexible display apparatus 100 is in the idle state, as shown in view (d) of FIG. 46. Alternatively, the flexible display apparatus 100 may not need to be in the idle state, and an application may be active, and execution of the deformation gesture may turn off the display and/or perform the locking function.

Figure 47:
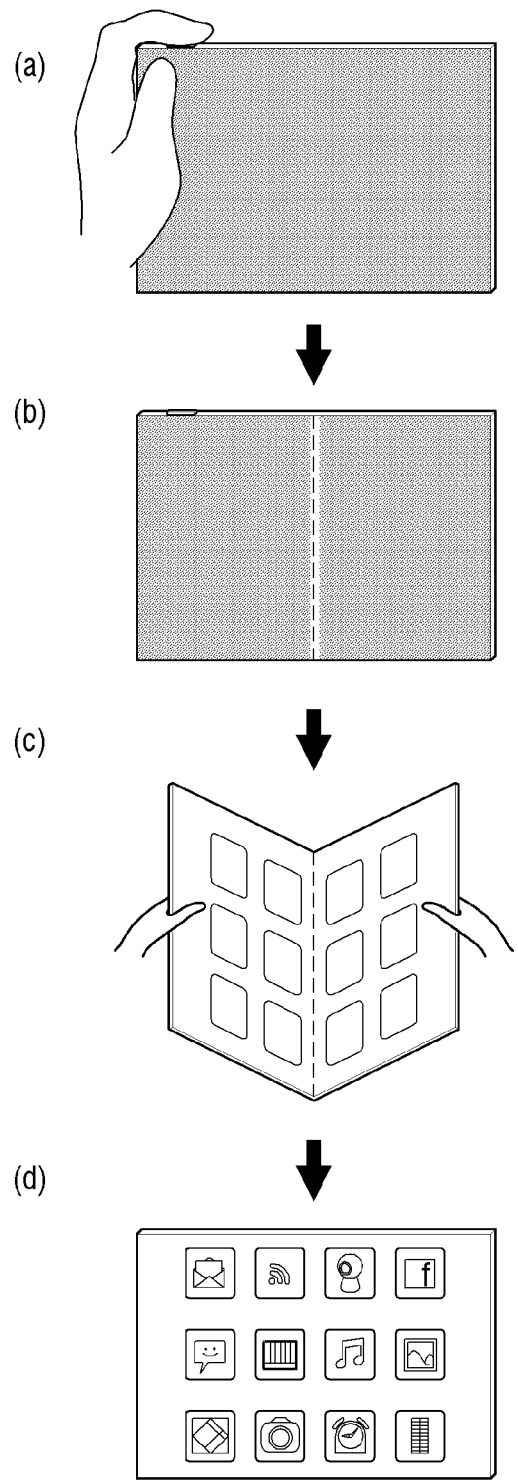

FIG. 47 is a view illustrating the flexible display apparatus that provides a guide for at least one gesture associated with a function executable on a lock screen according to the first exemplary embodiment.

Referring to view (a) of FIG. 47, the user may press a specific key of the flexible display apparatus 100, an icon on the display of the on a lock screen if icons are displayed on the lock screen, a predetermined area of the lock screen, or any area of the lock screen. In this case, a guide for at least one bending gesture associated with a function executable on the flexible display apparatus 100 in a locked mode when the lock screen is displayed may be provided, as shown in view (b) of FIG. 47.

Accordingly, the user may bend a center area of the flexible display apparatus 100, as shown in view (c) of FIG. 47.

In this case, the controller 130 unlocks the flexible display apparatus 100 and may turn on the display 110 by performing an unlocking function associated with the at least one deformation gesture. When unlocked, the display 110 may display an idle screen or a screen that was displayed when the flexible display apparatus 100 was previously locked.

However, the above examples are only for the convenience of explanation and not limiting. That is, various guides described above may be provided. Also, at least one gesture for performing a predetermined function of an active or selected application may be mapped in different ways than in the above examples. For example, in the case of an e-book application, a gesture of bending toward an entire right area in a vertical direction may be associated with a next page changing function. Also, the deformation gesture may be folding rather than bending. Also, the at least one gesture for executing the telephone application may be mapped in different ways than in the above example. For example, a gesture of bending only a selected area may be associated with executing the telephone application.

Figure 48:
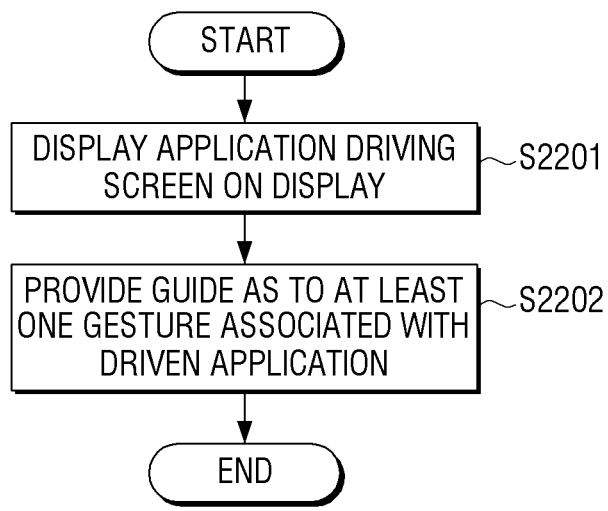
FIG. 48 is a flowchart to explain the method for controlling of the flexible display apparatus according to the first exemplary embodiment.

FIG. 48 is a flowchart to explain a method for controlling of the flexible display apparatus according to the first exemplary embodiment. Referring to FIG. 48, an application driving screen is displayed on the display (S2201). A deformation guide for at least one gesture associated with an active application is provided (S2202).

Figure 49:
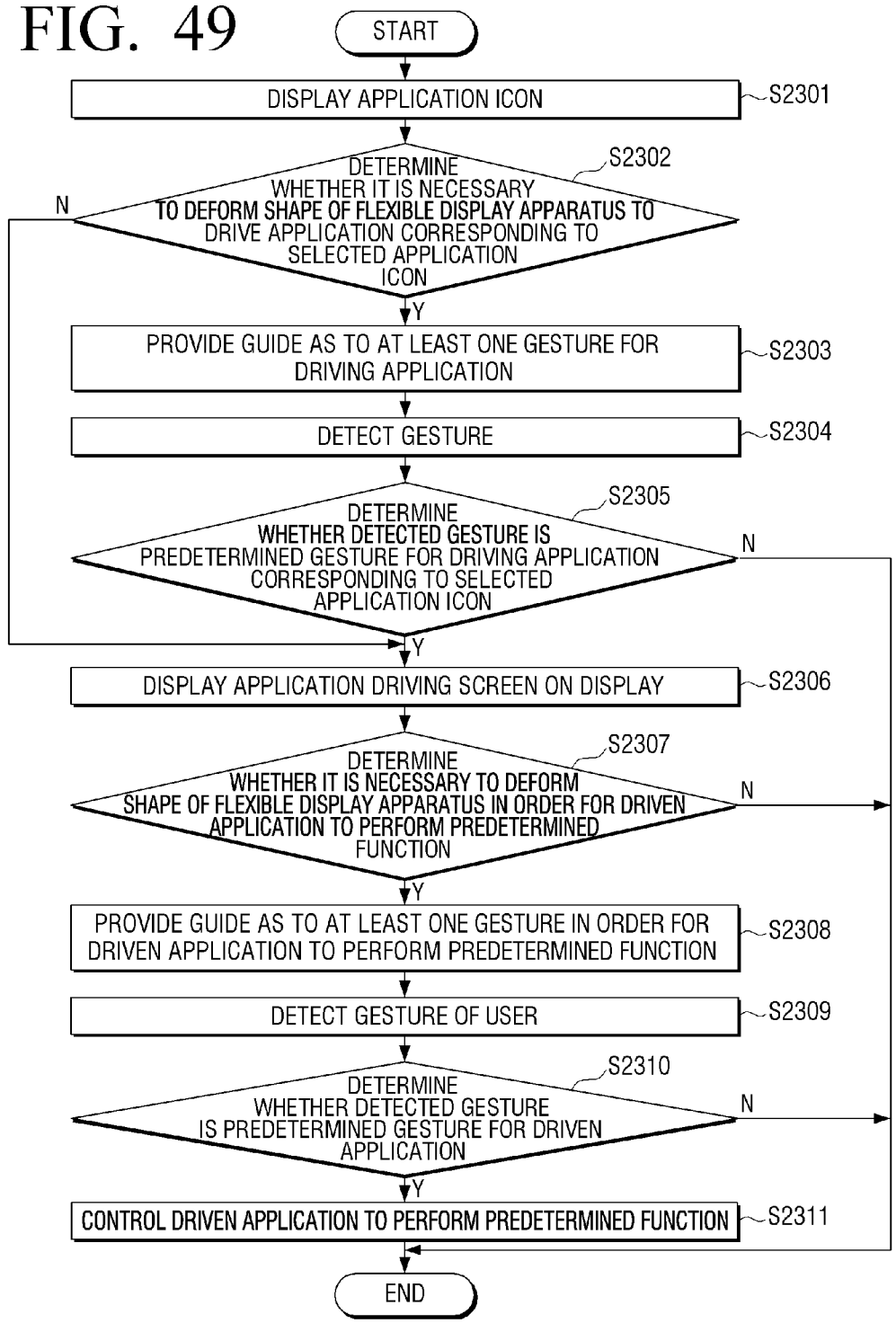
FIG. 49 is a flowchart to explain the method of FIG. 46 in detail.

Hereinafter, the flowchart of FIG. 48 will be explained in detail with reference to FIG. 49. Referring to FIG. 49, the display displays an application icon (S2301). If an application icon is selected, it is determined whether the user should the flexible display apparatus in order to execute an application corresponding to the selected application icon (S2302). The deformation of the flexible display apparatus may be by bending, folding, and rolling. For example, as discussed above, if the application is a piano application, a Jenga game application, or a telephone application that may be best operated by the user if the flexible display apparatus 100 is in a particular shape, then a shape of the flexible display apparatus may be appropriately associated with the application. Accordingly, the user may be instructed to perform the deformation when selecting the application. The user may, or may not, be required to perform the deformation to execute the application.

If it is determined that it is not necessary to deform the shape of the flexible display apparatus (S2302: N), a screen of the application corresponding to the selected application icon is displayed on the display (S2306).

If it is determined that it is necessary to deform the shape of the flexible display apparatus for proper execution of the application (S2302: Y), a guide for at least one gesture to execute the application is provided (S2303). A user's gesture is detected (S2304). It is determined whether the detected gesture is a predetermined deformation gesture for driving the application corresponding to the selected application icon (S2305).

If it is determined that the gesture is the predetermined gesture associated with the application corresponding to the selected application icon (S2305: Y), the application is executed and a screen of the selected application is displayed on the display (S2306) in accordance with the application.

It is determined whether it is necessary to deform the shape of the flexible display apparatus in order for the driven application to perform a predetermined function (S2307).

Once the application is executed, it may be determined whether functions of the application are associated with deformations of the flexible display apparatus for controlling the application to perform predetermined function and if one or more functions of the application are respectively associated with deformations (S2307: Y), a guide for at least one gesture for controlling the active application to perform the predetermined function is provided (S2308). A user's gesture is detected (S2309). It is determined whether the detected gesture is a predetermined gesture associated with one of the functions of the active application (S2310).

If it is determined that the detected gesture is a gesture associated with the active application (S2310: Y), the application is controlled to perform the predetermined function corresponding to the gesture (S2311).

The deformation guide may be displayed based on a bending area that belongs to a predetermined bending range, and the predetermined bending range may be set to include a predetermined error range corresponding to at least one deformation gesture.

The deformation guide may be provided as at least one of a guide that displays a bending/folding line, a guide that displays a bending/folding direction, a guide that displays rolling, a guide which is provided through haptic feedback, and an explanation guide regarding shape deformation.

The flexible display apparatus 100 according to the first exemplary embodiment described above provides at least one guide associated with an application, so that the user's convenience can be improved.

Second Exemplary Embodiment

Figure 50:
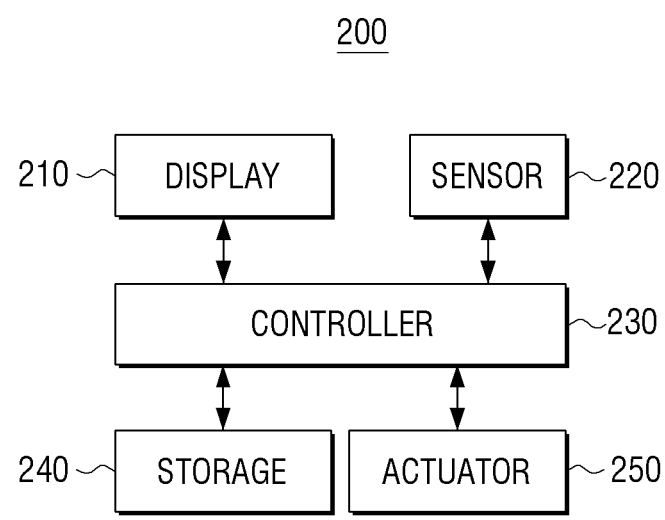
FIG. 50 is a block diagram illustrating a flexible display apparatus according to a second exemplary embodiment.

FIG. 50 is a block diagram illustrating a flexible display apparatus according to a second exemplary embodiment. Referring to FIG. 50, a flexible display apparatus 200 according to the second exemplary embodiment includes a display 210, a sensor 220, a controller 230, a storage 240, and an actuator 250. The elements of FIG. 50 are similar to the elements of FIG. 26, and thus a redundant explanation of the elements is omitted for brevity.

The storage 240 may store various programs and data necessary for performing operations of the flexible display apparatus 200. In particular, the storage 240 may store an index, table, or database associating a deformable shape of the flexible display apparatus and information on a command corresponding to the deformable shape. The command may be a command to control operation of the flexible display apparatus 200 or a command to control operation of an application being executed by the flexible display apparatus 200. The storage 240 may also store a user's deformation gesture in association with the shape and/or command.

The controller 230 controls an overall operation of the flexible display apparatus 200. Specifically, the controller 230 may control the display 210, the sensor 220, the actuator 250, and the storage 240.

If a user's deformation gesture to deform the flexible display apparatus is sensed by the sensor 220 while the display 210 displays an application icon, the controller 230 determines whether a shape of the flexible display apparatus 200 is stored in the storage 240.

If the shape is stored, the controller 230 may detect an application corresponding to the stored shape and execute the application. In this case, because the shape is stored, if the user has previously deformed the flexible display apparatus 200 to the stored shape, the display of the guides may be omitted. This is because, as the user has previously performed the deformation, it may be expected that the user remembers the deformation and does not require display of the guides. For example, a telephone application of FIG. 52 will be explained. If the user has previously executed the telephone application, the shape of the flexible display apparatus 200 for driving the telephone application may be known by the user. In this case, the user may deform the shape of the flexible display apparatus 200 into a shape associated with the telephone application while the display 210 displays an application icon. Accordingly, the controller 230 may directly detect the telephone application corresponding to the shape from the storage 260 and execute the telephone application.

If a user's deformation gesture for deforming the flexible display apparatus is sensed by the sensor while the display 210 displays a screen of an active application, the controller 230 determines whether a shape of the flexible display apparatus 200 is stored in the storage 240.

If the shape is stored, the controller 230 may execute a predetermined function of the active application corresponding to the stored shape. For example, a piano application of FIG. 53 will be explained. If the user has previously executed the piano application, a shape of the flexible display apparatus 200 corresponding to a music function of the piano application may be known by the user. In this case, the user may deform the flexible display apparatus 200 by bending an upper area in a horizontal direction, while the display 210 displays a piano application screen. Accordingly, the controller 230 may execute a function of the piano application to display the music function corresponding to the deformed shape on the upper area of the flexible display apparatus 200.

For example, a card game application of FIG. 54 will be explained. That is, while a card game application is performed, as shown in view (a) of FIG. 54, the user may bend the flexible display apparatus, as shown in view (b) of FIG. 54. In this case, the display 110 may display the card game on each side of the flexible display apparatus 200. That is, the controller 130 may control the display 110 to execute a function of the card game to display a private view on one area and display a public view on the other area.

Figure 55:
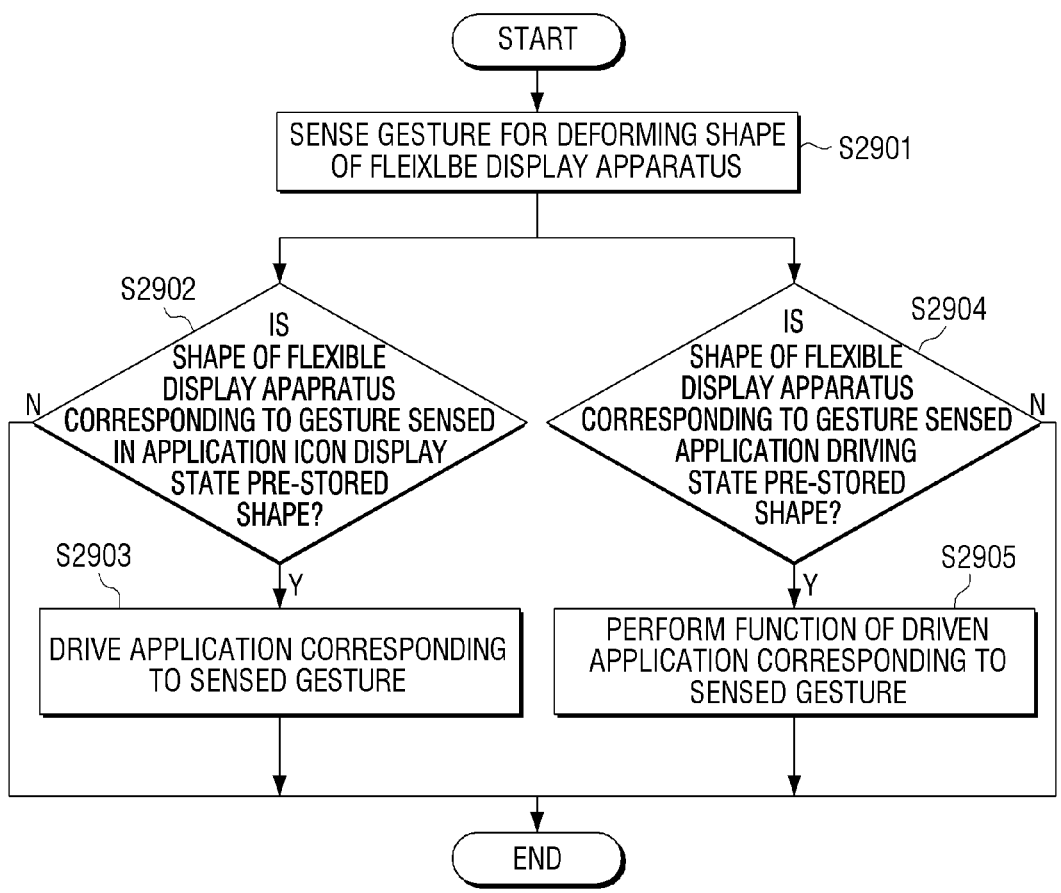
FIG. 55 is a flowchart to explain the method for controlling of the flexible display apparatus according to the second exemplary embodiment.

FIG. 55 is a flowchart illustrating a method for controlling of the flexible display apparatus according to the second exemplary embodiment. Referring to FIG. 55, a deformation gesture for deforming the flexible display apparatus is sensed (S2901).

It is determined whether a shape of the flexible display apparatus is pre-stored in the storage 240 of the flexible display apparatus 200, while an application icon is displayed (S2902). If the shape is stored (S2902: Y), an application corresponding to the shape is executed (S2903).

It is also determined whether a shape of the flexible display apparatus is stored while an active application is executed (S2904). If the shape is stored (S2904: Y), a function of the active application corresponding to the shape is performed (S2905).

If the flexible display apparatus 200 according to the second exemplary embodiment has its shape changed to a stored shape, the flexible display apparatus 200 executes a corresponding application or performs a function of an active application so that user's convenience can be improved.

Third Exemplary Embodiment

Figure 56:
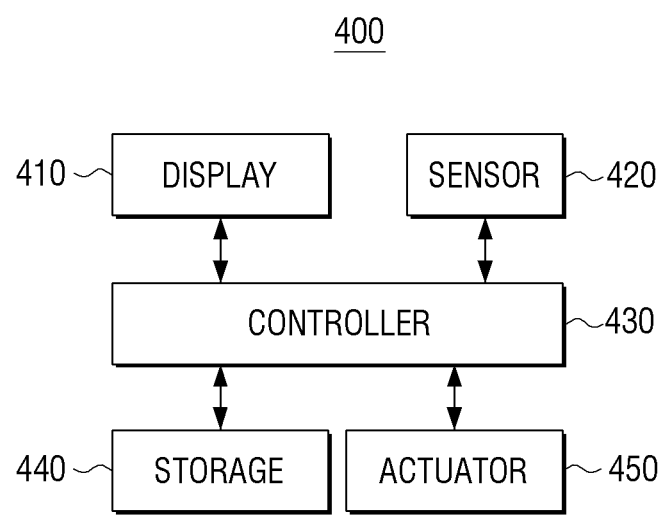
FIG. 56 is a block diagram illustrating a flexible display apparatus according to a third exemplary embodiment.

FIG. 56 is a block diagram illustrating a flexible display apparatus according to a third exemplary embodiment. Referring to FIG. 56, a flexible display apparatus 400 according to the third exemplary embodiment includes a display 410, a sensor 420, a controller 430, a storage 440, and an actuator 450. Again, in explaining FIG. 56, a redundant explanation of the elements is omitted for brevity.

The sensor 410 senses an environment to which the flexible display apparatus 400 is subjected. The sensor 410 may include a pressure sensor. Accordingly, the sensor 410 may sense pressure on a first area of the flexible display apparatus 400 placed on an object and pressure (or lack thereof) on a second area of the flexible display apparatus 400 using the pressure sensor.

The controller 430 may control the display 410, the sensor 420, the controller 430, the storage 440, and the actuator 450.

In particular, the controller 430 may control the actuator 440 to deform the second area in a direction opposing gravity using information on the sensed pressure. The shape deformation may be bending, folding, or rolling. This will be explained in detail with reference to FIG. 57.

Figure 57:
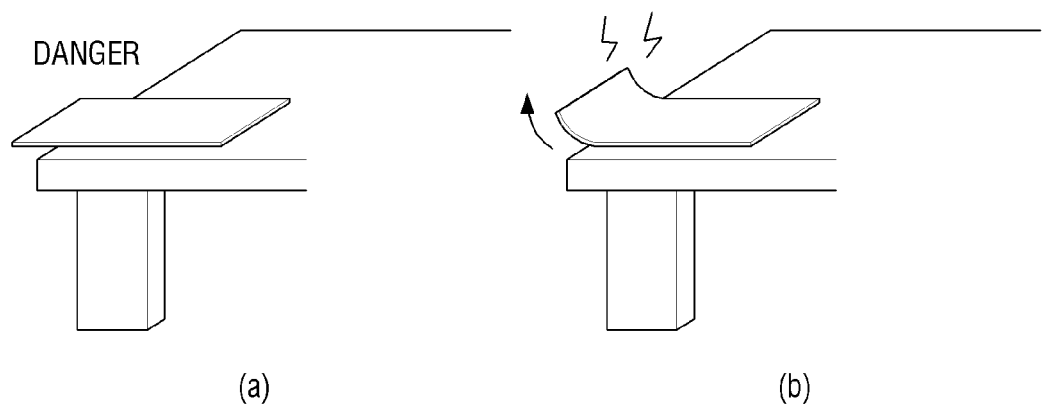
FIG. 57 is a view to explain a method for controlling of the flexible display apparatus according to the third exemplary embodiment.

Referring to view (a) of FIG. 57, the flexible display apparatus 400 is placed on a table, but a part of the flexible display apparatus 400 is not supported on the table. In this case, if the center of gravity of the flexible display apparatus 400 is oriented in the direction of the acceleration of gravity, the flexible display apparatus 400 may fall off the table. That is, if the flexible display apparatus 400 is embodied by a mobile terminal apparatus, the center of gravity may be oriented in the direction of the acceleration of gravity due to vibration or shape deformation when a phone call is received, and thus the flexible display apparatus 400 may fall.

In this case, the controller 420 may determine that the flexible display apparatus 400 is in a dangerous situation using the sensed pressure.

In this case, as shown in view (b) of FIG. 57, the controller 420 may control the actuator 440 to deform the flexible display apparatus 400 into a stable shape by deforming the shape of the area of the flexible display apparatus 400 floating in the space. For example, the actuator 440 may bend the area of the flexible display apparatus 400 floating in the space in a direction towards the area of the flexible display apparatus 400 that is supported by the table, based on the sensed pressure.

According to the third exemplary embodiment described above, the flexible display apparatus can be stably maintained.

Fourth Exemplary Embodiment

Figure 58:
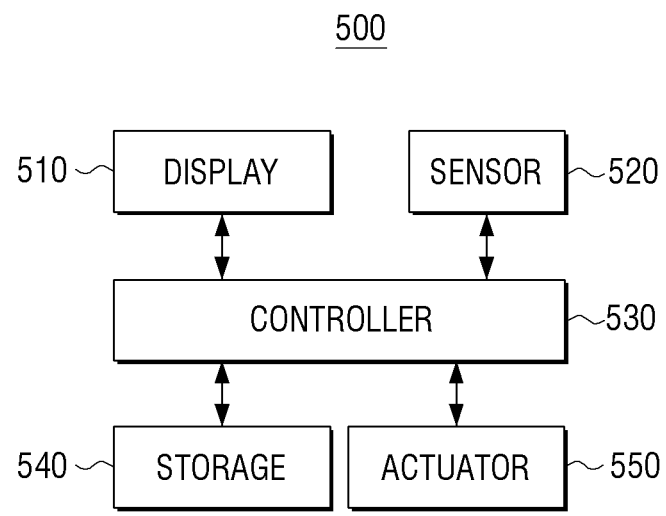
FIG. 58 is a block diagram illustrating a flexible display apparatus according to a fourth exemplary embodiment.

FIG. 58 is a block diagram illustrating a flexible display apparatus according to a fourth exemplary embodiment.

Referring to FIG. 58, a flexible display apparatus 500 according to the fourth exemplary embodiment includes a display 510, a sensor 520, a controller 530, a storage 540, and an actuator 550. However, in explaining FIG. 58, a redundant explanation of the elements is omitted for brevity.

The sensor 510 senses a state of the flexible display apparatus 500. Specifically, the sensor 510 may sense bending pressure information using a deformation sensor of the flexible display apparatus 500, and may sense acceleration of the flexible display apparatus 500 using an acceleration sensor.

Also, the sensor 510 may sense a position of the flexible display apparatus 500 using an acceleration sensor, a gyroscope, or a camera.

The sensor 510 may sense an altitude of the flexible display apparatus 500 using a camera or an ultrasonic sensor.

A plurality of acceleration sensors may be provided. If more than two acceleration sensors are used, the state of the flexible display apparatus 500 can be determined more exactly using a combination of data output from the sensors.

The controller 530 may control the display 510, the sensor 520, the actuator 550, and the storage 540. In particular, the controller 530 compares the sensed bending pressure information and the sensed accelerometer information to thresholds, and determines whether the acceleration is generated due to user's intended bending when the user drops the flexible display apparatus 500 or the acceleration is generated due to the fall of the flexible display apparatus 500 based on the comparison to the thresholds. If it is determined that the acceleration is generated due to the fall of the flexible display apparatus 500, the controller 530 may control the actuator 550 to bend the flexible display apparatus 500 toward a liquid crystal display. In this case, the controller 530 may control the actuator 550 to bend the flexible display apparatus 500 in a forward (inward) direction of the flexible display apparatus 500, that is, toward the display 510. That is, since it is desirable avoid damage (scratches, marks, defects, etc.) on the liquid crystal display rather than on the rear surface, the flexible display apparatus according to the third exemplary embodiment can achieve the effect of protecting of the flexible display apparatus 500.

The controller 530 may select a shape for allowing the flexible display apparatus 500 to fall and/or land in desired fashion, using the sensed position of the flexible display apparatus 500 and the sensed altitude of the flexible display apparatus 500. In this case, the controller 530 may select a desirable landing position using a rotational force caused by moment of inertia of the flexible display apparatus 500, by repeating bending and unbending operations using the actuator 550 of the flexible display apparatus. The stable landing position described above may be a position in which the flexible display apparatus is bent in the forward (inward) direction, that is, toward the display 510. Also, the controller 530 may control the flexible display apparatus 500 to impact on a back side, so that the display 510 is not damaged.

Also, the controller 530 may control the flexible display apparatus 500 to be deformed at a time when the flexible display apparatus lands using the sensed pressure information, the sensed position of the flexible display apparatus, and the sensed altitude of the flexible display apparatus. If the flexible display apparatus is deformed at the time of landing, collision shock to the flexible display apparatus can be distributed to the entire apparatus.

According to the above-described fourth exemplary embodiment, the flexible display apparatus can be stably used.

Fifth Exemplary Embodiment

Figure 59:
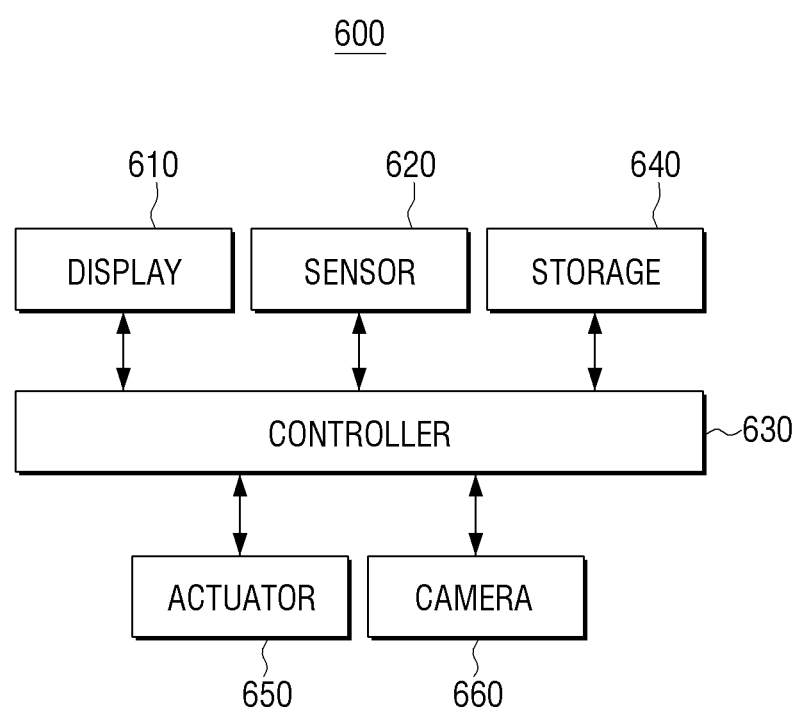
FIG. 59 is a block diagram illustrating a flexible display apparatus according to a fifth exemplary embodiment.

FIG. 59 is a block diagram illustrating a flexible display apparatus according to a fifth exemplary embodiment. Referring to 59, a flexible display apparatus 600 according to the fifth exemplary embodiment includes a display 610, a sensor 620, a controller 630, a storage 640, an actuator 650, and a camera 660. Again, in explaining FIG. 59, a redundant explanation of the elements is omitted for brevity.

The sensor 620 senses shape deformation of the flexible display apparatus 600 using a deformation sensor. Also, the sensor 620 senses a direction of light entering the display 610 using a light sensor.

The camera 660 detects a location of a user's pupil facing the display 610.

The controller 630 may control the display 610, the sensor 620, the controller 630, the storage 640, the actuator 650, and the camera 660. In particular, the controller 630 determines whether light entering the display 610 is reflected and enters the user's pupil using the direction of the light entering the display 610, the shape deformation of the flexible display apparatus 600, and information on the location of the user's pupil facing the display 610.

If it is determined that the light is reflected and enters the user's pupil, the controller 630 may control the actuator 650 to change curvature at a reflection point of the display 610. That is, if the light enters the user's pupil, as shown in view (a) of FIG. 60, the controller 630 may control the actuator 650 to change the curvature of a reflection surface of the flexible display apparatus 600.

If the flexible display apparatus 600 is a transparent flexible display apparatus, the sensor 620 may sense an amount of light passing through the display 620 in a direction opposite to the user using the light sensor. In this case, the controller 630 determines an amount of light entering the user's pupil from the display 610, using the amount of light passing through the display 610, the shape deformation of the flexible display apparatus 600, and information on the user's pupil facing the display 610.

In this case, to reduce the amount of light entering the user's pupil, the controller 630 may control the actuator 650 to adjust deformation of the display 610, thereby altering the direction of the light and reducing the amount of light incident on the user's pupil.

According to the above-described fifth exemplary embodiment, the flexible display apparatus improves a user's visibility.

Sixth Exemplary Embodiment

Figure 61:
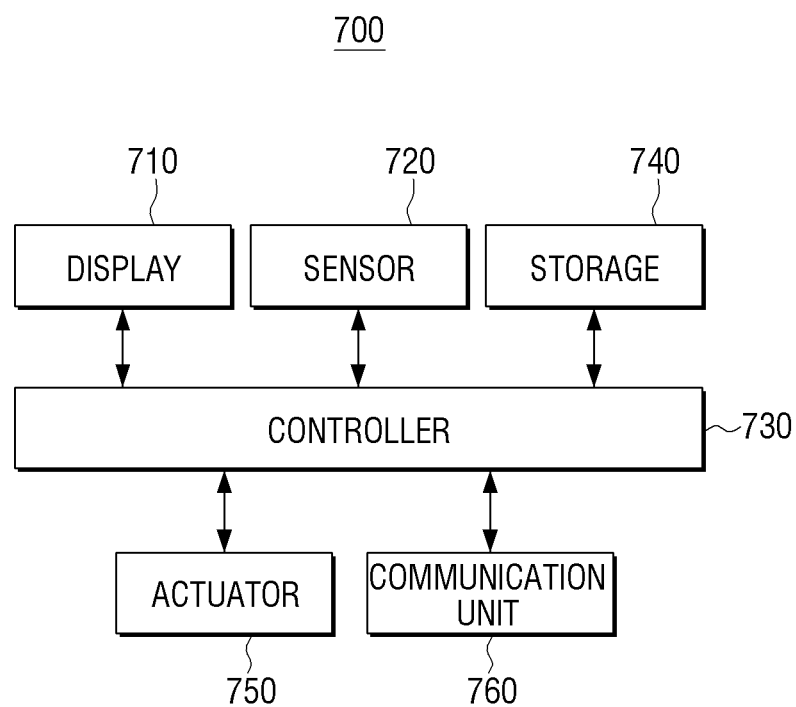
FIG. 61 is a block diagram illustrating a flexible display apparatus according to a sixth exemplary embodiment.

FIG. 61 is a block diagram illustrating a flexible display apparatus according to a sixth exemplary embodiment. Referring to FIG. 61, a flexible display apparatus 700 according to the sixth exemplary embodiment includes a display 710, a sensor 720, a controller 730, a storage 740, an actuator 750, and a communication unit 770 760. Again, in explaining FIG. 61, a redundant explanation of the elements is omitted for brevity.

The storage 740 stores various programs and data necessary for operating the flexible display apparatus 700. In particular, the storage 740 associates a telephone number with a shape of the flexible display apparatus 700, and stores the associated information. Also, the storage 740 associates a specific message with a shape of the flexible display apparatus 700 corresponding, and stores the associated information. The specific message may include a message transmitted from a specific sensor, a specific word, a specific voice, and a specific emoticon. The specific message refers to a message that cannot guide shape deformation of the flexible display apparatus in itself.

The communication unit 760 connects the flexible display apparatus to another apparatus. In particular, the communication unit 760 receives a shape making message for guiding shape deformation of the flexible display apparatus 700. The shape making message is a message generated by adding a specific information to a message, such as a specific emoticon (for example, a heart emoticon), a specific word (for example, 'love'), and a specific voice (for example, 'I love you'). The shape making message refers to a message that can guide shape deformation of the flexible display apparatus in itself.

The controller 730 may control the display 710, the sensor 720, the controller 730, the storage 740, the actuator 750, and the communication unit 760.

In particular, if a telephone call is received, the controller 730 detects the shape of the flexible display apparatus 700 associated with the incoming telephone number using the storage 740, and controls the actuator 750 to deform the flexible display apparatus 700 into the shape associated with the incoming number. This will be explained below with reference to FIG. 63.

That is, the storage 740 may store shapes corresponding to 'brother's telephone number', 'son's telephone number', 'husband's telephone number', and 'friend 1's telephone number'. Accordingly, the controller 730 may detect the sender's telephone number, and may control the actuator 750 to deform the flexible display apparatus 600 differently according to the telephone numbers, as shown in views (b), (c), (d) and (e) of FIG. 63.

If a specific message is received through the communication unit 760, the controller 730 detects a shape of the flexible display apparatus 700 associated with the specific message, and controls the actuator 750 to deform the flexible display apparatus 700 into the shape. That is, if a specific message is received, the controller 730 analyzes data of the specific message, and detects specific emoticon data, specific word data, and specific voice data. The controller 730 compares the detected data and data stored in the storage 740, and detects the shape of the flexible display apparatus 700 associated with the specific message. Accordingly, the controller 740 may control the actuator 750 to deform the flexible display apparatus 700 into the appropriate shape.

If a message for guiding shape deformation of the flexible display apparatus 700 is received through the communication unit 760, the controller 730 may control the actuator 750 to deform the flexible display apparatus 700 into a shape corresponding to the received message. That is, if a message is received, the controller 730 determines whether the received message is a message for guiding shape deformation of the flexible display apparatus 700. Specifically, the controller 730 determines whether the message is a message for guiding shape deformation using a specific data added to the message, and, if it is determined that the message is the message for guiding the shape deformation, analyzes the message data and determines whether specific emoticon data, specific word data, or specific voice data is included. Based on result of the determining, the controller 730 may control the actuator 750 to deform the flexible display apparatus 700 to a shape corresponding to the received message. This will be explained in detail with reference to FIG. 62.

Referring to view (a) of FIG. 62, a terminal of a sender may transmit 'I love you', which includes a word for guiding shape deformation of the flexible display apparatus, and a heart emoticon for guiding shape deformation of the flexible display apparatus.

Accordingly, the controller 730 may analyze message data and may control the actuator 750 to deform the flexible display apparatus 700 into a heart shape, as shown in view (b) of FIG. 62.

According to the sixth exemplary embodiment described above, it is possible to deform a receiver's flexible display apparatus according to a message of a sender, and thus the receiver can easily know a sender of the message or a content of the message.

Figure 64:
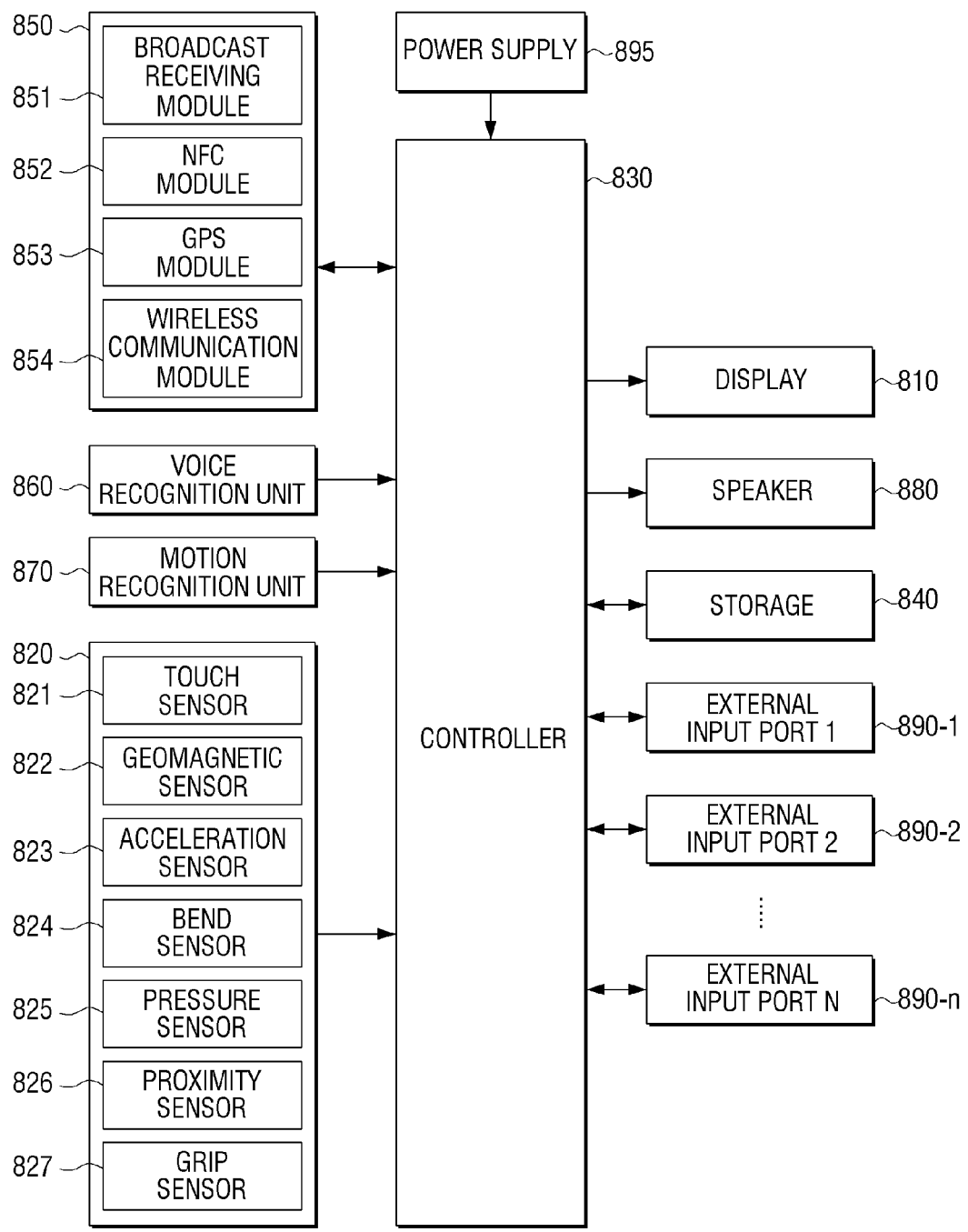
FIG. 64 is a block diagram illustrating a flexible display apparatus according an exemplary embodiment.

FIG. 64 is a block diagram to explain a detailed configuration of a flexible display apparatus and operations according to various exemplary embodiments.

Referring to FIG. 64, a flexible display apparatus 800 includes a display 810, a sensor 820, a controller 830, a storage 840, a communication unit 850, a voice recognition unit 860, a motion recognition unit 870, a speaker 880, external input ports 890-1~890-*n*, and a power supply 895.

The display 810 has flexibility. The detailed configuration and operation of the display 810 has been described above and a redundant explanation is omitted.

The storage 840 may store various programs or data associated with the operation of the flexible display apparatus 800, setting information set by the user, system driving operating software, various applications, and information on operations corresponding to user manipulation.

The sensor 820 detects a deformation state and touch state of the flexible display apparatus including the display 810. Referring to FIG. 64, the sensor 820 may include various kinds of sensors, such as touch sensor 821, a geomagnetic sensor 822, an acceleration sensor 823, a bend sensor 824, a pressure sensor 825, a proximity sensor 826, and a grip sensor 827.

The touch sensor 821 may be implemented using a capacitive type or a resistive type of sensor. The capacitive type calculates touch coordinates by sensing minute electricity excited in a user's body when a part of the user's body touches the surface of the display 810, using a dielectric substance coated on the surface of the display 810. The resistive type includes two electrode plates, and, if a user touches a screen, calculates touch coordinates by sensing an electric current flowing due to contact between upper and lower plates at the touched point. As described above, the touch sensor 821 may be embodied in various forms.

The geomagnetic sensor 822 senses a rotation state and a moving direction of the flexible display apparatus 800. The acceleration sensor 823 senses a degree of tilt of the flexible display apparatus 800. The geomagnetic sensor 822 and the acceleration sensor 823 may be used to sense bending characteristics, such as a bending direction or a bending area of the flexible display apparatus 800, as described above. However, the geomagnetic sensor 822 and the acceleration sensor 823 may be used to sense a rotation state or a tilt state of the flexible display apparatus 800.

The bend sensor (deformation sensor) 824 may be embodied in various shapes and numbers, as described above, and may sense a deformation state of the flexible display apparatus 800. The configuration and operation of the bend sensor 824 has been described above and thus a redundant explanation is omitted.

The pressure sensor 825 senses a magnitude of pressure exerted to the flexible display apparatus 800 when the user performs touch or bending manipulation, and provides the magnitude of pressure to the controller 830. The pressure sensor 825 may include a piezo film embedded in the display 810 and may output an electric signal corresponding to the magnitude of pressure. Although the pressure sensor 825 is a separate element from the touch sensor 821 in FIG. 64, if the touch sensor 821 is implemented by using a resistive touch sensor, the resistive touch sensor may also perform the function of the pressure sensor 850.

The proximity sensor 826 senses a motion that approaches the display surface without directly contacting the display surface. The proximity sensor 826 may be implemented by using various types of sensors, such as a high-frequency oscillation type proximity sensor that forms a high frequency magnetic field and detects an electric current induced by a magnetic characteristic that changes when an object approaches, a magnetic type proximity sensor that uses a magnet, and a capacitive type proximity sensor that detects capacitance which changes when an object approaches.

The grip sensor 827 is disposed on a border or a handle of the flexible display apparatus 800 separately from the pressure sensor 825, and senses a user's grip. The grip sensor 827 may be implemented by using a pressure sensor or a touch sensor.

The controller 830 analyzes various sensing signals sensed by the sensor 820, determines a user's intention, and performs an operation corresponding to the intention. For example, the controller 830 may process data obtained by communicating with an external apparatus, or data stored in the storage 840, and may output the processed data through the display 810 and the speaker 880. In this case, the controller 830 may communicate with the external apparatus using the communication unit 850.

The communication unit 850 may communicate with various types of external apparatuses according to various communication methods. The communication unit 850 may include various communication modules, such as a broadcast receiving module 851, a near field communication (NFC) module 852, a global positioning system (GPS) module 853, and a wireless communication module 854. The broadcast receiving module 851 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The NFC module 852 is a module that communicates with an external apparatus located at a near distance according to an NFC method, such as NFC, Bluetooth, or Zigbee. The GPS module 853 is a module that receives a GPS signal from a GPS satellite and detects a current location of the flexible display apparatus 100. The wireless communication module 854 is a module that is connected to an external network according to a wireless communication protocol, such as WiFi or IEEE, and communicates with the external network. The NFC module 852 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 830 selectively activates an element that is necessary for performing an operation according to a user's intention from among the above-described elements of the communication unit 850, and performs the operation.

The controller 830 may recognize voice input or motion input besides the bending or touch manipulation, and may perform an operation corresponding to the input. In this case, the controller 830 may activate the voice recognition unit 860 or the motion recognition unit 870.

The voice recognition unit 860 collects a user's voice or an external sound using a voice obtaining means, such as a microphone (not shown), and transmits the user's voice or the external sound to the controller 830. If the user's voice is consistent with a pre-set voice command in a voice control mode, the controller 830 may perform a task corresponding to the user's voice. The task, which is controllable using a voice, may include various tasks, such as adjusting a volume, selecting a channel, zapping a channel, adjusting a display property, reproducing, pausing, rewinding, fast forwarding, executing an application, selecting a menu, turning on an apparatus, and turning off an apparatus.

The motion recognition unit 870 obtains a user's image using an image picking up means (not shown), such as a camera, and provides the user's image to the controller 830. If the controller 130 analyzes the user's image and determines that the user makes a motion gesture corresponding to a pre-set motion command in a motion control mode, the controller 830 performs an operation corresponding to the motion gesture. For example, various tasks, such as zapping a channel, turning on an apparatus, turning off, pausing, reproducing, stopping, rewinding, fast forwarding, mute may be controlled according to a motion. The above-described tasks that are controllable according to a voice and the tasks that are controllable according to a motion are merely examples and are not limited.

The external input ports 890-1~890-n may be connected to various types of external apparatuses and may receive various data or programs or control commands. Specifically, the external input ports may include USB ports, headset ports, mouse ports, and LAN ports.

The power supply 895 supplies power to the flexible display apparatus 800.

Although FIG. 64 illustrates various elements, which may be included in the flexible display apparatus 800, the flexible display apparatus 800 may not necessarily include all of the elements and may not include only the above elements. Therefore, some of the elements may be omitted or added according to a product type of the flexible display apparatus 800, or may be replaced with other elements.

Figure 65:
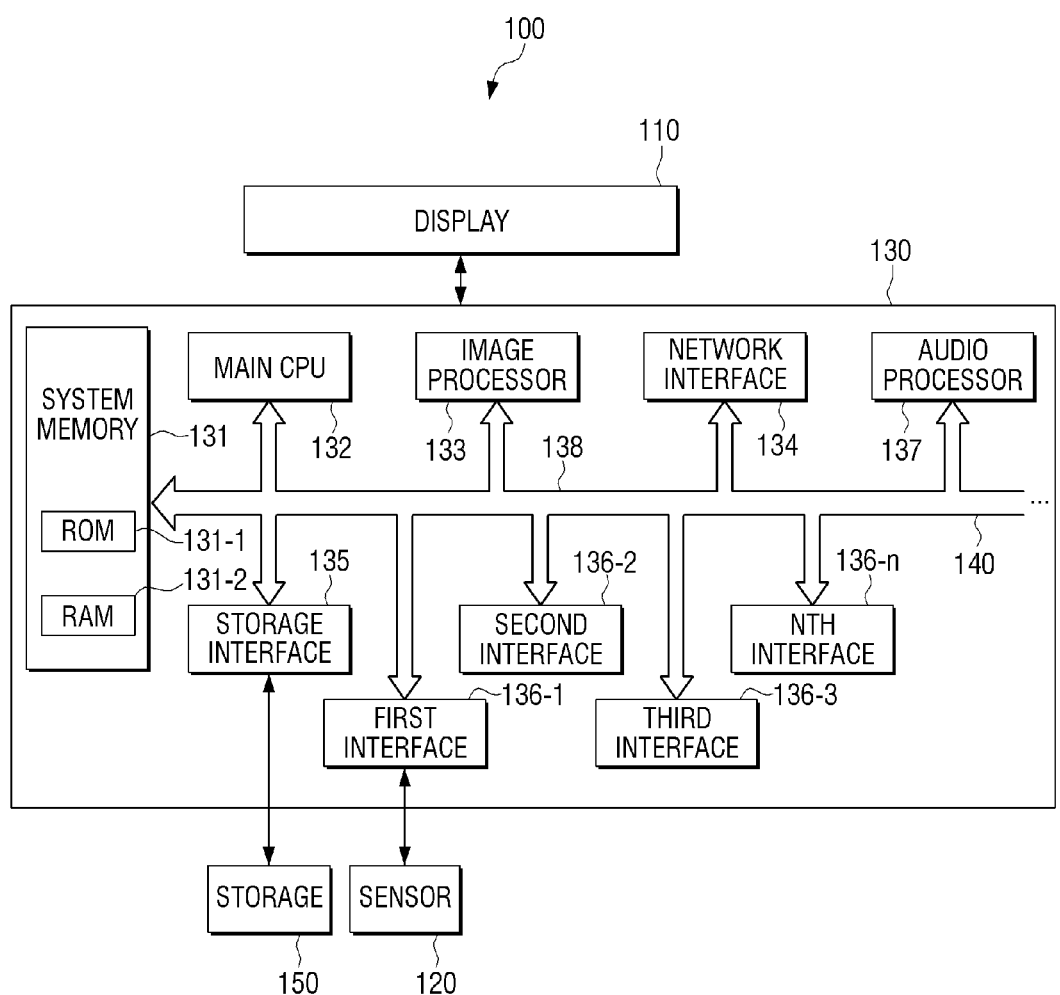
FIG. 65 is a block diagram illustrating a controller in detail.

FIG. 65 is a view to explain the controller 130 in detail.

Referring to FIG. 65, the controller 130 may include a system memory 131, a main CPU 132, an image processor 133, a network interface 134, a storage interface 135, first to nth interfaces 136-1 to 136-n, an audio processor 137, and a system bus 140.

The system memory 131, the main CPU 132, the image processor 133, the network interface 134, the storage interface 135, the first to nth interfaces 136-1 to 136-n, and the audio processor 137 may be connected to one another through the system bus 140, and may exchange various data or signals with one another.

The first to nth interfaces 136-1 to 136-n support interfacing between the elements including the sensor 120 and the elements of the controller 130.

In FIG. 65, the sensor 120 is connected to only the first interface 136-1. However, if the sensor 120 includes various types of sensors as shown in FIG. 65, each of the sensors may be connected through one or more interfaces. Also, at least one of the first to nth interfaces 136-1 to 136-n may be implemented by using a button which is provided on a body of the flexible display apparatus 100, or an input interface which receives various signals from an external apparatus connected through the external input ports 890-1~890-n.

The system memory 131 includes a read only memory (ROM) 131-1 and a random access memory 131-2. The ROM 131-1 stores a set of commands for system booting. If a turn on command is input and power is supplied, the main CPU 132 copies an OS which is stored in the storage 140 into the RAM 131-2 according to a command stored in the ROM 131-1, executes the OS, and boots the system. If booting is completed, the main CPU 132 copies various applications stored in the storage 140 into the RAM 131-2, executes the applications copied into the RAM 131-2, and performs various operations.

As described above, the main CPU 132 may perform various operations according to the application stored in the storage 140.

The storage interface 135 is connected to the storage 140 and exchanges various programs, content, and data with the storage 140.

For example, if the user performs touch manipulation or bending manipulation corresponding to a reproducing command to reproduce and display content stored in the storage 140, the main CPU 132 accesses the storage 140 through the storage interface 135, generates a list of stored contents, and displays the list on the display 110. In this state, if the user performs touch manipulation or bending manipulation to select one content, the main CPU 132 executes a content reproducing program stored in the storage 140, which may be any type of memory (ROM, RAM, flash, etc.). The main CPU 132 controls the image processor 133 to form a content reproducing screen according to a command included in the content reproducing program.

The image processor 133 may include a decoder, a renderer, and a scaler. Accordingly, the image processor 133 decodes stored content, renders the decoded content data and forms a frame, and scales a size of the frame according to a screen size of the display 110. The image processor 133 provides the processed frame to the display 110 and displays the same.

The audio processor 137 processes audio data and provides the audio data to a sound outputting means, such as a speaker. The audio processor 137 performs audio signal processing by decoding audio data stored in the storage 140 or audio data received through the communication unit 150, filtering noise, and amplifying the audio data to an appropriate decibel. In the above example, if the content to be reproduced is a moving image content, the audio processor 137 may process the audio data de-multiplexed from the moving image content, and may provide the audio data to the speaker 180 so that the audio data is synchronized with the image processor 133 and is output.

The network interface 134 is connected to external apparatuses through a network. For example, if a web browser program is executed, the main CPU 132 accesses a web server through the network interface 134. If web page data is received from the web server, the main CPU 132 controls the image processor 133 to form a web page screen, and displays the web page screen on the display 110.

Figure 66:
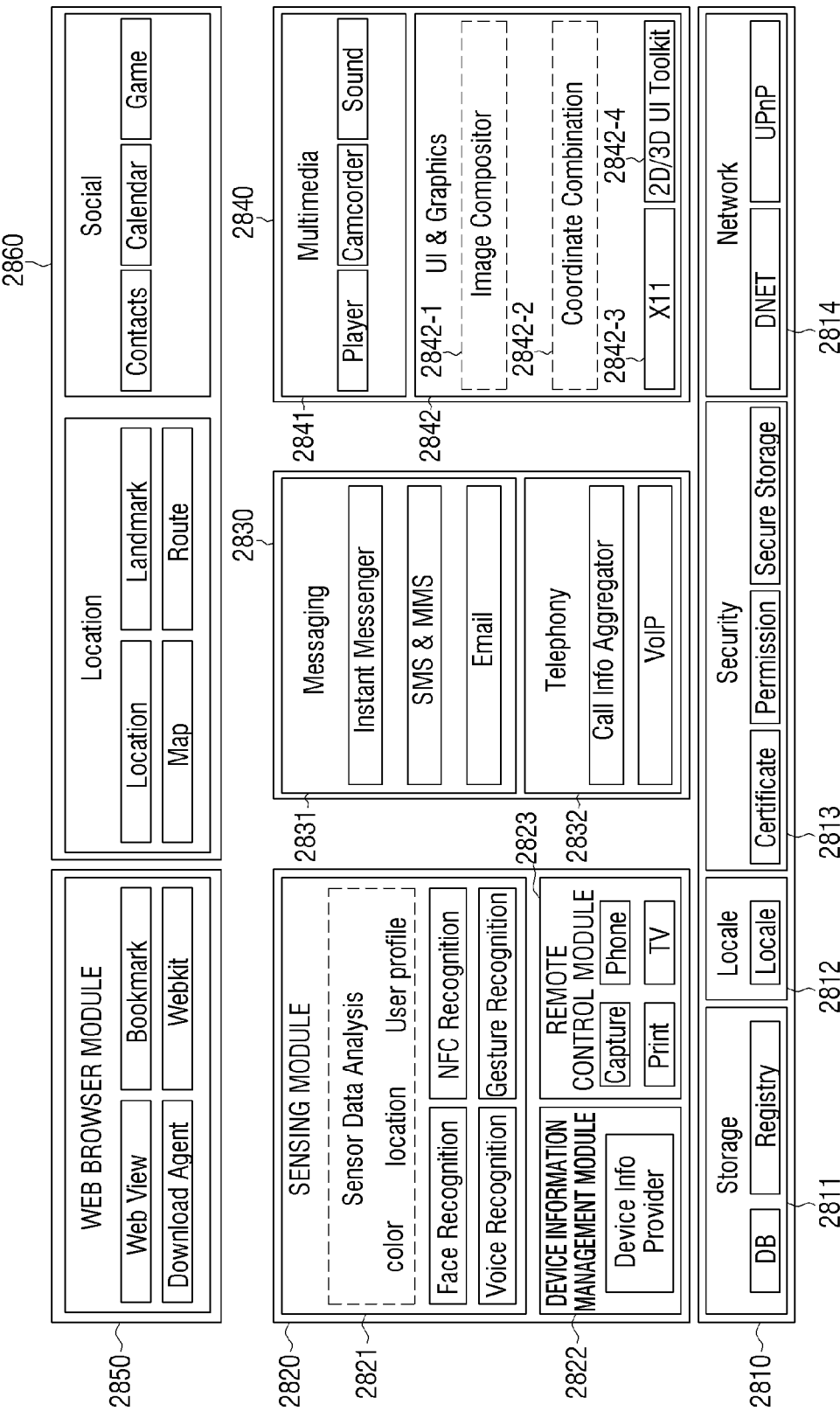
FIG. 66 is a view illustrating an example of a software structure stored in a storage.

FIG. 66 is a view illustrating a software structure of the storage 150 to support the operations of the controller 130 according to the above-described exemplary embodiments. Referring to FIG. 66, the storage 150 includes a base module 2810, a device management module 2820, a communication module 2830, a presentation module 2840, a web browser module 2850, and a service module 2860.

The base module 2810 refers to a base module that processes signals transmitted from each hardware included in the flexible display apparatus 100, and transmits the signals to an upper layer module.

The base module 2810 includes a storage module 2811, a location-based module 2812, a security module 2813, and a network module 2814.

The storage module 2811 is a program module that manages a database (DB) or a registry. The location-based module 2812 is a program module that is interlocked with hardware such as a GPS chip and supports a location-based service. The security module 2813 is a program module that supports certification for hardware, permission of a request, and a secure storage, and the network module 2814 includes a Distributed.net (DNET) module and a Universal Plug and Play (UPnP) module as a module for supporting network connection.

The device management module 2820 is a module that manages external input and information on an external device, and uses the same. The device management module 2820 may include a sensing module 2821, a device information management module 2822, and a remote control module 2823.

The sensing module 2821 is a module that analyzes sensor data provided from various sensors of the sensor 120. Specifically, the sensing module 2821 is a program module that detects a location of a user or an object, color, shape, size, and other profiles. The sensing module 2821 may include a face recognition module, a voice recognition module, a motion recognition module, and an NFC recognition module. The device information management module 2822 is a module that provides information on various types of devices, and the remote control module 2823 is a program module that remotely controls a peripheral device such as a telephone, a television (TV), a printer, a camera, and an air conditioner.

The communication module 2830 is a module to communicate with an external apparatus. The communication module 2830 includes a messaging module 2831 such as a messenger program, a short message service (SMS) and multimedia message service (MMS) program, and an email program, and a telephony module 2832 which includes a call information aggregator program module and a voice over internet protocol (VoIP) module.

The presentation module 2840 is a module that generates a display screen. The presentation module 2840 includes a multimedia module 2841 to reproduce multimedia content and output the multimedia content, and a user interface (UI) and graphic module 2842 to process a UI and graphics. The multimedia module 2841 may include a player module, a camcorder module, and a sound processing module. Accordingly, the multimedia module 2841 generates a screen and a sound by reproducing various multimedia contents, and reproduces the same. The UI and graphic module 2842 may include an image compositor module 2842-1 to combine images, a coordinate combination module 2842-2 to combine coordinates on a screen to display an image and generate coordinates, an X11 module 2842-3 to receive various events from hardware, and a 2D/3D UI toolkit 2842-4 to provide a tool for configuring a UI of a 2D or 3D format.

The web browser module 2850 is a module that performs web-browsing and accesses a web server. The web browser module 2850 may include a web view module to render and view a web page, a download agent module to download, a bookmark module, and a web-kit module.

The service module 2860 is an application module that provides various services. Specifically, the service module 2860 may include various modules such as a navigation service module to provide a map, a current location, a landmark, and route information, a game module, and an advertisement application module.

The main CPU 132 of the controller 130 accesses the storage 150 through the storage interface 135, copies various modules stored in the storage 150 into the RAM 131-2, ad performs operations according to operations of the copied modules.

Specifically, the main CPU 132 analyzes output values of the sensors of the sensor 120 using the sensing module 2821, checks a bending area, a bending line, a bending direction, a number of deformation repetitions, a bending angle, a bending speed, a touch area, a number of touch repetitions, an intensity of touch, a magnitude of pressure, a degree of proximity, and an intensity of user grip, and, based on a result of the checking, determines whether the user manipulation is intended. If it is determined that the user manipulation is intended, the main CPU 132 detects information on an operation corresponding to the user manipulation from the database of the storage module 2810. The main CPU 132 drives a module corresponding to the detected information and performs an operation.

For example, if the operation is displaying a graphic user interface (GUI), the main CPU 132 configures a GUI screen using the image compositor module 2842-1 of the presentation module 2840. Also, the main CPU 132 determines a display location of the GUI screen using the coordinate combination module 2842-2 and controls the display 110 to display the GUI screen on the location.

If user manipulation corresponding to a message receiving operation is performed, the main CPU 132 executes the messaging module 2841, accesses a massage management server, and receives a message stored in a user account. Also, the main CPU 132 configures a screen corresponding to the received message using the presentation module 2840 and displays the screen on the display 140.

If a telephone call is performed, the main CPU 132 may drive the telephony module 2832.

As described above, programs of various structures may be stored in the storage 140 and the controller 130 may perform various operations using various programs stored in the storage 140.

Figure 67:
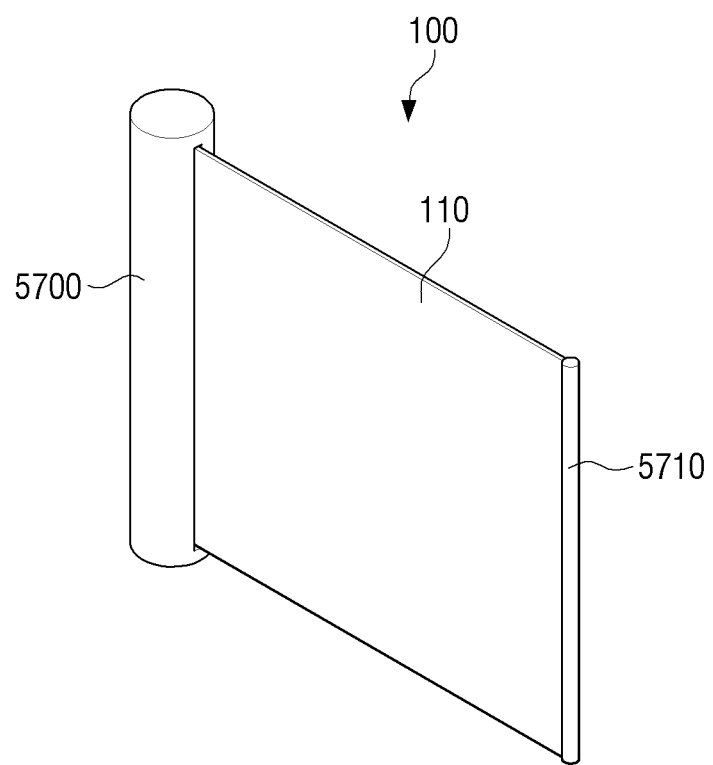
FIG. 67 is a view illustrating an example of a flexible display apparatus embedded in a body.

FIG. 67 is a view illustrating an example of a flexible display apparatus embedded in a body.

Referring to FIG. 67, the flexible display apparatus 100 includes a body 5700, a display 110, and a grip unit 5710.

The body 5700 may serve as a kind of a case containing the display 110. If the flexible display apparatus 100 includes various elements, as shown in FIG. 64, elements other than the display 110 and some sensors may be mounted in the body 5700. The body 5700 includes a rotary roller for rolling the display 110. Accordingly, when not in use, the display 110 is rolled about the rotary roller and contracted in the body 5700.

If the user holds the grip unit 5710 and pulls the display 110, the rotary roller is rotated in the opposite direction to that of the rolling and rolling is released, so that the display 110 is extracted from the body 5700. A stopper (not shown) may be provided on the rotary roller. Accordingly, if the user pulls the grip unit 5710 by more than a predetermined distance, the rotation of the rotary roller is stopped by the stopper and the display 110 may be fixed. Accordingly, the user can execute various functions using the display 110 exposed to the outside. If the user presses a button to release the stopper, the stopper is released and the rotary roller is rotated in a reverse direction. As a result, the display 110 is rolled in the body 5100. The stopper may have a switch shape to stop an operation of a gear to rotate the rotary roller. Since the rotary roller and the stopper may employ a general rolling structure as it is, detailed illustration and explanation thereof are omitted.

The body 5700 includes a power supply 500. The power supply 500 may be implemented by using a battery connector on which a disposable battery is mounted, a secondary cell which can be charged and used multiple times by the user, and a solar cell which generates electricity using solar heat. If the power supply is implemented by using the secondary cell, the user may connect the body 5700 to an external power source through a wire and may charge the power supply 500.

In FIG. 67, the body 5700 has a cylindrical shape. However, the shape of the body 5700 may be quadrangular or other polygonal shape. Also, the display 110 may be implemented in various forms such as enclosing the body 5700, rather than being embedded in the body 5700 and being exposed to the outside by being pulled.

Figure 68:
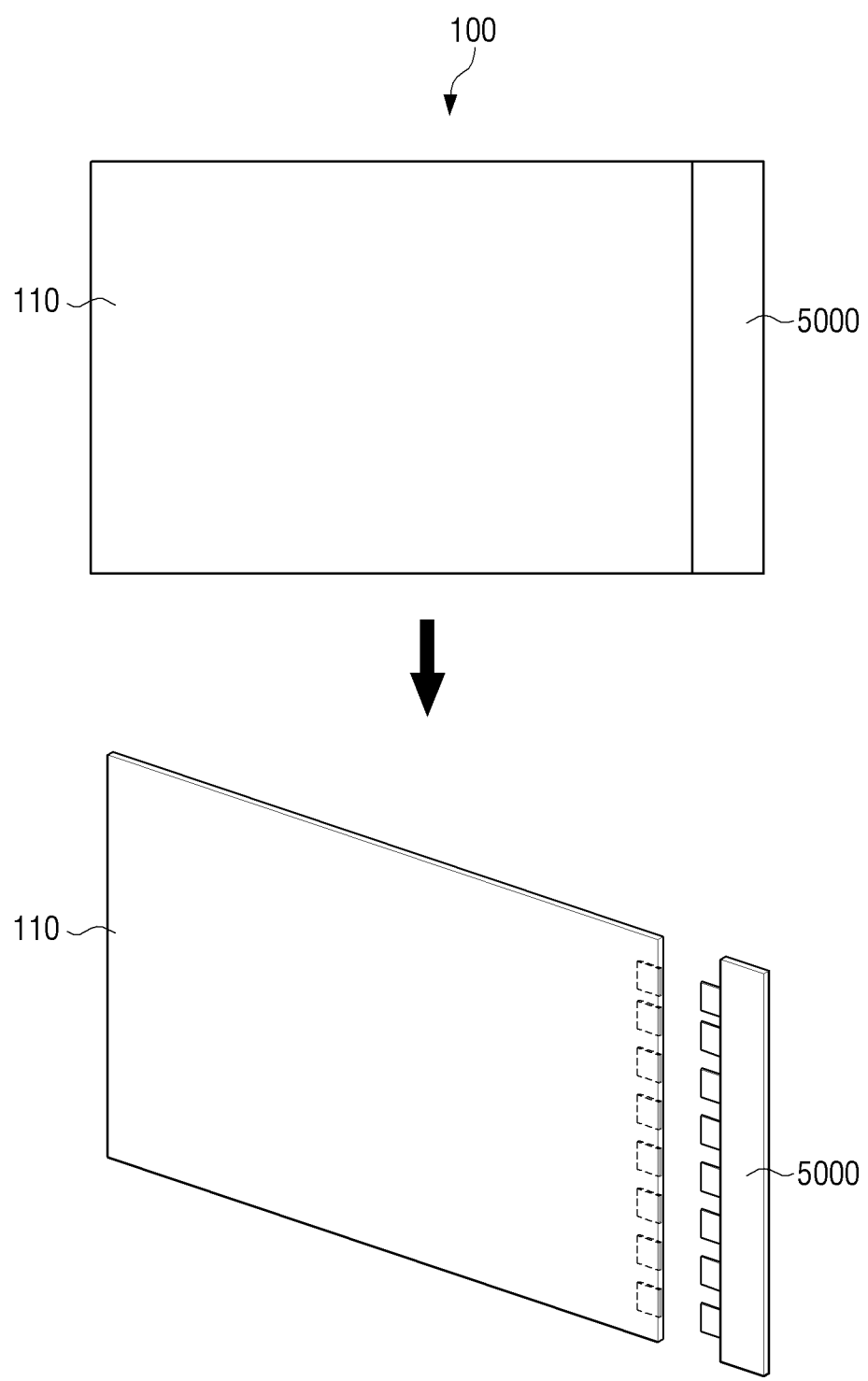
FIG. 68 is a view illustrating a flexible display apparatus including an attachable and detachable power supply.

FIG. 68 is a view illustrating a flexible display apparatus including an attachable and detachable power supply 5000.

Referring to FIG. 68, the power supply 5000 is provided on one edge of the flexible display apparatus and is attachable and detachable. The power supply 5000 may be the power supply 895.

The power supply 500 is made of a flexible material and can be deformed along with the display 110. Specifically, the power supply 500 includes a cathode collector, a cathode electrode, an electrolyte, an anode electrode, an anode collector, and a sheath covering the aforementioned members.

For example, the collector may be implemented by using an alloy, such as TiNi having good elasticity, metal such as copper and aluminum, a conductive material such as metal coated with carbon, carbon, and a carbon fiber, or a conducting polymer such as polypyrole.

The cathode electrode may be manufactured by a negative electrode material such as metal such as lithium, natrium, zinc, magnesium, cadmium, hydrogen storage alloy, and lead, nonmetal such as carbon, and a high molecular electrode material such as organosulfur.

The anode electrode may be manufactured by a positive electrode material such as sulfur and metal sulfide, lithium transition metal oxide such as $LiCoO_2$, and a high molecular electrode material such as $SOCl_2$, $MnO_2$, $Ag_2O$, $Cl_2$, $NiCl_2$, and $NiOOH$. The electrolyte may be implemented in a gel form using PEO, PVdF, PMMA, and PVAC.

The sheath may use a general polymer resin. For example, PVC, HDPE, or epoxy may be used. Besides these, any material that can prevent damage of a thread-type cell and is freely flexible or bendable may be used for the sheath.

Each of the anode electrode and the cathode electrode in the power supply 5000 may include a connector to be electrically connected to an external source.

Referring to FIG. 68, the connector protrudes from the power supply 5000 and a recess corresponding to a location, a size, and a shape of the connector is formed on the display 110. Accordingly, the power supply 5000 is connected with the display 110 as the connector and the recess are connected to each other. The connector of the power supply 5000 is connected to a power connection pad (not shown) of the flexible display apparatus 100 to supply power to the flexible display apparatus 100.

Although the power supply 5000 is attached to or detached from one edge of the flexible display apparatus 100 in FIG. 68, this is merely an example. A location and a shape of the power supply 5000 may be changed according to a product characteristic. For example, if the flexible display apparatus 100 has a predetermined thickness, the power supply 5000 may be mounted on a rear surface of the flexible display apparatus 100.

The method for controlling of the flexible display apparatus according to the above-described various exemplary embodiments may be implemented using computer-executable program code and may be stored in various non-transitory computer readable media, and may be provided to each server or apparatus for execution by a processor thereof.

The non-transitory computer readable medium refers to a medium that stores data semi-permanently, rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a flexible display apparatus, the method comprising:
   receiving a user input for selecting an icon displayed on a display of the flexible display apparatus;
   identifying whether deformation of the display is required for executing an application corresponding to the selected icon;
   in response to the deformation of the display being required for executing the application, displaying on the display a graphical user interface (GUI) guide comprising information on predetermined deformation of the display for executing the application;
   receiving a deformation gesture for deforming the display while the GUI guide is displayed on the display; and
   in response to the deformation of the display by the deformation gesture being corresponded to the predetermined deformation, executing the application,
   wherein the GUI guide comprises information on an angle of the predetermined deformation.

2. The method as claimed in claim 1, wherein the GUI guide indicates a type of the deformation gesture to be performed.

3. The method as claimed in claim 2, further comprising:
   detecting the deformation gesture, the deformation gesture being a user manipulation that deforms the flexible display apparatus;
   determining whether the detected deformation gesture corresponds to a predetermined deformation gesture; and
   providing an output that indicates a result of the determining.

4. The method as claimed in claim 3, wherein the output is a feedback signal that indicates a similarity of the detected deformation gesture to the predetermined deformation gesture.

5. The method as claimed in claim 2, further comprising:
   detecting the deformation gesture, the deformation gesture being a user manipulation that deforms the flexible display apparatus; and
   determining whether the detected deformation gesture corresponds to a predetermined deformation gesture, and
   wherein the executing comprises executing the command of the application in response to determining that deformation gesture corresponds to the predetermined deformation gesture.

6. The method as claimed in claim 2, wherein the deformation gesture comprises at least one of a bending the flexible display apparatus, a rolling the flexible display apparatus, and a folding the flexible display apparatus.

7. The method as claimed in claim 6, further comprising:
   detecting the deformation gesture is performed;
   determining the degree of deformation of the flexible display apparatus based on the deformation gesture; and
   determining the at least one of the bending the flexible display apparatus, the rolling the flexible display apparatus, and the folding the flexible display apparatus based on the degree of the deformation.

8. The method as claimed in claim 7, further comprising:
   determining whether a first portion of a surface of the flexible display apparatus and a second portion of the surface of the flexible display apparatus contact each other, and
   wherein the determining the at least one of the bending of the flexible display apparatus, the rolling of the flexible display apparatus, and the folding of the flexible display apparatus comprises determining the at least one of the bending of the flexible display apparatus, the rolling of the flexible display apparatus, and the folding of the flexible display apparatus based on (i) the degree of deformation of the flexible display apparatus and (ii) whether it is determined that the first portion and the second portion contact each other.

9. The method as claimed in claim 2, wherein the deformation gesture is a plurality of deformations of the flexible display apparatus.

10. The method as claimed in claim 2, wherein the executing comprises displaying a result of executing the command of the application on the display.

11. The method as claimed in claim 2, further comprising: displaying the icon on the display.

12. The method as claimed in claim 2, further comprising: displaying an operating system of the flexible display apparatus on the display.

13. A flexible display apparatus comprising:
   a flexible display;
   a controller configured to:
   receive a user input for selecting an icon displayed on the flexible display;
   identify whether deformation of the flexible display is required for executing an application corresponding to the selected icon,
   in response to the deformation of the display being required for executing the application, display on the flexible display a graphical user interface (GUI) guide comprising information on predetermined deformation of the flexible display for executing the application,
   receive a deformation gesture for deforming the flexible display while the GUI guide is displayed on the flexible display, and
   in response to the deformation of the display by the deformation gesture being corresponded to the predetermined deformation, execute the application,
   wherein the GUI guide comprises information on an angle of the predetermined deformation.

14. The flexible display apparatus as claimed in claim 13, wherein the GUI guide indicates a type of the deformation gesture to be performed.

15. The flexible display apparatus as claimed in claim 14, further comprising:
a sensor configured to sense the deformation gesture, the deformation gesture being a user manipulation of the flexible display apparatus,
wherein the controller is further configured to determine whether the sensed deformation gesture corresponds to a predetermined deformation gesture and control output of an output that indicates a result of the determining.

16. The flexible display apparatus as claimed in claim 15, wherein the output is a feedback signal that indicates a similarity of the detected deformation gesture to the predetermined deformation gesture.

17. The flexible display apparatus as claimed in claim 14, further comprising:
a sensor configured to sense the deformation gesture, the deformation gesture being a user manipulation of the flexible display apparatus,
wherein the controller is further configured to determine whether the detected deformation gesture corresponds to a predetermined deformation gesture and execute the command of the application in response to determining that deformation gesture corresponds to the predetermined deformation gesture.

18. The flexible display apparatus as claimed in claim 14, wherein the deformation gesture comprises at least one of a bending of the flexible display apparatus, a rolling of the flexible display apparatus, and a folding of the flexible display apparatus.

19. The flexible display apparatus as claimed in claim 18, wherein a sensor detects the deformation gesture, and
wherein the controller is further configured to determine the degree of the deformation of the flexible display apparatus based on the deformation gesture, and determine the at least one of a bending the flexible display apparatus, the rolling the flexible display apparatus, and the folding the flexible display apparatus based on the degree of deformation of the flexible display apparatus.

20. The flexible display apparatus as claimed in claim 19, wherein the controller is further configured to determine whether a first portion of a surface of the flexible display apparatus and a second portion of the surface of the flexible display apparatus contact each other and determine the at least one of the bending the flexible display apparatus, the rolling the flexible display apparatus, and the folding the flexible display apparatus based on (i) the degree of deformation of the flexible display apparatus and (ii) whether it is determined the first portion and the second portion contact each other.

21. The flexible display apparatus as claimed in claim 14, wherein the deformation gesture is a plurality of deformations of the flexible display apparatus.

22. The flexible display apparatus as claimed in claim 14, wherein the controller is further configured to control display of a result of executing the command of the application on the flexible display.

23. The flexible display apparatus as claimed in claim 14, wherein the controller is further configured to control display of the icon on the flexible display.

24. The flexible display apparatus as claimed in claim 14, wherein the controller controls display of an operating system of the flexible display apparatus on the flexible display.

25. A non-transitory computer-readable medium having embodied thereon a program for executing a method of controlling a flexible display apparatus, the method comprising:
receiving a user input for selecting an icon displayed on a display of the flexible display apparatus;
identifying whether deformation of the display is required for executing an application corresponding to the selected icon;
in response to the deformation of the display being required for executing the application, displaying on the display a graphical user interface (GUI) guide comprising information on predetermined deformation of the display for executing the application;
receiving a deformation gesture for deforming the display while the GUI guide is displayed on the display; and
in response to the deformation of the display by the deformation gesture being corresponded to the predetermined deformation, executing the application,
wherein the GUI guide comprises information on an angle of the predetermined deformation.

* * * * *